(12) United States Patent     (10) Patent No.:   US 12,582,258 B2

Rivera                    (45) Date of Patent:     Mar. 24, 2026

(54) BEVERAGE BREWING MATERIAL FILTER CUP

(71) Applicant: Adrian Rivera, Whittier, CA (US)

(72) Inventor: Adrian Rivera, Whittier, CA (US)

(73) Assignee: Adrian Rivera Maynez Enterprises, Inc., La Mirada, CA (US)

( * ) Notice: Subject to any disclaimer, the term of this patent is extended or adjusted under 35 U.S.C. 154(b) by 610 days.

(21) Appl. No.: 17/104,095

(22) Filed: Nov. 25, 2020

(65) Prior Publication Data

US 2022/0007877 A1     Jan. 13, 2022

Related U.S. Application Data

(63) Continuation-in-part of application No. 15/790,398, filed on Oct. 23, 2017, now Pat. No. 10,865,039, which is a continuation-in-part of application No. 12/960,496, filed on Dec. 4, 2010, now Pat. No. 9,795,243.

(51) Int. Cl.
    *A47J 31/08*         (2006.01)
    *A47J 31/06*         (2006.01)

(52) U.S. Cl.
    CPC ........... *A47J 31/08* (2013.01); *A47J 31/0642* (2013.01)

(58) Field of Classification Search
    CPC .............................. A47J 31/08; A47J 31/0642
    USPC .......................................................... 99/295
    See application file for complete search history.

(56) References Cited

U.S. PATENT DOCUMENTS

| | | | |
|---|---|---|---|
| 739,470 A | 9/1903 | Wegner | |
| 2,234,397 A | 3/1941 | Bentz | |
| 2,242,684 A | 5/1941 | Stuart | |
| 2,407,118 A | 9/1946 | Waters | |
| 2,433,815 A | 12/1947 | Laforge | |
| 2,443,520 A * | 6/1948 | Schwartz | B65D 83/0835 |
| | | | 221/269 |
| 2,546,874 A * | 3/1951 | Siegrist | A47J 31/446 |
| | | | D7/400 |
| 3,022,411 A | 2/1962 | Soper et al. | |
| 3,115,822 A | 12/1963 | Totten | |
| 3,120,170 A | 2/1964 | Garte | |
| 3,136,241 A | 6/1964 | Price | |
| 3,199,682 A | 8/1965 | Scholtz | |
| 3,224,360 A | 12/1965 | Wickenberg et al. | |
| 3,316,388 A | 4/1967 | Wickenberg et al. | |
| 3,405,630 A | 10/1968 | Weber, III | |
| 3,583,308 A | 6/1971 | Williams | |
| 3,607,297 A | 9/1971 | Fasano | |
| 3,757,670 A | 9/1973 | Laama et al. | |

(Continued)

FOREIGN PATENT DOCUMENTS

| | | | |
|---|---|---|---|
| EP | 0741988 B1 | 12/1994 | |
| JP | 0741988 A1 * | 12/1994 | A47J 31/02 |
| WO | 2005092160 A1 | 10/2005 | |

*Primary Examiner* — Jimmy Chou

(74) *Attorney, Agent, or Firm* — IP Strategies

(57)           ABSTRACT

A beverage brewing material filter cup includes a receptacle configured to receive and hold brewing material. The receptacle includes a base, a sidewall, and a rim. The base has a peripheral edge. The sidewall extends outward from the peripheral edge of the base and terminates in an opening. The rim surrounds the sidewall opening to form an outside perimeter of the receptacle. At least the base and/or the sidewall is at least partially constructed of a water-permeable material.

21 Claims, 33 Drawing Sheets

(56) References Cited

U.S. PATENT DOCUMENTS

| | | | |
|---|---|---|---|
| 3,844,206 A | 10/1974 | Weber | |
| 3,958,502 A | 5/1976 | Vitous | |
| 4,152,464 A * | 5/1979 | Brody | A23B 7/10 |
| | | | 426/399 |
| 4,221,670 A * | 9/1980 | Ziemek | A47J 31/0626 |
| | | | 210/474 |
| 4,253,385 A | 3/1981 | Illy | |
| 4,286,515 A | 9/1981 | Baumann et al. | |
| 4,396,655 A | 8/1983 | Graham et al. | |
| 4,410,550 A * | 10/1983 | Gaskill | A23F 5/26 |
| | | | 426/77 |
| 4,550,024 A | 10/1985 | le Granse | |
| 4,603,621 A | 8/1986 | Roberts | |
| 4,626,435 A | 12/1986 | Zimmerman | |
| 4,656,932 A * | 4/1987 | Kopp | A47J 31/06 |
| | | | D7/400 |
| 4,676,396 A * | 6/1987 | Mamolou | A47J 31/08 |
| | | | 294/93 |
| 4,703,687 A | 11/1987 | Wei | |
| 4,706,555 A | 11/1987 | Nakamura et al. | |
| 4,735,719 A * | 4/1988 | Benedict | A47J 31/06 |
| | | | D7/400 |
| 4,800,089 A * | 1/1989 | Scott | B65D 85/8061 |
| | | | 426/77 |
| 4,836,592 A * | 6/1989 | Roberts | A47J 31/08 |
| | | | 294/212 |
| 4,848,815 A * | 7/1989 | Molloy | A47J 31/08 |
| | | | 294/212 |
| 4,865,737 A * | 9/1989 | McMichael | A47J 31/06 |
| | | | 210/477 |
| 4,867,993 A * | 9/1989 | Nordskog | A47J 31/02 |
| | | | 426/82 |
| 4,913,916 A * | 4/1990 | Tanner | A23F 5/267 |
| | | | 99/295 |
| 4,957,217 A * | 9/1990 | Ritson | A47J 31/08 |
| | | | 206/520 |
| 4,983,410 A * | 1/1991 | Dinos | B65D 85/8043 |
| | | | 426/77 |
| 4,998,463 A | 3/1991 | Precht et al. | |
| 5,000,082 A | 3/1991 | Lassota | |
| 5,012,629 A | 5/1991 | Rehman et al. | |
| 5,046,409 A | 9/1991 | Henn | |
| 5,097,984 A * | 3/1992 | Meisner | A47J 31/08 |
| | | | 221/45 |
| 5,120,439 A * | 6/1992 | McFarlin | A47J 31/08 |
| | | | 210/493.1 |
| 5,123,335 A | 6/1992 | Aselu | |
| 5,171,457 A * | 12/1992 | Acuff | A47J 31/08 |
| | | | 99/298 |
| 5,197,374 A | 3/1993 | Fond | |
| 5,233,914 A | 8/1993 | English | |
| 5,242,702 A * | 9/1993 | Fond | B65D 85/8061 |
| | | | 426/77 |
| 5,243,164 A * | 9/1993 | Erickson | A47J 31/0642 |
| | | | 426/243 |
| 5,298,267 A * | 3/1994 | Gruenbacher | B65D 85/8049 |
| | | | 426/77 |
| 5,325,765 A * | 7/1994 | Sylvan | A47J 31/3695 |
| | | | 426/77 |
| 5,335,589 A | 8/1994 | Yerves, Jr. et al. | |
| 5,526,733 A | 6/1996 | Klawuhn et al. | |
| 5,582,730 A | 12/1996 | Hugentobler | |
| 5,636,563 A | 6/1997 | Oppermann et al. | |
| 5,649,412 A | 7/1997 | Binacchi | |
| 5,676,041 A | 10/1997 | Glucksman et al. | |
| 5,736,042 A | 4/1998 | Aoki | |
| 5,829,340 A | 11/1998 | Yang | |
| 5,840,189 A * | 11/1998 | Sylvan | B65D 85/8061 |
| | | | 99/302 R |
| 5,870,943 A | 2/1999 | Levi et al. | |
| 5,895,672 A | 4/1999 | Cooper | |
| 5,897,899 A | 4/1999 | Fond | |
| 5,913,964 A | 6/1999 | Melton | |
| 6,079,315 A * | 6/2000 | Beaulieu | A47J 31/4467 |
| | | | 99/302 R |
| 6,136,352 A | 10/2000 | Silverstein et al. | |
| 6,138,551 A * | 10/2000 | Bauer | A47J 31/02 |
| | | | 99/321 |
| 6,189,438 B1 * | 2/2001 | Bielfeldt | A47J 31/08 |
| | | | 99/321 |
| 6,202,542 B1 | 3/2001 | Melton | |
| 6,273,293 B1 * | 8/2001 | Carlson | A47J 31/08 |
| | | | 294/212 |
| 6,499,388 B2 | 12/2002 | Schmed | |
| 6,606,938 B2 | 8/2003 | Taylor | |
| 6,655,260 B2 | 12/2003 | Lazaris et al. | |
| 6,658,989 B2 * | 12/2003 | Sweeney | A47J 31/446 |
| | | | 99/322 |
| 6,662,955 B1 * | 12/2003 | Lassota | A47J 31/08 |
| | | | 210/497.2 |
| 6,688,490 B2 * | 2/2004 | Carlson | B65G 47/90 |
| | | | 221/210 |
| 6,708,600 B2 | 3/2004 | Winkler et al. | |
| 6,727,484 B2 | 4/2004 | Policappelli | |
| 6,740,345 B2 | 5/2004 | Cai | |
| 6,777,007 B2 * | 8/2004 | Cai | A47J 31/0647 |
| | | | 206/0.5 |
| 6,832,542 B2 * | 12/2004 | Hu | A47J 31/0673 |
| | | | 99/302 R |
| 6,843,165 B2 | 1/2005 | Stoner | |
| 6,904,840 B1 | 6/2005 | Pfeifer et al. | |
| 6,948,420 B2 | 9/2005 | Kirschner et al. | |
| 7,047,870 B2 | 5/2006 | Gantt et al. | |
| 7,131,369 B2 | 11/2006 | Gantt et al. | |
| 7,318,374 B2 * | 1/2008 | Guerrero | A47J 31/0626 |
| | | | 99/321 |
| 7,320,274 B2 | 1/2008 | Castellani | |
| 7,377,089 B2 | 5/2008 | Rapparini | |
| 7,461,587 B2 * | 12/2008 | Guerrero | A47J 31/02 |
| | | | 210/474 |
| 7,946,217 B2 | 5/2011 | Favre et al. | |
| 8,047,127 B2 | 11/2011 | Lin | |
| 8,221,813 B2 * | 7/2012 | Boul | A47J 31/08 |
| | | | 426/594 |
| 8,327,754 B2 | 12/2012 | Kirschner et al. | |
| 9,149,149 B2 * | 10/2015 | Oh | B65D 85/8049 |
| 9,795,243 B2 * | 10/2017 | Rivera | B65B 67/02 |
| 10,865,039 B2 | 12/2020 | Rivera | |
| 2002/0035929 A1 | 3/2002 | Kanba et al. | |
| 2002/0148356 A1 | 10/2002 | Lazaris et al. | |
| 2003/0200872 A1 | 10/2003 | Lin | |
| 2003/0222089 A1 | 12/2003 | Hale | |
| 2004/0005384 A1 * | 1/2004 | Cai | A47J 31/0678 |
| | | | 426/77 |
| 2004/0045443 A1 * | 3/2004 | Lazaris | B65D 85/8061 |
| | | | 99/279 |
| 2004/0060451 A1 * | 4/2004 | Leung | A47J 31/0573 |
| | | | 99/287 |
| 2004/0118290 A1 * | 6/2004 | Cai | A47J 31/4478 |
| | | | 99/275 |
| 2005/0051478 A1 * | 3/2005 | Karanikos | B65D 85/8061 |
| | | | 210/477 |
| 2005/0217213 A1 * | 10/2005 | Lozinski | A47J 31/44 |
| | | | 53/559 |
| 2005/0236323 A1 | 10/2005 | Oliver et al. | |
| 2005/0257695 A1 | 11/2005 | Pobranski et al. | |
| 2006/0159815 A1 | 7/2006 | Crook et al. | |
| 2006/0196364 A1 | 9/2006 | Kirschner | |
| 2007/0144356 A1 | 6/2007 | Rivera | |
| 2007/0151460 A1 * | 7/2007 | Beck | A47J 31/08 |
| | | | 99/279 |
| 2007/0163447 A1 * | 7/2007 | Tremblay | A47J 31/08 |
| | | | 99/295 |
| 2007/0186784 A1 * | 8/2007 | Liverani | A47J 31/0668 |
| | | | 99/295 |
| 2007/0201303 A1 * | 8/2007 | Kanzer | A47J 31/08 |
| | | | 366/129 |
| 2008/0245466 A1 * | 10/2008 | Schmal | A47J 36/16 |
| | | | 156/218 |

(56)             References Cited

U.S. PATENT DOCUMENTS

| | | | |
|---|---|---|---|
| 2008/0257165 A1* | 10/2008 | Bolzicco | B65D 85/8061 |
| | | | 99/295 |
| 2009/0229471 A1 | 9/2009 | Lun et al. | |
| 2009/0260521 A1* | 10/2009 | Tatsuno | A47J 31/0647 |
| | | | 99/279 |
| 2010/0000415 A1 | 1/2010 | Vanni | |
| 2010/0037780 A1* | 2/2010 | Pas | B65D 51/2807 |
| | | | 99/290 |
| 2010/0047419 A1* | 2/2010 | Boul | A47J 31/08 |
| | | | 426/433 |
| 2010/0083843 A1 | 4/2010 | Denisart et al. | |
| 2010/0303964 A1* | 12/2010 | Beaulieu | A47J 31/446 |
| | | | 426/77 |
| 2011/0274802 A1* | 11/2011 | Rivera | B65D 85/8061 |
| | | | 426/431 |
| 2012/0118880 A1* | 5/2012 | Wnek | B65D 5/4266 |
| | | | 220/660 |
| 2012/0148709 A1* | 6/2012 | Kamerbeek | B65D 85/8046 |
| | | | 426/115 |
| 2012/0207895 A1* | 8/2012 | Rivera | A47J 31/0689 |
| | | | 426/433 |
| 2012/0207896 A1* | 8/2012 | Rivera | A47J 31/0689 |
| | | | 426/433 |
| 2012/0258210 A1 | 10/2012 | Wong et al. | |
| 2012/0276264 A1 | 11/2012 | Rivera | |
| 2012/0285334 A1* | 11/2012 | DeMiglio | A47J 31/0689 |
| | | | 99/317 |
| 2012/0321748 A1* | 12/2012 | Otto | A47J 31/085 |
| | | | 99/302 R |
| 2012/0328739 A1* | 12/2012 | Nocera | A47J 31/3623 |
| | | | 426/77 |
| 2013/0040021 A1 | 2/2013 | Digiuni | |
| 2013/0055903 A1* | 3/2013 | Deuber | A47J 31/3623 |
| | | | 426/112 |
| 2013/0095212 A1* | 4/2013 | Beer | B65D 85/8061 |
| | | | 426/433 |
| 2013/0146495 A1 | 6/2013 | Fabozzi et al. | |
| 2013/0323370 A1 | 12/2013 | Gerbaulet et al. | |
| 2014/0008368 A1* | 1/2014 | Severini | B32B 27/36 |
| | | | 220/359.3 |
| 2014/0290493 A1* | 10/2014 | Rivera | A47J 31/407 |
| | | | 99/295 |
| 2015/0050391 A1 | 2/2015 | Rapparini | |
| 2015/0079240 A1 | 3/2015 | Lo Foro et al. | |
| 2015/0175347 A1* | 6/2015 | Empl | B65B 47/04 |
| | | | 426/433 |
| 2015/0359377 A1* | 12/2015 | Graham | A47J 31/3676 |
| | | | 99/283 |
| 2016/0068336 A1* | 3/2016 | Biesheuvel | A47J 31/407 |
| | | | 426/115 |
| 2016/0157660 A1* | 6/2016 | Rivera | A47J 31/0689 |
| | | | 99/323 |
| 2016/0198886 A1* | 7/2016 | Avins | A47J 31/002 |
| | | | 99/302 R |
| 2017/0021996 A1 | 1/2017 | Fahrni | |
| 2017/0043943 A1 | 2/2017 | Lamb et al. | |
| 2017/0107034 A1 | 4/2017 | Okamoto et al. | |
| 2017/0334623 A1 | 11/2017 | Gualandi et al. | |
| 2017/0355515 A1 | 12/2017 | Marcinkowski | |
| 2018/0110356 A1 | 4/2018 | Rivera | |
| 2018/0118450 A1 | 5/2018 | Trombetta et al. | |
| 2018/0319582 A1 | 11/2018 | Footz et al. | |
| 2018/0362198 A1 | 12/2018 | Volpe et al. | |
| 2019/0382191 A1 | 12/2019 | Orler | |
| 2020/0140187 A1 | 5/2020 | Vidal et al. | |
| 2022/0007877 A1 | 1/2022 | Rivera | |

* cited by examiner

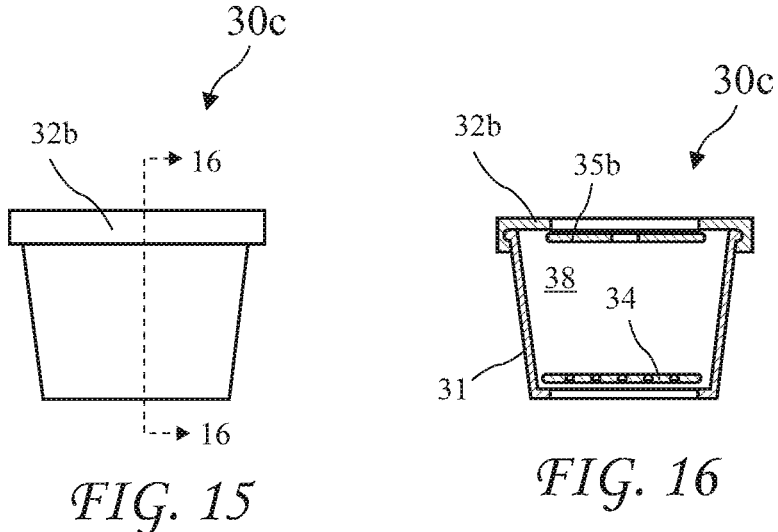
*FIG. 15*
*FIG. 16*
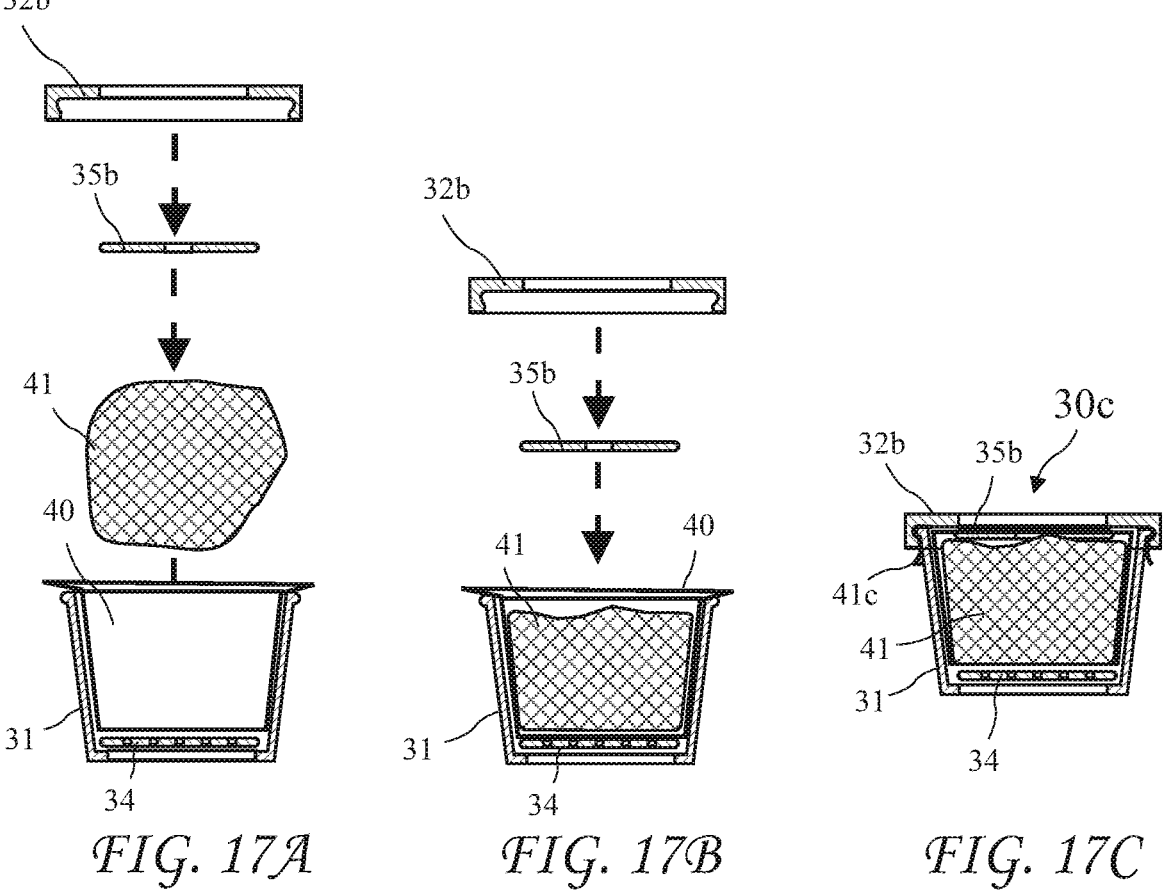
*FIG. 17A*
*FIG. 17B*
*FIG. 17C*

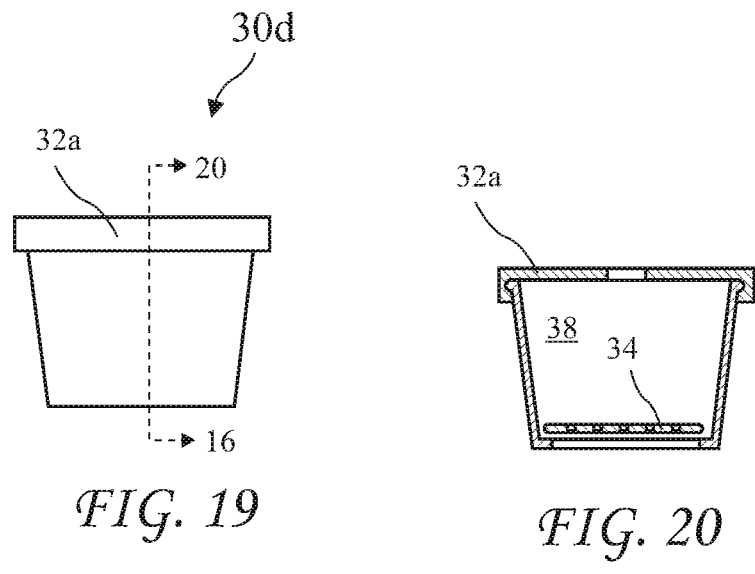
FIG. 19
FIG. 20
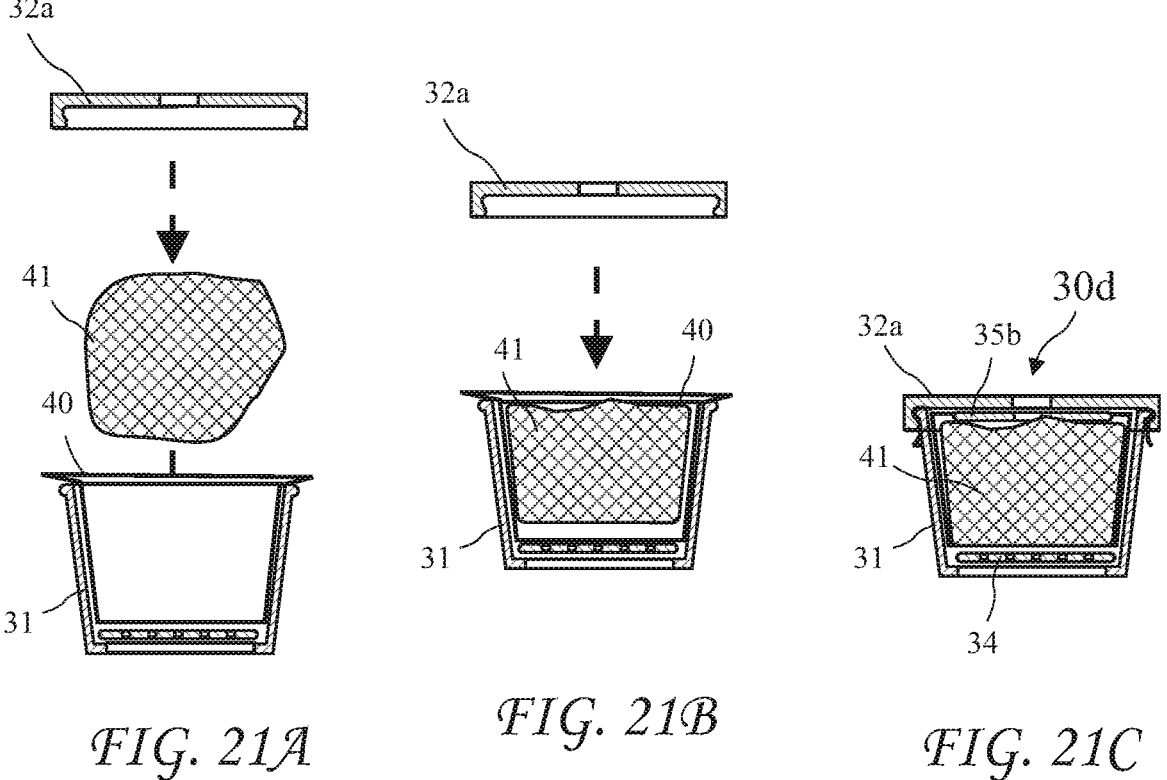
FIG. 21A
FIG. 21B
FIG. 21C

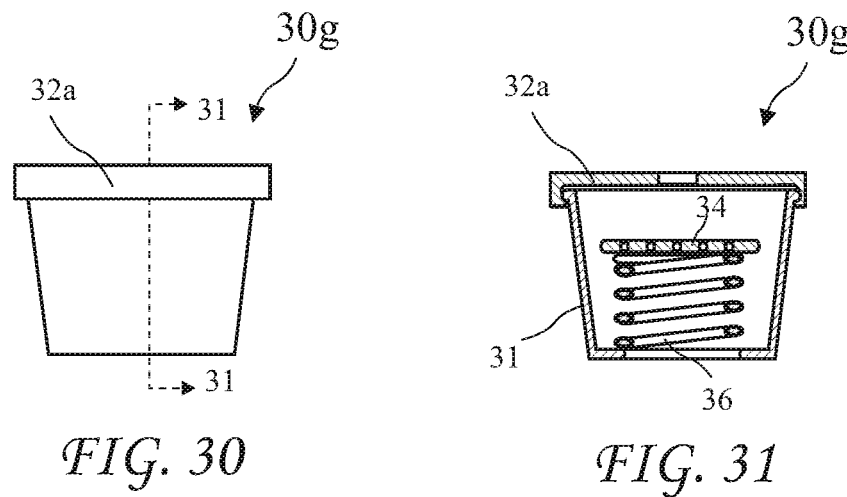
*FIG. 30*          *FIG. 31*
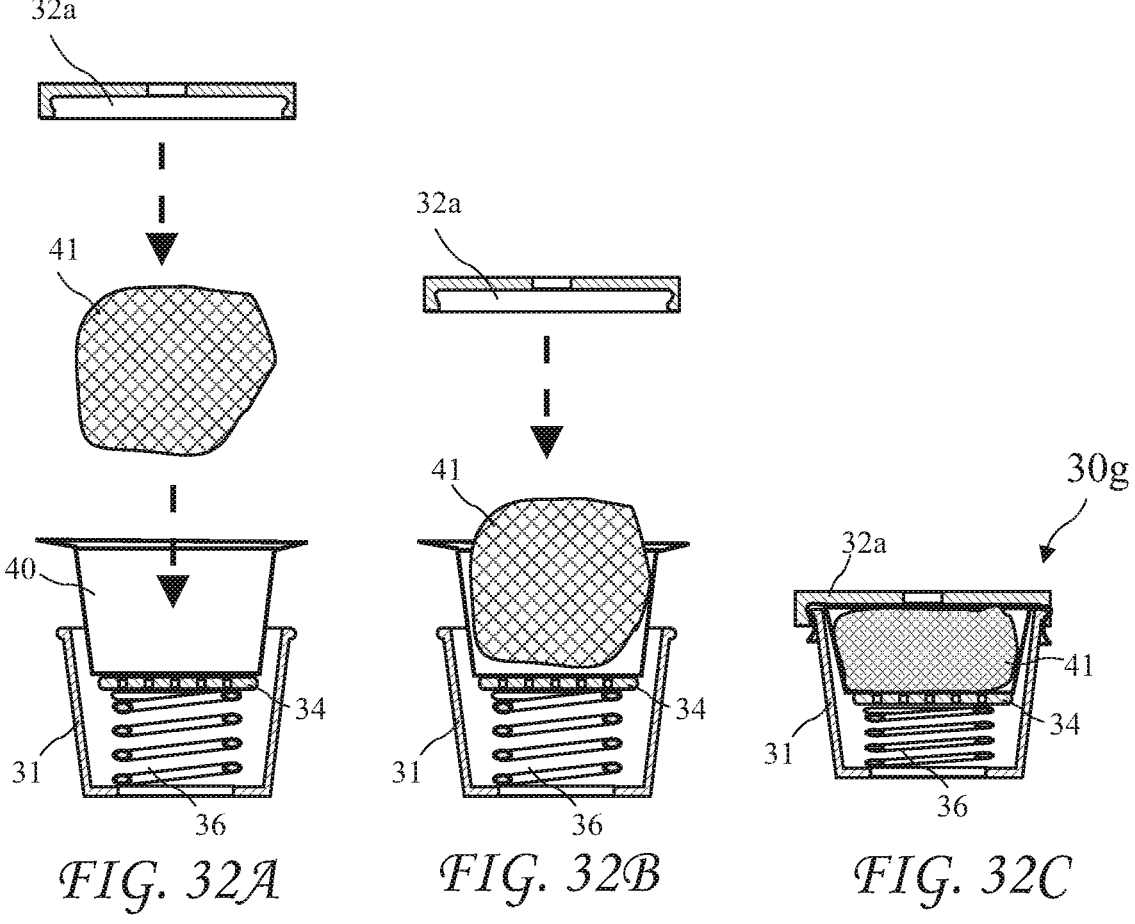
*FIG. 32A*          *FIG. 32B*          *FIG. 32C*

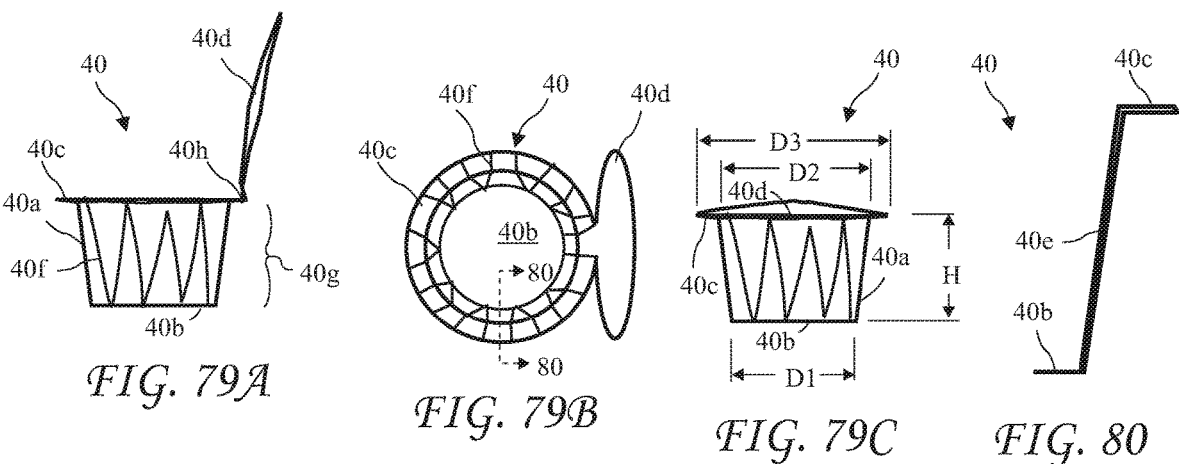
*FIG. 79A*          *FIG. 79B*          *FIG. 79C*          *FIG. 80*
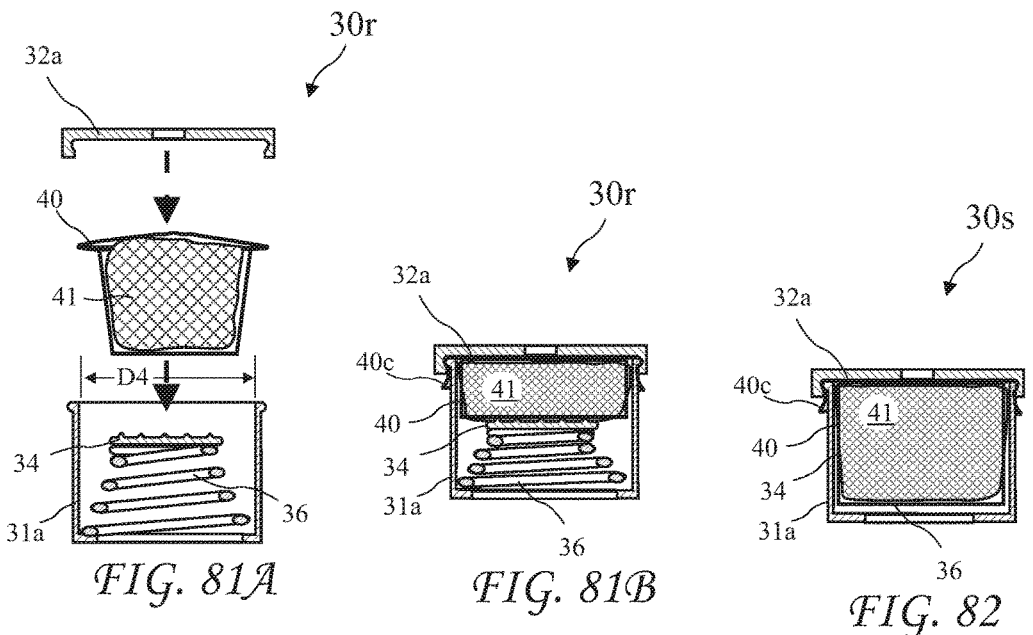
*FIG. 81A*          *FIG. 81B*          *FIG. 82*

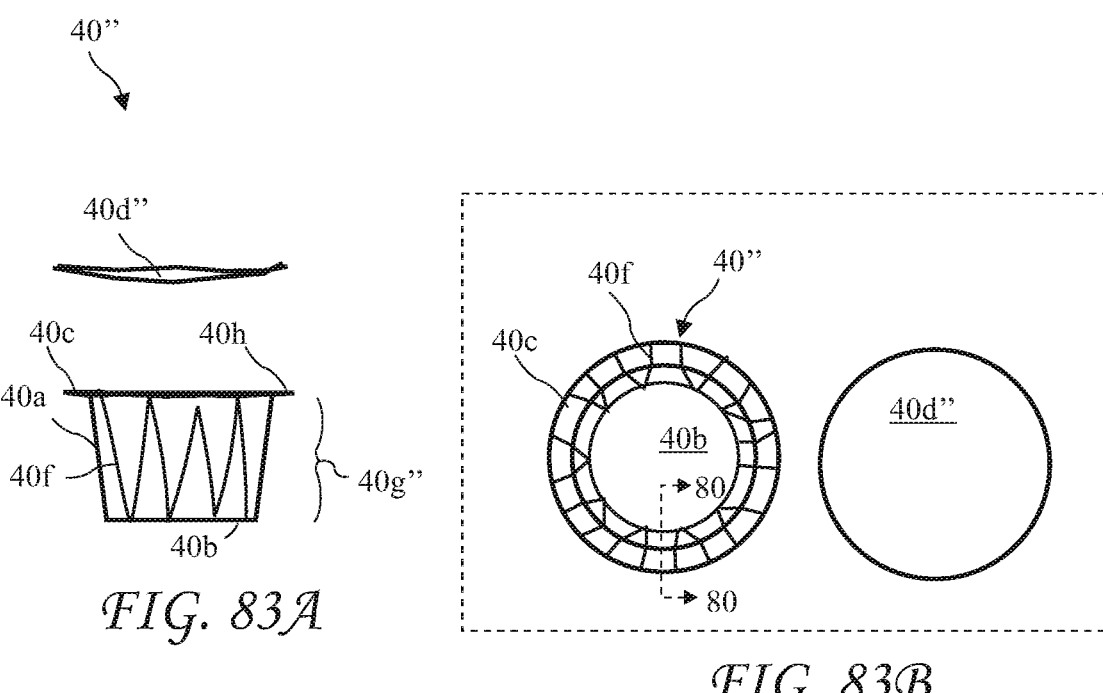
*FIG. 83A*
*FIG. 83B*
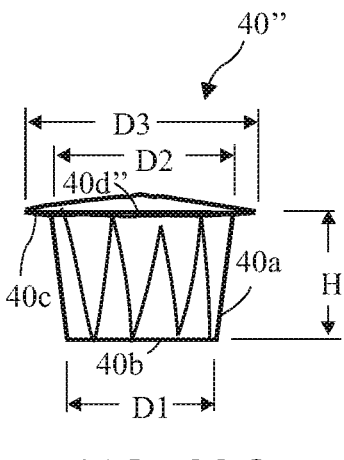
*FIG. 83C*

BEVERAGE BREWING MATERIAL FILTER CUP

CROSS-REFERENCE TO RELATED APPLICATIONS

This is a continuation-in-part of co-pending U.S. patent application Ser. No. 15/790,398, which was filed on Oct. 23, 2017, which in turn is a continuation-in-part of U.S. patent application Ser. No. 12/960,496, which was filed on Dec. 12, 2010, the entire disclosures of which are incorporated herein by this reference.

FIELD OF THE INVENTION

The invention relates generally to brewing beverages, and in particular to beverage brewing material holders.

BACKGROUND OF THE INVENTION

A brewed beverage is generally prepared in a beverage brewer by measuring an amount of ground brewing material into a brewing material filter, closing a lid over the ground brewing material, and providing a stream of hot water through the loosely packed ground brewing material. Unfortunately, water passes freely through the loosely packed ground brewing material and does not obtain the full flavor which might otherwise be obtained.

U.S. patent application Ser. No. 11/777,831 filed Jul. 13, 2007 for "Pod Adapter System for Single Service Beverage Brewers" by the present inventor overcomes this problem using pre-packaged brewing material in closed filter paper commonly called a pod, and inserting the closed pod into a pod holder including a tamping spring and bottom tamper for tamping the pod between the bottom tamper and a brewing material holder lid. Although the pod adapter of the '831 application works well for brewing material pods, it does not always hold the pod (or packer) firmly against the cover of the pad adapter and in some instances a needle for injecting water into the pod fails to puncture the pod.

BRIEF SUMMARY OF THE INVENTION

According to an aspect of the invention, a filter paper cup for a beverage pod includes a base (or receptacle) and can include a cover. The filter paper cup is formed by forming pleats in walls and a rim around the tops of the wall. Preferably, a heat seal filter paper is used and the pleats in the walls and rim are adhered by the heat to retain the shape. The base in inserted into a pod holder and brewing material is placed into the base. A cover can be positioned over the rim, and a lid is attached to the pod holder to sandwich the cover and rim to seal the pod. The cover, if present, is held taut by the lid of the pod holder to facilitate penetration of the cover by a needle to inject water into the pod.

According to another aspect of the invention, a beverage pod includes a receptacle, the receptacle including a concave cup having pleated walls and shaped to receive and hold a brewing material, and a pleated annular rim circling the concave cup; a cover hingedly attached to the annular rim, wherein the cover is configured to cover the upper opening and the annular rim of the receptacle. The receptacle and the cover are made of water-permeable material including a smaller diameter first portion forming the flat cover and a larger diameter second portion forming the receptacle and forming the concave cup of the receptacle from the larger diameter second portion creates the folds in the concave cup;

brewing material arranged in the receptacle; and the annular rim and edge of the cover disposed between a lid and body of a pod holder holding the annular rim and edge of the cover together to seal the pod. The pod cover is held taut by the cooperation of the lid and body of a pod holder to facilitate puncturing the pod cover to inject heated water into the pod is tamped by a spring arranged in the pod holder. The brewing material is retained in the pod solely by a lid attached to the pod holder to the base of the pod holder to sandwich the annular rim of the receptacle and the outer edge of the cover between the lid of the pod holder to the base of the pod holder.

According to another aspect of the invention, a method of manufacturing a package assembly and constructing a beverage pod includes: forming a package assembly comprising the steps of: providing water-permeable material; forming substantially circular lower and upper portions hingedly connected to each other, from the water-permeable material; shaping the lower portion to form a downward concave cup shaped receptacle to receive and hold a brewing material; forming an annular rim surrounding the top of the concave cup shape of the receptacle therein the upper portion is configured to fold along the hinge over the lower portion and onto the annular rim to provide a cover for the receptacle to form a single pod; and providing the package assembly to an individual user. Manufacturing a single beverage pod by the user includes the steps of: obtaining a pod holder; positioning the receptacle of the package assembly in a base of the pod holder; positioning the annular rim on a top edge of the base of the pod holder; filling the receptacle of the package assembly with the brewing material; folding the cover of the package assembly over the receptacle; and attaching a lid of the pod holder to the base of the pod holder to sandwich the annular rim of the receptacle and the outer edge of the cover between the lid of the pod holder to the base of the pod holder. The lid of the pod holder and the base of the pod holder sandwich the annular rim of the receptacle and the outer edge of the cover to hold the cover taut to facilitate puncturing the pod cover for injecting heated water into the pod and attaching a lid of the pod holder to the base of the pod holder to sandwich the annular rim of the receptacle and the outer edge of the cover between the lid of the pod holder to the base of the pod holder is the sole method of sealing the pod. Attaching a lid of the pod holder to the base of the pod holder to sandwich the annular rim of the receptacle and the outer edge of the cover between the lid of the pod holder to the base of the pod holder is the sole method of retaining the brewing material in the pod.

According to another aspect of the invention, a beverage brewing material filter cup includes a receptacle configured to receive and hold brewing material. The receptacle includes a base, a sidewall, and a rim. The base has a peripheral edge. The sidewall extends outward from the peripheral edge of the base and terminates in an opening. The rim surrounds the sidewall opening to form an outside perimeter of the receptacle. At least the base and/or the sidewall is at least partially constructed of a water-permeable material.

The receptacle can be formed from a single sheet of the water-permeable material. The single sheet of the water-permeable material can be pleated to form the shape of the receptacle.

The water-permeable material can be filter paper, and the receptacle can be formed from a sheet of the filter paper. The filter paper can include heat-sealable filter paper. The receptacle can include pleats that are heat-sealed pleats.

The water-permeable material can be a mesh material. The receptacle can be formed from a sheet of the mesh material. The mesh material can include, for example, a nylon mesh and/or a metal mesh.

The beverage brewing material filter cup can also include a cover having a diameter no smaller than an inner diameter of the rim.

The sidewall of the receptacle can be perpendicular to the receptacle base.

The sidewall of the receptacle can have a generally frusto-conical shape.

The sidewall and the rim can be pleated. The pleated rim can include pleats common to the pleated sidewall.

The sidewall can have a circular cross-section, in which case the rim can be an annular rim. The annular rim can have an inner diameter of, for example, about 1.625 inches, and an outer diameter of, for example, about 2.125 inches. The base can have a diameter of, for example, about 1.25 inches and the sidewall can have a height of, for example, about one inch.

The rim can be made of a rigid material.

According to another aspect of the invention, a beverage cartridge includes the beverage brewing material filter cup, a cover fixed to the rim, and brewing material disposed in the receptacle.

BRIEF DESCRIPTION OF THE DRAWINGS

The above and other aspects, features and advantages of the invention will be more apparent from the following more particular description thereof, presented in conjunction with the following drawings wherein:

FIG. 118 is a cross-sectional side view of an exemplary brewing material holder according to the invention taken along line 10-10 of FIG. 9 showing an exemplary brewing material holder with an exemplary holder lid, tamping spring and top tamper, and a portion of brewing material, according to the invention.

FIG. 15 is a side view of an exemplary brewing material holder according to the invention.

FIG. 16 is a cross-sectional side view of an exemplary brewing material holder according to the invention taken along line 16-16 of FIG. 15.

FIG. 17A is a cross-sectional side view of an exemplary brewing material holder according to the invention taken along line 16-16 of FIG. 15 showing the portion of brewing material above the brewing material holder and the top tamper and the holder lid ready to attach to the brewing material holder, according to the invention.

FIG. 17B is a cross-sectional side view of an exemplary brewing material holder according to the invention taken along line 16-16 of FIG. 15 showing the portion of brewing material in the brewing material holder, and the top tamper and the holder lid ready to attach to the brewing material holder, according to the invention.

FIG. 17C is a cross-sectional side view of an exemplary brewing material holder according to the invention taken along line 16-16 of FIG. 15 showing the portion of brewing material in the brewing material holder, and the bottom tamper, the top tamper, and the holder lid attached to the brewing material holder, according to the invention.

FIG. 19 is a side view of an exemplary brewing material holder according to the invention.

FIG. 20 is a cross-sectional side view of an exemplary brewing material holder according to the invention taken along line 20-20 of FIG. 19.

FIG. 21A is a cross-sectional side view of an exemplary brewing material holder according to the invention taken along line 20-20 of FIG. 19 showing the brewing material holder with the bottom tamper, a portion of brewing material, and the holder lid ready to attach, according to the invention.

FIG. 21B is a cross-sectional side view of an exemplary brewing material holder according to the invention taken along line 20-20 of FIG. 19 showing the brewing material holder with the bottom tamper, a portion of brewing material in the brewing material holder, and the holder lid ready to attach, according to the invention.

FIG. 21C is a cross-sectional side view of an exemplary brewing material holder according to the invention taken along line 20-20 of FIG. 19 showing the brewing material holder with the bottom tamper, a portion of brewing material in the brewing material holder, and the holder lid attached, according to the invention.

FIG. 30 is a side view of an exemplary brewing material holder according to the invention.

FIG. 31 is a cross-sectional side view of an exemplary brewing material holder according to the invention taken along line 31-31 of FIG. 30.

FIG. 32A is a cross-sectional side view of an exemplary brewing material holder according to the invention taken along line 31-31 of FIG. 30 showing the portion of brewing material above the brewing material holder, and the holder lid ready to attach to the holder body, according to the invention.

FIG. 32B is a cross-sectional side view of an exemplary brewing material holder according to the invention taken along line 31-31 of FIG. 30 showing the portion of brewing material in the brewing material holder, and the holder lid ready to attach to the holder body. according to the invention.

FIG. 32C is a cross-sectional side view of an exemplary brewing material holder according to the invention taken along line 31-31 of FIG. 30 showing the portion of brewing material in the brewing material holder, and the holder lid attached to the holder body and the brewing material tamped between the bottom tamper and spring and the holder lid, according to the invention.

FIG. 62A shows an exemplary pre-packaged brewing material for use in the beverage brewer according to the invention.

FIG. 62B shows a cut away view of an exemplary pre-packaged brewing material for use in the beverage brewer according to the invention showing the brewing material.

FIG. 62C shows an exemplary pre-packaged brewing material in a brewing material holder having a window to expose a bar code.

FIG. 62D shows an exemplary pre-packaged brewing material in the brewing material holder having the window to expose a bar code in the cavity of a beverage brewer including a bar code reader.

FIG. 62E shows an exemplary brewing material holder having the bar code on the brewing material holder in the cavity of a beverage brewer including the bar code reader FIG. 63A is a side view of an exemplary filter cup according to the invention.

FIG. 63B is a top view of an exemplary filter cup according to the invention.

FIG. 64 is a side view of an exemplary multi-mode beverage brewer according to the invention.

FIG. 65A is a front view of an exemplary multi-mode beverage brewer according to the invention with a carafe positioned for receiving a volume of beverage.

FIG. 65B is a side view of an exemplary multi-mode beverage brewer according to the invention with the carafe positioned for receiving a volume of beverage.

FIG. 66A is a front view of an exemplary multi-mode beverage brewer according to the invention with a beverage cup positioned for receiving a volume of beverage.

FIG. 66B is a side view of an exemplary multi-mode beverage brewer according to the invention with the beverage cup positioned for receiving a volume of beverage.

FIG. 67A is a front view of an exemplary single cup adapter according to the invention.

Figures 67A, 67B, 67C, 67D, 68, 69A, 69B:
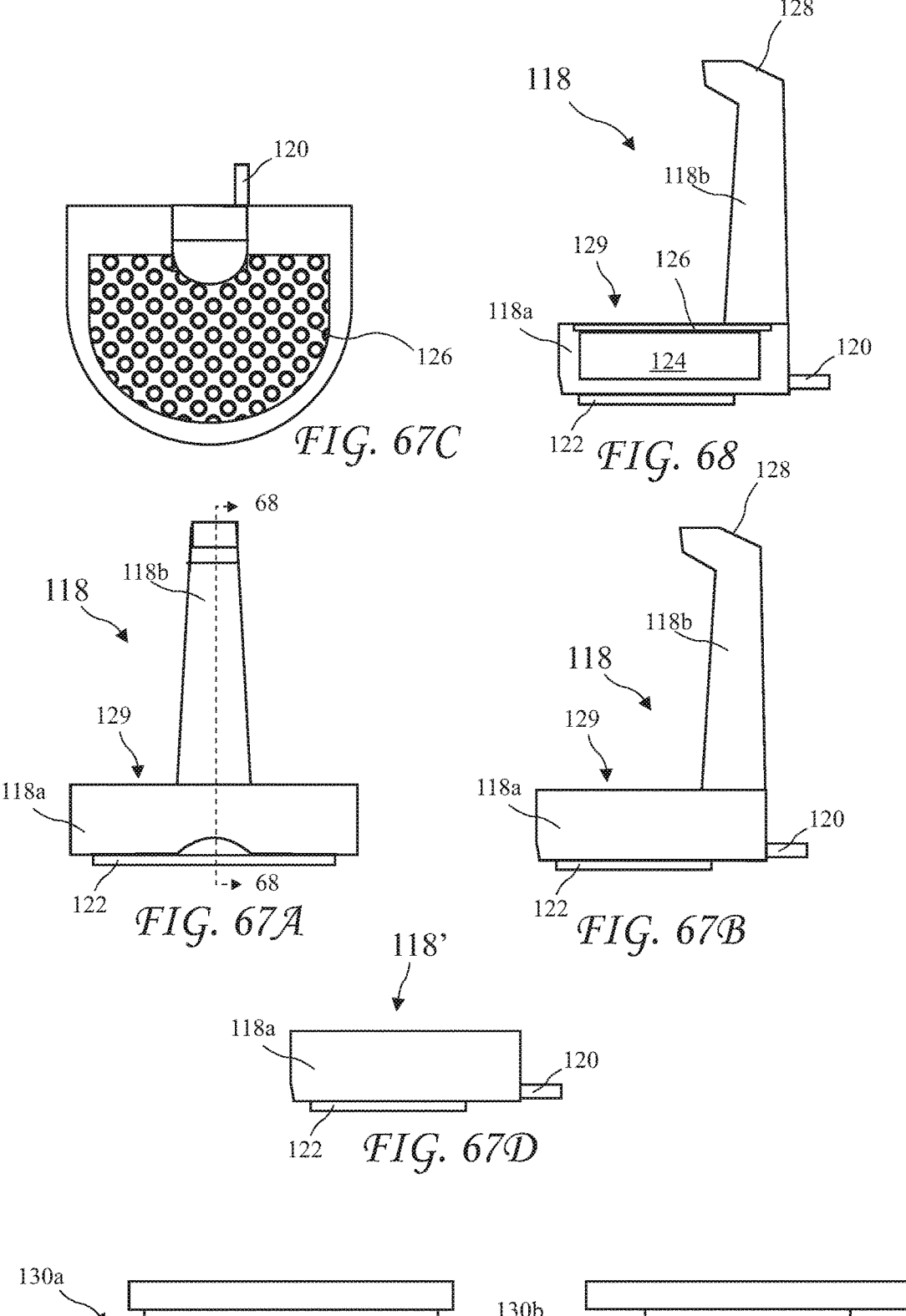

FIG. 67B is a side view of an exemplary single cup adapter according to the invention.

FIG. 67C is a top view of an exemplary single cup adapter according to the invention.

FIG. 67D is a side view of an exemplary single cup adapter according to the invention.

FIG. 68 is a cross-sectional view of an exemplary single cup adapter according to the invention taken along line 68-68 of FIG. 67A.

FIG. 69A is a side view of an exemplary multi-serving brewing material holder according to the invention for use in the multi-mode beverage brewer for making several cups of beverage.

FIG. 69B is a side view of an exemplary single-serving brewing material holder according to the invention for use in the multi-mode beverage brewer for making one cup of beverage.

Figures 70, 71A, 71B, 72:
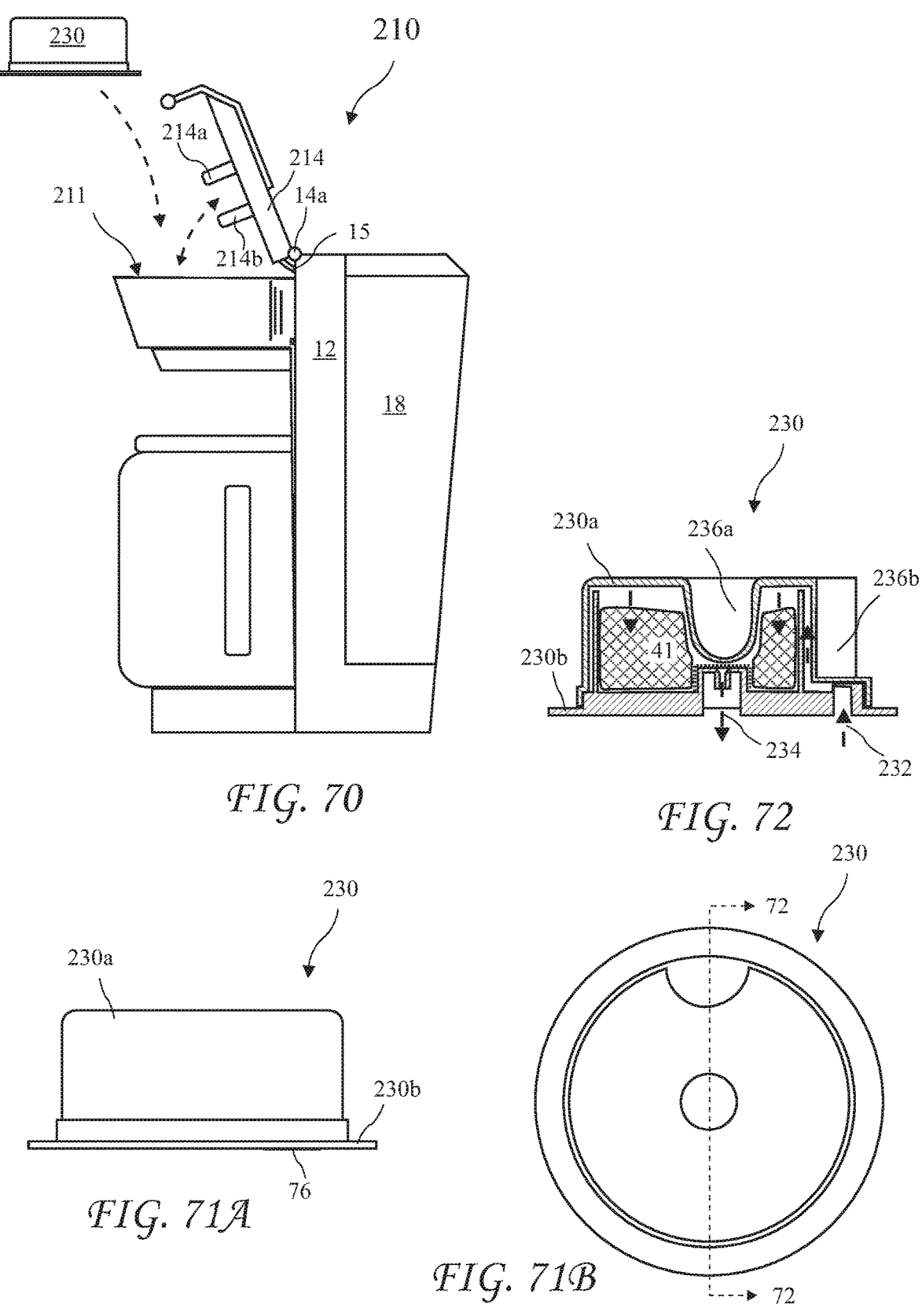

FIG. 70 shows an exemplary beverage brewer and an exemplary reuseable cartridge according to the invention.

FIG. 71A shows a side view of an exemplary reuseable cartridge according to the invention.

FIG. 71B shows a top view of an exemplary reuseable cartridge according to the invention.

FIG. 72 show a cross-sectional view of an exemplary reuseable cartridge according to the invention taken along line 72-72 of FIG. 71B.

Figures 73A, 73B, 74, 75A, 75B, 76:
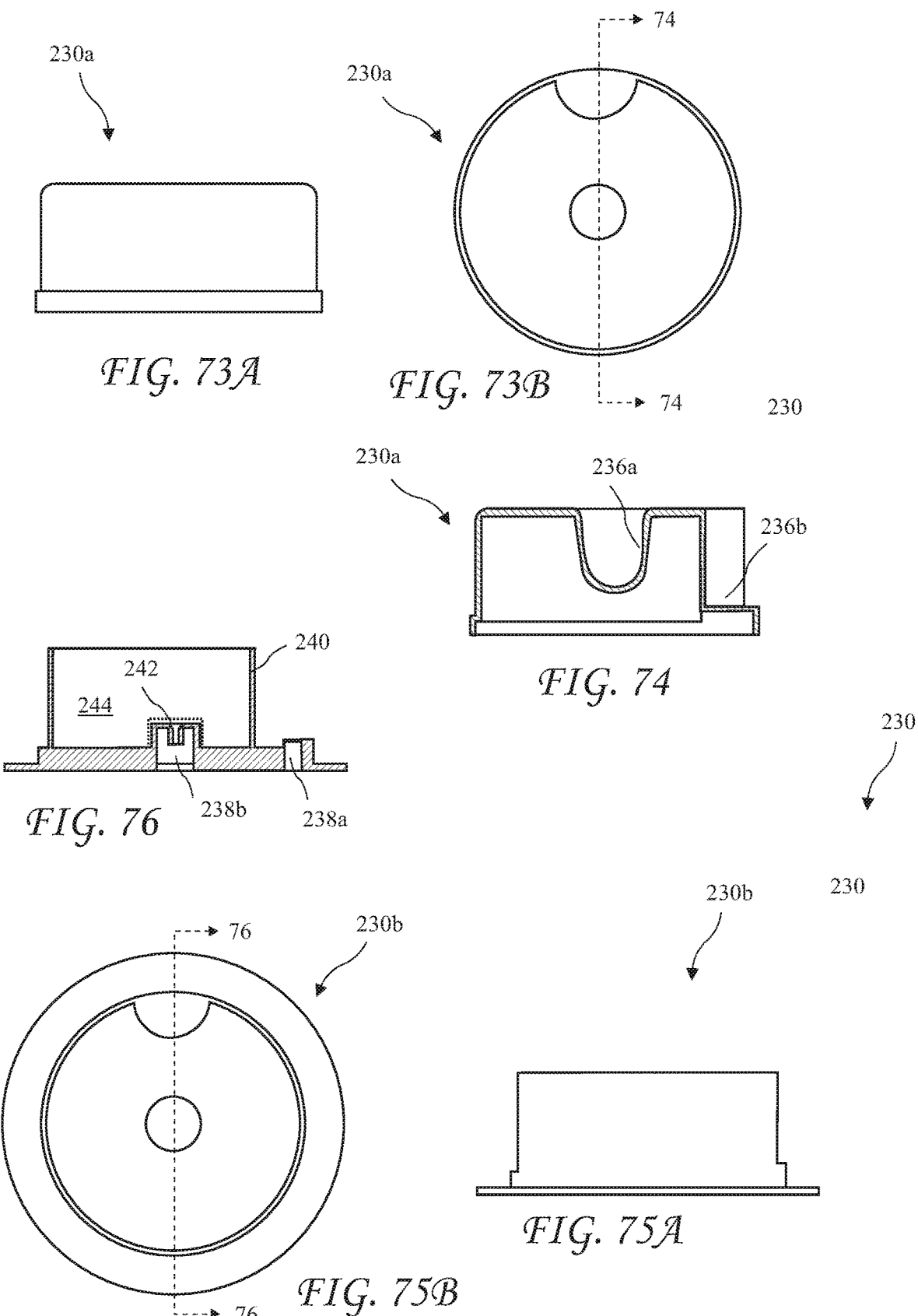

FIG. 73A shows a side view of a cover of an exemplary reuseable cartridge according to the invention.

FIG. 73B shows a top view of the cover of an exemplary reuseable cartridge according to the invention.

FIG. 74 show a cross-sectional view of an exemplary cover of the reuseable cartridge according to the invention taken along line 74-74 of FIG. 73B.

FIG. 75A shows a side view of a base of an exemplary reuseable cartridge according to the invention.

FIG. 75B shows a top view of the base of an exemplary reuseable cartridge according to the invention.

FIG. 76 show a cross-sectional view of the base of an exemplary reuseable cartridge according to the invention taken along line 76-76 of FIG. 75B.

Figures 77A, 77B, 78A, 78B:
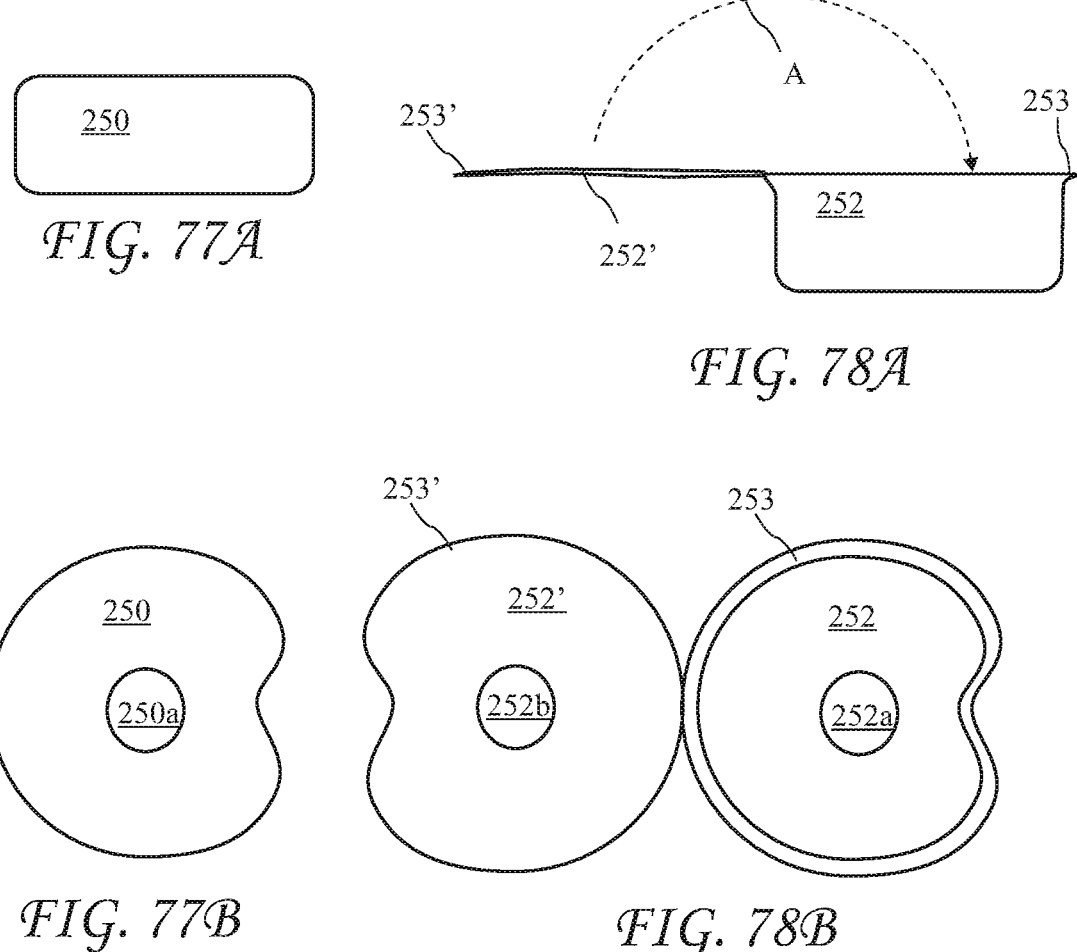

FIG. 77A shows a side view of an exemplary brewed beverage pod for use in the reuseable cartridge according to the invention.

FIG. 77B shows a top view of an exemplary brewed beverage pod for use in the reuseable cartridge according to the invention.

FIG. 78A shows a side view of exemplary filter paper for use in the reuseable cartridge according to the invention.

FIG. 78B shows a top view of exemplary filter paper for use in the reuseable cartridge according to the invention.

FIG. 79A shows a side view of an exemplary filter paper cup according to the present with the folding paper lid open.

FIG. 79B shows a top view of an exemplary filter paper cup according to the present.

FIG. 79C shows a second side view of an exemplary filter paper cup with the folding paper lid closed FIG. 80 is a cross-sectional view of an exemplary filter paper cup taken along line 80-80 of FIG. 79B showing folds according to the present.

FIG. 81A is a cross-sectional side view of an exemplary brewing material holder according to the invention showing the brewing material holder with the tamping spring and bottom tamper, the filter paper cup containing a portion of brewing material, and the holder lid ready to attach to a holder body according to the invention.

FIG. 81B is a cross-sectional side view of an exemplary brewing material holder according to the invention showing the brewing material holder with the tamping spring and bottom tamper, the portion of brewing material in the filter paper cup, and the holder lid attached to the holder body with the rim of the filter paper cup sandwiched between the lid and brewing material holder and the tamping spring and bottom tamper pushing the filter paper cup against the lid according to the invention.

FIG. 82 shows a cross-sectional view of an exemplary brewing material holder according to the invention showing without the tamping spring.

FIG. 83A shows a side view of an exemplary filter paper cup with a separate receptacle and paper lid according to the present.

FIG. 83B shows a top view of an exemplary filter paper cup with the separate receptacle and paper lid according to the present.

FIG. 83C shows a second side view of an exemplary filter paper cup with the separate paper lid arranged on the receptacle.

Corresponding reference characters indicate corresponding components throughout the several views of the drawings.

DETAILED DESCRIPTION OF THE INVENTION

The following description of the invention is not intended to be limiting, but is made for the purpose of describing one or more preferred embodiments of the invention. The scope of the invention should be determined with reference to the claims.

Figures 1A, 1B, 1C:
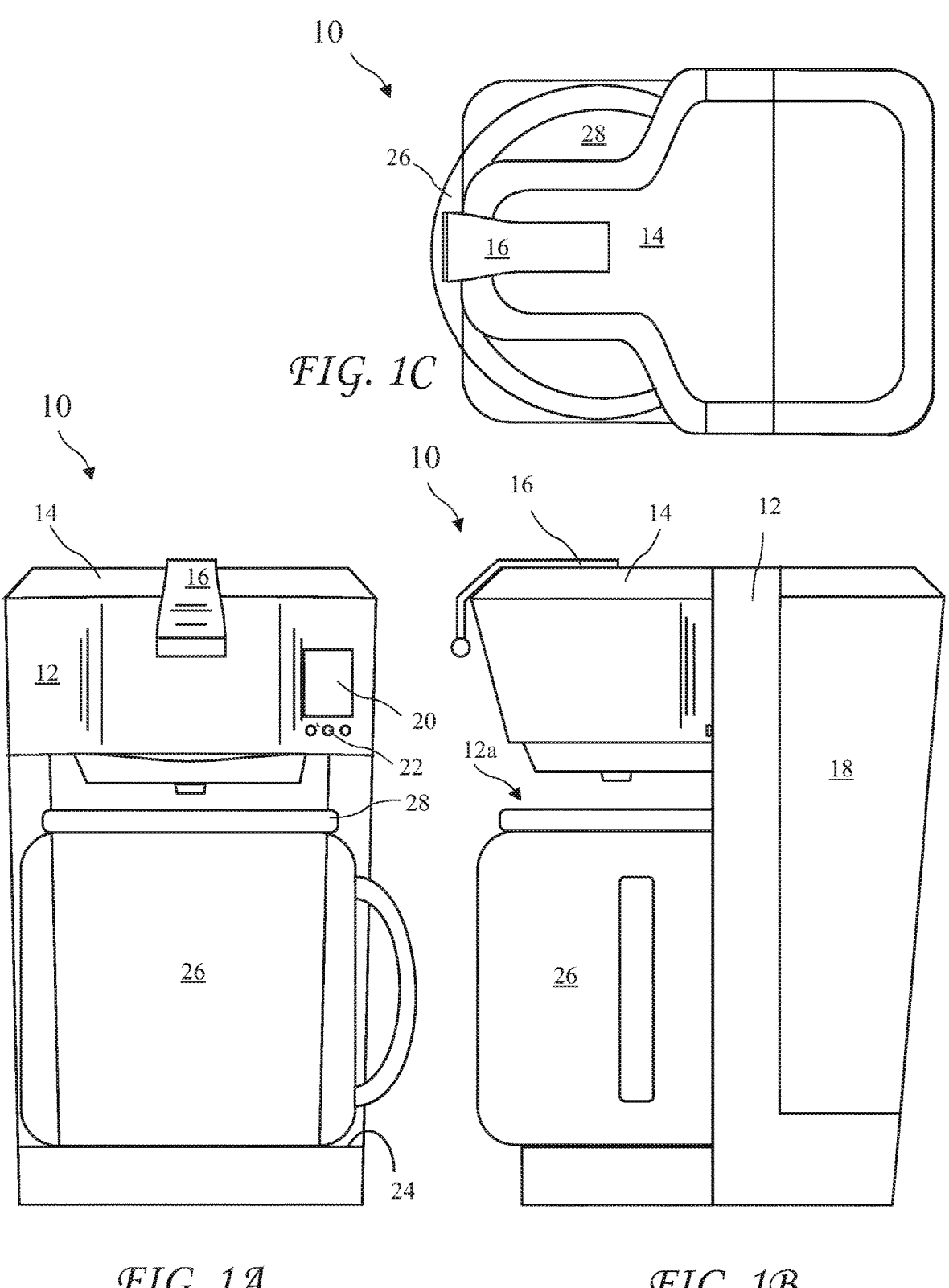
FIG. 1A is a front view of an exemplary beverage brewer according to the invention.
FIG. 1B is a side view of an exemplary beverage brewer according to the invention.
FIG. 1C is a top view of an exemplary beverage brewer according to the invention.

Referring to FIGS. 1A-C, an exemplary beverage brewer 10 includes a body 12, an opening lid 14, a lid handle 16, a water container 18, a display 20, controls 22, a platform 24 and a mouth 12*a*. A pitcher 26, which can have a pitcher lid 28, can be arranged on the platform 24 inside the mouth 12*a*. The beverage brewer 10 provides a flow of water through beverage brewing material, such as coffee grounds, to produce a brewed beverage. The flow of water can be heated by one of any known means, for example, an electrical heating coil or a conductive coating on tubing carrying the water.

Figures 2, 2A:
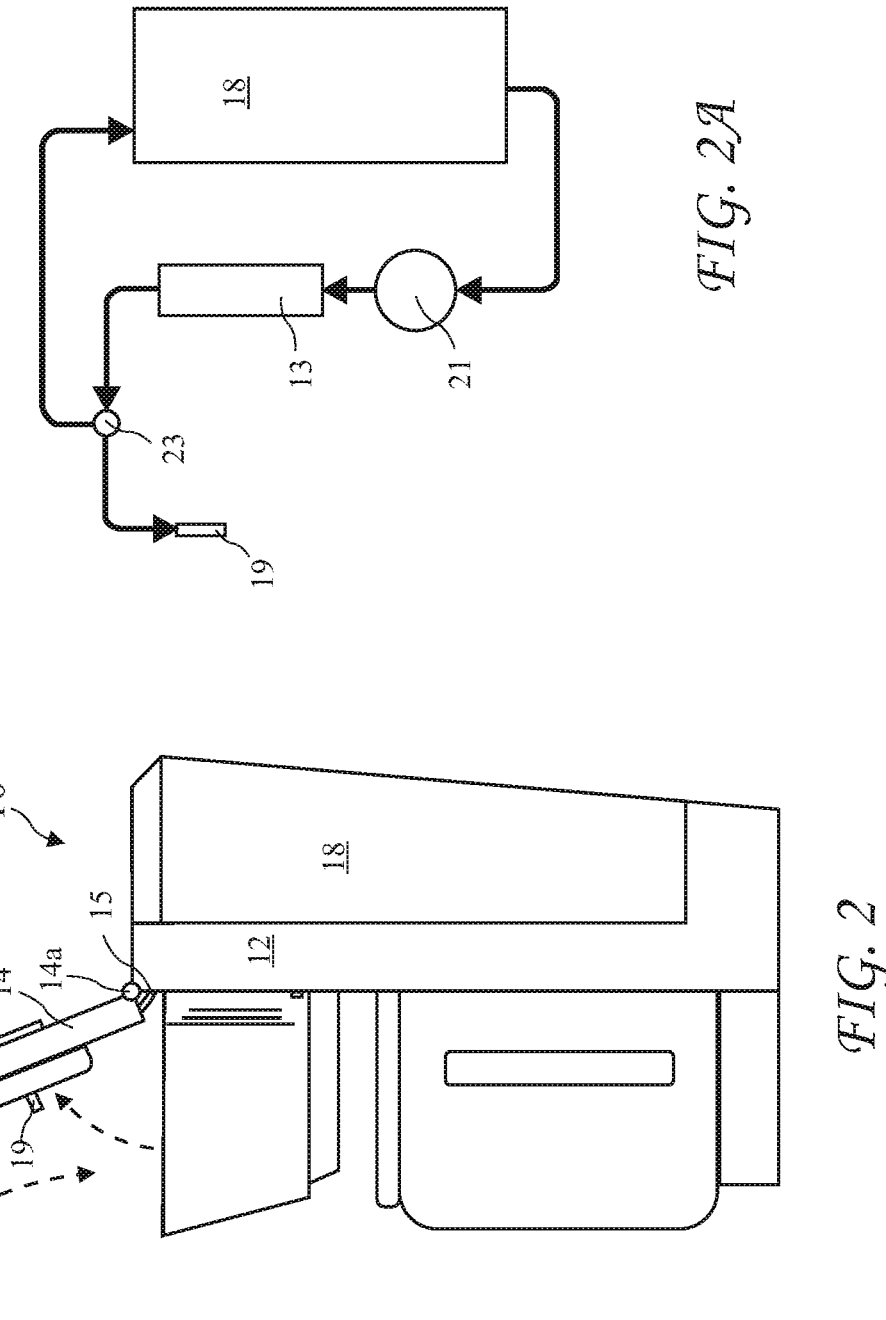
FIG. 2 is a side view of an exemplary beverage brewer with an open lid according to the invention.
FIG. 2A is a functional diagram of an exemplary beverage brewer.

A side view of the beverage brewer 10 with an open lid 14 allowing placement of a brewing material holder 30 according to the invention inside the beverage brewer 10 is shown in FIG. 2. The lid 14 includes a lid hinge 14*a* and a water tube 15 that carries heated water into the lid 14. A pad 17 is arranged on a bottom surface of the lid 14 and presses against the brewing material holder 30 when the lid 14 is closed, and in cooperation with other structure discloses hereafter, tamps brewing material contained in the brewing material holder 30. A nozzle 19 extending down from the closed lid 14 directs the flow of hot water into the brewing material holder 30.

A functional diagram of the beverage brewer 10 is shown in FIG. 2A. The preferred beverage brewer 10 includes the water tank 18, a water pump 21, a heater 13, a check valve 23, and the nozzle 18. The water heater 13 may include a heating coil or a resistive coating or any other mechanism for heating water. The check valve 23 limits the water pressure at the nozzle 19 by returning some of the water flow to the water tank 18 if necessary. Although a water pump 21 is a preferred mechanism for providing a flow of water to the nozzle 19, a beverage brewer using any mechanism to provide a forced flow of water is intended for use within the scope of the invention.

Figures 3, 4, 5A, 5B, 5C, 5D, 6, 7A, 7B, 7C:
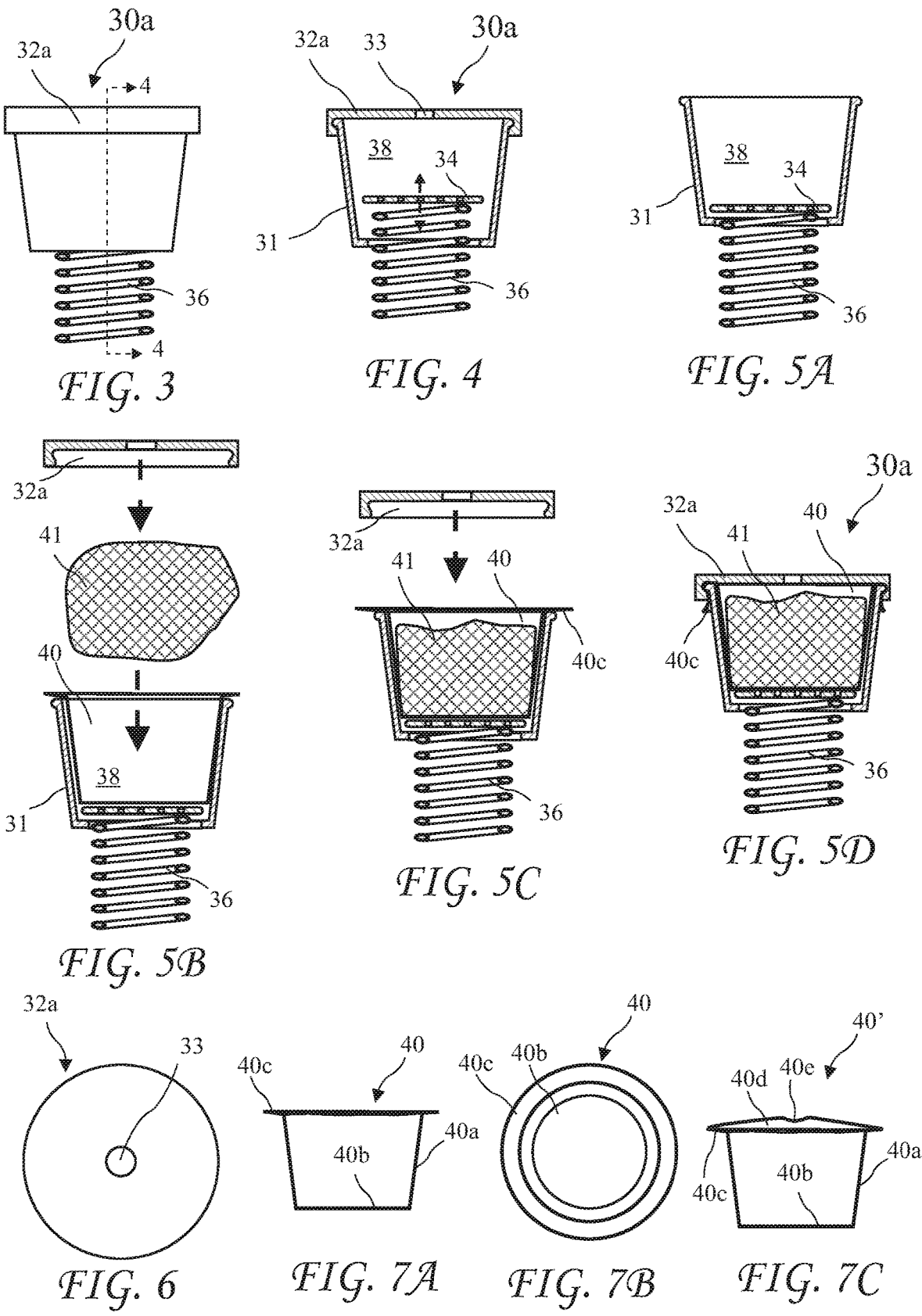
FIG. 3 is a side view of an exemplary brewing material holder according to the invention.
FIG. 4 is a cross-sectional side view of an exemplary brewing material holder according to the invention taken along line 4-4 of FIG. 3.
FIG. 5A is a cross-sectional side view of an exemplary brewing material holder according to the invention taken along line 4-4 of FIG. 3 with an exemplary tamping spring and bottom tamper according to the invention.
FIG. 5B is a cross-sectional side view of an exemplary brewing material holder according to the invention taken along line 4-4 of FIG. 3 with an exemplary tamping spring and bottom tamper, brewing material, and an exemplary holder lid according to the invention.
FIG. 5C is a cross-sectional side view of an exemplary brewing material holder according to the invention taken along line 4-4 of FIG. 3 with an exemplary tamping spring and bottom tamper, brewing material in the brewing material holder, and an exemplary holder lid according to the invention.
FIG. 5D is a cross-sectional side view of an exemplary brewing material holder according to the invention taken along line 4-4 of FIG. 3 with an exemplary tamping spring and bottom tamper, brewing material in the brewing material holder, and an exemplary holder lid attached to an exemplary brewing material holder body, according to the invention.
FIG. 6 is a top view of an exemplary holder lid.
FIG. 7A is a side view of an exemplary filter paper cup according to the invention.
FIG. 7B is a top view of an exemplary filter paper cup according to the invention.
FIG. 7C shows an exemplary filter paper cup with a lid.

Referring to FIGS. 3 and 4, an exemplary brewing material holder 30*a* according to the invention includes a holder body 31, a holder lid 32*a*, a bottom tamper 34, and a tamping spring 36. A volume (or brewing material holder interior) 38 is provided inside the brewing material holder 30*a*, configured to receive loose brewing material 41. A passage 33 in the lid 32*a* is provided for the nozzle 19 (see FIG. 2).

Referring to FIGS. 5A-d, an empty brewing material holder 30*a* is shown with the tamping spring 36 and the bottom tamper 34 ready for filling, as well as with the tamping spring 36 and bottom tamper 34, a portion of loose brewing material 41, and the holder lid 32*a* ready to attach, the brewing material holder 30*a* with the tamping spring 36 and bottom tamper 34, a portion of brewing material in the volume 38, and the holder lid 32*a* ready to attach, and the brewing material holder 30*a* with the tamping spring 36 and bottom tamper 34, a portion of loose brewing material 41 in the volume 38, and the holder lid 32*a* attached to the brewing material holder 30*a*, respectively. As shown in FIG. 6, a passage 33 is provided in the holder lid 32*a* for the nozzle 19 (see FIG. 2).

As shown in FIGS. 7A and B, a filter paper cup 40 includes a bottom 40*b*, sides 40*a*, and a rim 40*c*. The rim 40*c* is configured to rest on a top edge of the holder body 31 and to be held between the holder cap and body when the cap is placed on the body, thereby preventing or restricting the escape of brewing material 41 from the cup 40 when hot water flows into the brewing material holder 30*a*.

An embodiment of the filter paper cup 40' having a folding paper lid 40*d* is shown in FIG. 7C. The lid 40*d* of the filter paper cup 40' can be folded over the cup 40' after loose brewing material is placed in the cup. The lid 40*d* preferably includes a perforation 40*e* centered on the lid 40*d* allowing the nozzle 19 to enter and/or inject the hot flow of water into the tamped brewing material 41.

The filter cup can be made from any of several materials including filter paper, nylon mesh, steel mesh, or any liquid-permeable material suitable for filtration. If not made of filter paper, the filter cup can be reusable. The rim of the filter cup can be made from filter material, or from a rigid material such as plastic, nylon, metal, wood, or bamboo.

Figures 8A, 8B, 8C:
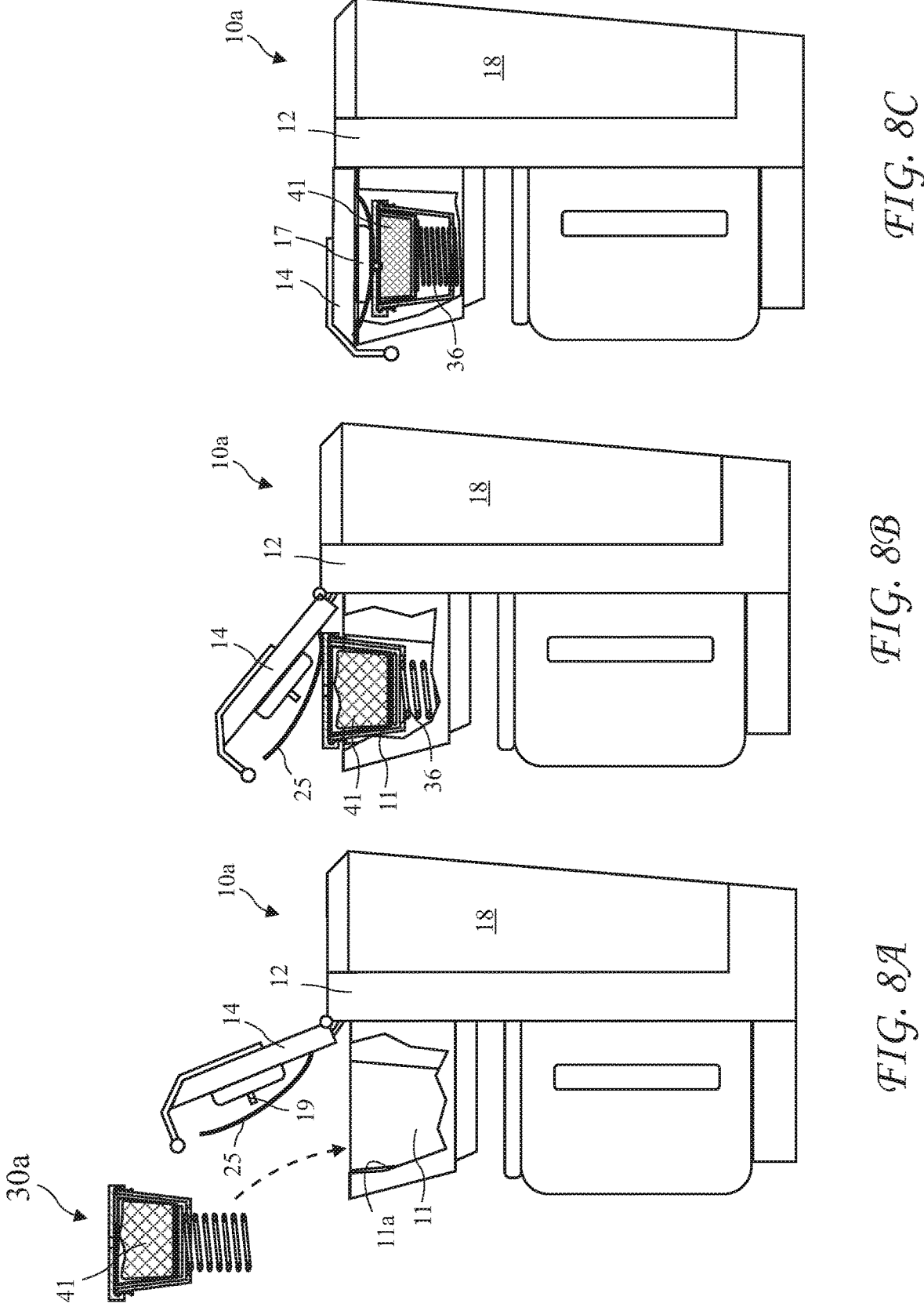
FIG. 8A shows an exemplary brewing material holder ready for insertion into an exemplary beverage brewer.
FIG. 8B shows an exemplary brewing material holder inserted into an exemplary beverage brewer before tamping.
FIG. 8C shows an exemplary brewing material holder inserted into an exemplary beverage brewer after tamping.

The brewing material holder 30*a* is shown ready for insertion into an exemplary beverage brewer 10*a*, inserted into the beverage brewer 10 before tamping the brewing material 41, and in the beverage brewer 10 after tamping the brewing material 41, in FIGS. 8A-C, respectively. The beverage brewer includes a cavity 11 configured to accept the brewing material holder and has walls 11*a* configured to align the brewing material holder in the beverage brewer. When the lid 14 is closed, the pad 17 on the bottom of the lid 14 and/or arms 25 attached to the bottom of the lid 25, push the brewing material holder 30*a* down over the tamping spring 36 and the brewing material 41 is tamped between the lid 32*a* and the bottom tamper 34. The arms 25 push the brewing material holder 30*a* down ahead of the nozzle 19, thereby seating the brewing material holder 30*a* in the cavity 11 for alignment of the nozzle 10 with the passage 33 in the lid 32*a*.

Figures 9, 10, 11A, 11B, 11C, 11D, 12, 13:
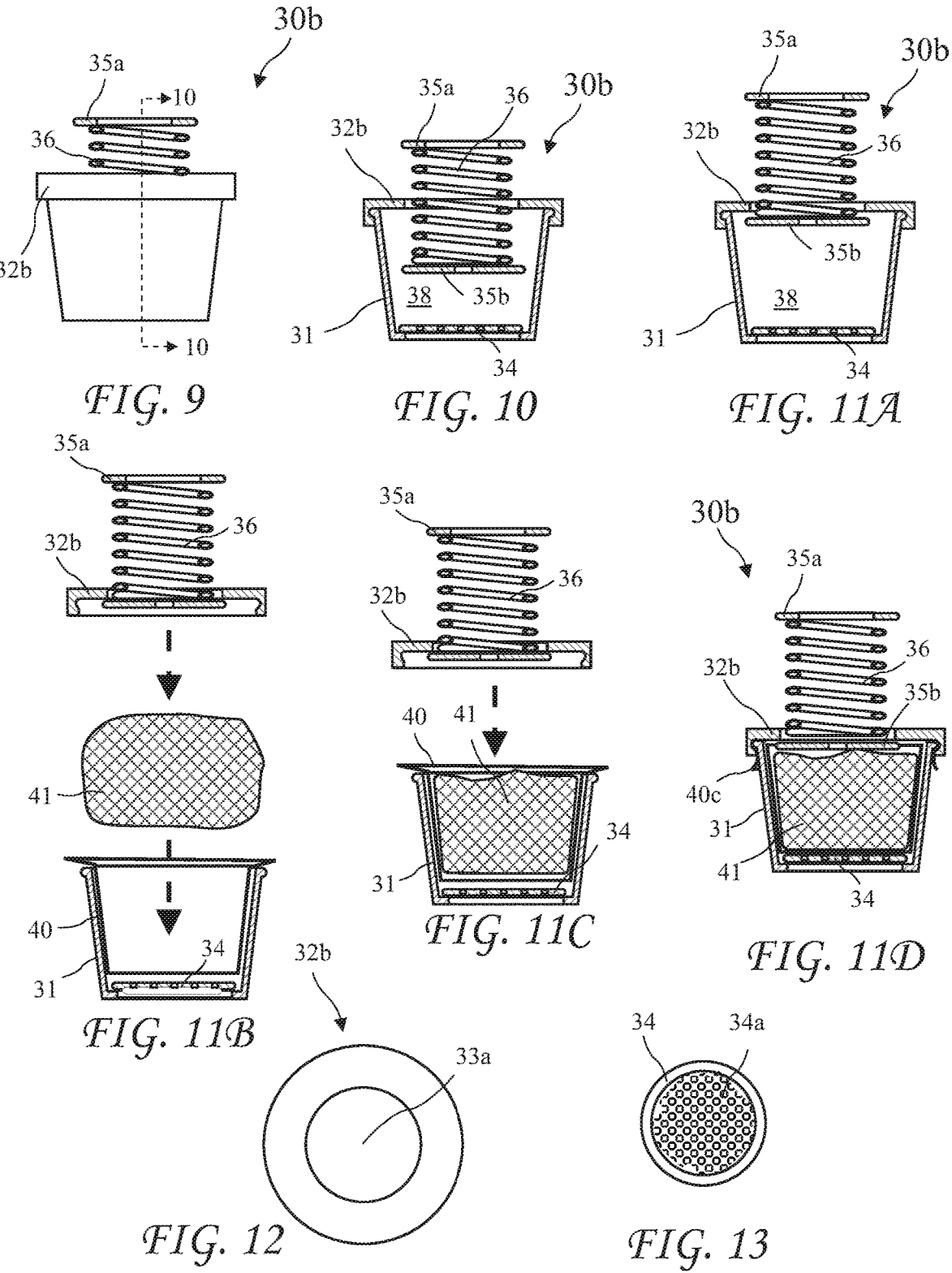
FIG. 9 is a side view of an exemplary brewing material holder according to the invention.
FIG. 10 is a cross-sectional side view of an exemplary brewing material holder according to the invention taken along line 10-10 of FIG. 9.
FIG. 11A is a cross-sectional side view of an exemplary brewing material holder according to the invention taken along line 10-10 of FIG. 9 showing an exemplary empty brewing material holder with an exemplary tamping spring and top tamper according to the invention.
FIG. 11C is a cross-sectional side view of an exemplary brewing material holder according to the invention taken along line 10-10 of FIG. 9 showing a portion of untamped brewing material in the brewing material holder, according to the invention.
FIG. 11D is a cross-sectional side view of an exemplary brewing material holder according to the invention taken along line 10-10 of FIG. 9 showing the portion of brewing material in the brewing material holder, according to the invention.
FIG. 12 is a top view of an exemplary holder lid.
FIG. 13 is a top view of an exemplary bottom tamper.

Referring to FIGS. 9 and 10, an exemplary brewing material holder 30*b* includes the holder body 31, a holder lid 32*b*, a tamping spring 36, a spring washer 35*a*, and a top tamper 35*b*.

Referring to FIGS. 11A-D, the tamping spring 36 extends upward out of the brewing material holder 30*b*, configured to tamp the loose brewing material as disclosed hereafter.

A top view of the holder lid 32*b* is shown in FIG. 12. The holder lid 32*b* includes a larger passage 33*a*, allowing passage of the tamping spring 36 through the holder lid 32*b*.

A top view of the bottom tamper 34 is shown in FIG. 13. The bottom tamper 34 includes perforations 34*a* to allow brewed beverage to pass through the bottom tamper 34.

Figures 14A, 14B, 14C:
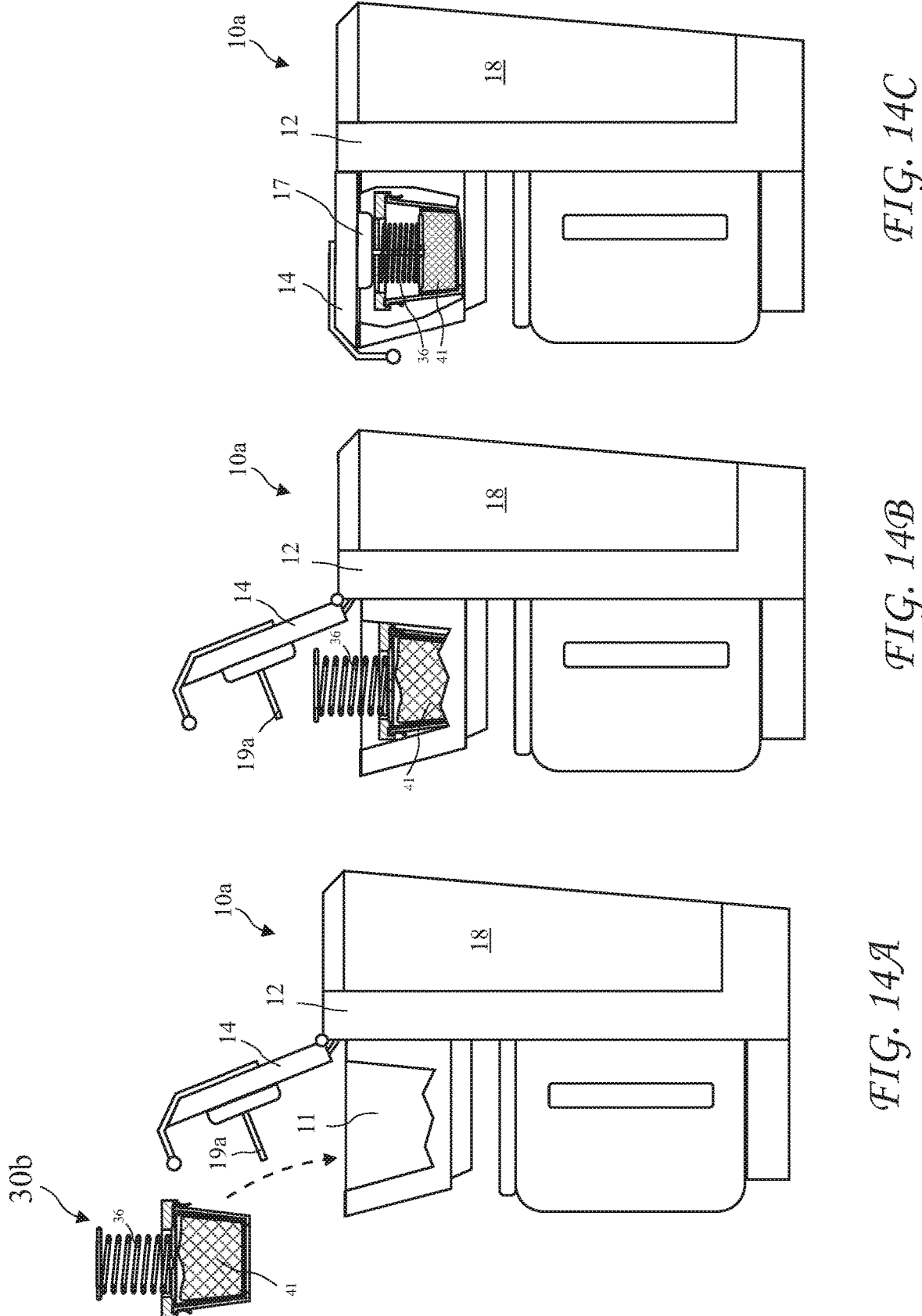
FIG. 14A shows an exemplary brewing material holder ready for insertion into an exemplary beverage brewer.
FIG. 14B shows an exemplary brewing material holder inserted into an exemplary beverage brewer before tamping.
FIG. 14C shows an exemplary brewing material holder inserted into an exemplary beverage brewer after tamping.

The brewing material holder 30*b* is shown ready for insertion into the beverage brewer 10 in FIG. 14A, inserted into the beverage brewer 10 before tamping the brewing material 41 in FIG. 14B, and in the beverage brewer 10 after tamping the brewing material 41 in FIG. 14C. The beverage brewer 10 can include a long nozzle 19*a* to reach the top tamper 35*b* for injection of the heated water into the tamped brewing material, but can also include the nozzle 19 and the heated water can pass through the brewing material 41 under the pull of gravity.

Referring to FIGS. 15 and 16, an exemplary brewing material holder 30*c* includes the holder body 31, the holder lid 32*b*, the bottom tamper 34, and the top tamper 35*b*.

A cross-sectional side view of the brewing material holder 30*c* taken along line 16-16 of FIG. 15 showing the brewing material holder 30*c* with the holder lid 32*b*, the top tamper 35*b*, and a portion of brewing material, ready to attach to the holder 31, is shown in FIG. 17A, with the holder lid 32*b* and the top tamper ready to attach, and a portion of brewing material 41 in the brewing material holder, is shown in FIG. 17B, and with the holder lid and the top tamper attached and a loose portion of brewing material 41 in the brewing material holder is shown in FIG. 17C. The brewing material holder 30*c* is configured to use with a beverage brewer 10*b* (see FIGS. 18A-18C) including apparatus for entering the brewing material holder for tamping the loose brewing material 41.

Figures 18A, 18B, 18C:
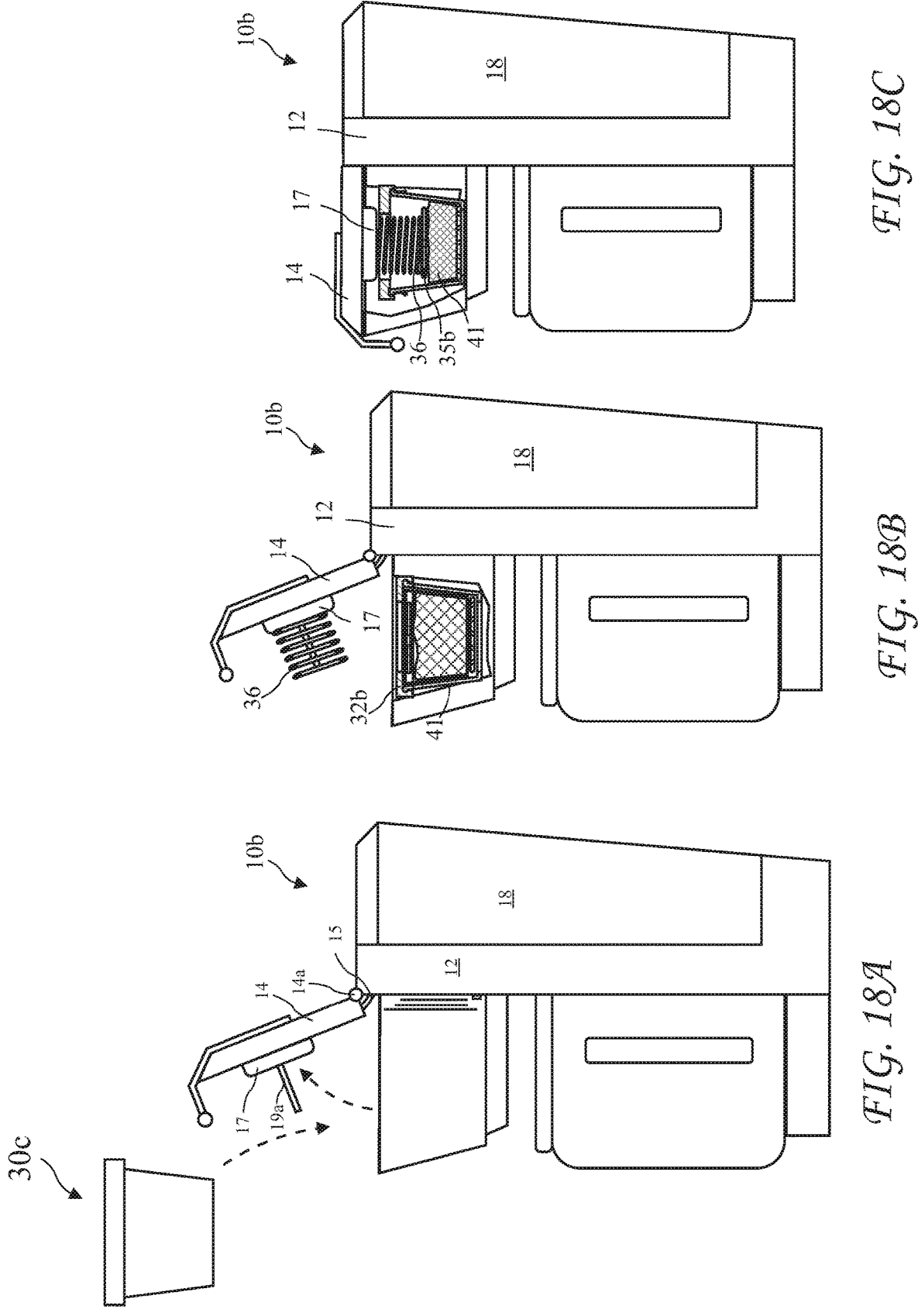
FIG. 18A shows an exemplary brewing material holder ready for insertion into a beverage brewer according to the invention.
FIG. 18B shows an exemplary brewing material holder inserted into the beverage brewer before tamping the brewing material.
FIG. 18C shows an exemplary brewing material holder inserted into the beverage brewer after tamping the brewing material.

The brewing material holder 30*c* ready for insertion into a beverage brewer 10*b* is shown in FIG. 18A, arranged in the beverage brewer 10*b* before tamping the brewing material 41 is shown in FIG. 18B, and arranged in the beverage brewer 10*b* after tamping the brewing material 41 is shown in FIG. 18C.

The beverage brewer 10*b* includes the tamping spring 36 attached to the pad 17 on the bottom of the lid 14. When the lid 14 is closed the tamping spring 36 enters the brewing material holder 30*c* through the lid passage 33*a* (see FIG. 12) and pushes the top tamper 35*b* against the brewing material 41 to tamp the brewing material 41.

Referring to FIGS. 19 and 20, an exemplary brewing material holder 30*d* includes the holder body 31, the holder lid 32*a*, and the bottom tamper 34.

The brewing material holder with the bottom tamper 34, and a portion of brewing material 41 and the holder lid ready to attach is shown in FIG. 21A, the brewing material holder 30*d* with the bottom tamper 34, the portion of brewing material 41 in the brewing material holder 30*d*, and the holder lid 32*a* ready to attach is shown in FIG. 21B, and the brewing material holder 30*d* with the bottom tamper 34, a portion of brewing material in the brewing material holder 41, and the holder lid 32*a* is shown in FIG. 21C.

Figures 22A, 22B, 22C:
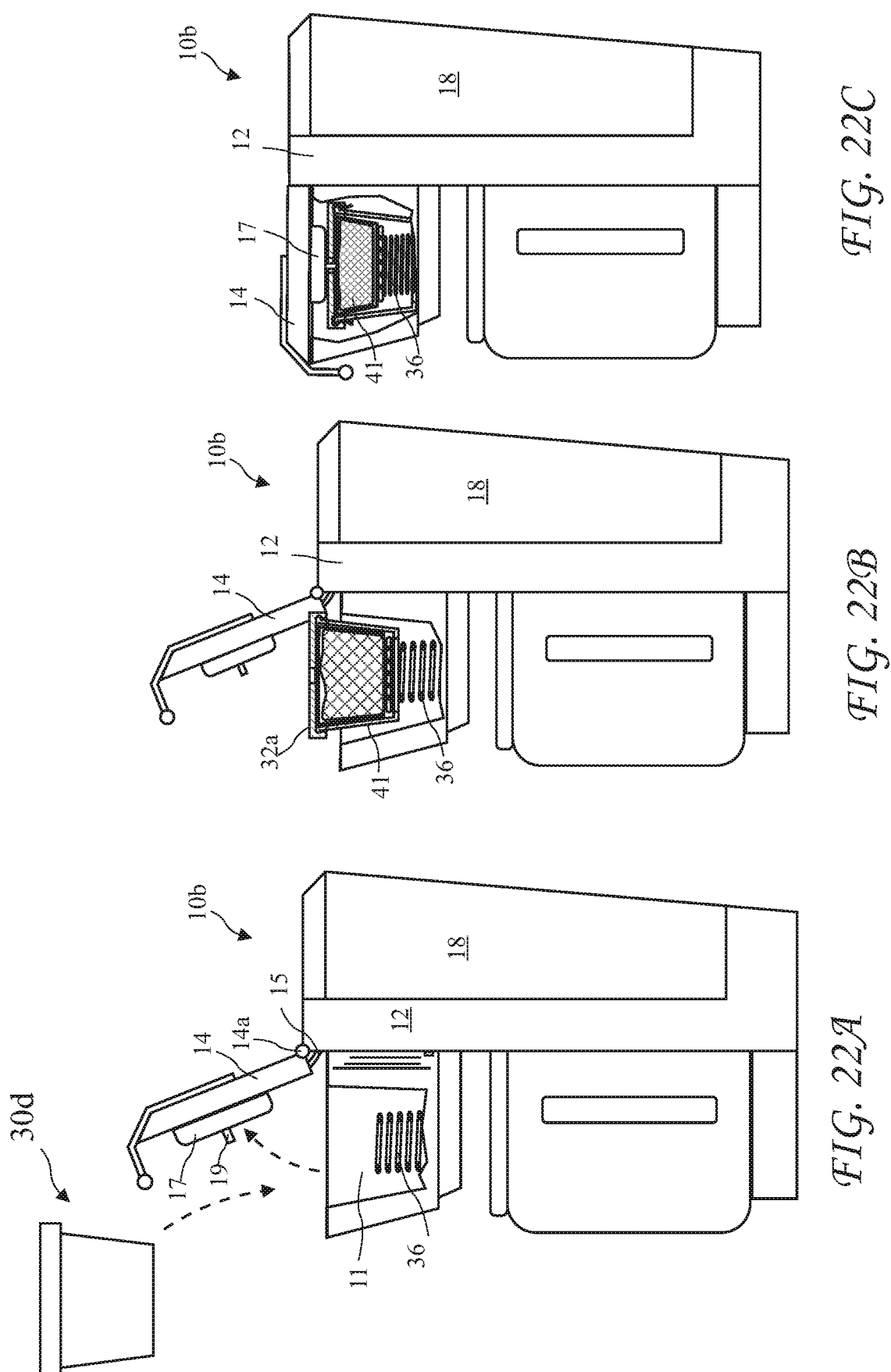
FIG. 22A shows an exemplary brewing material holder ready for insertion into the beverage brewer.
FIG. 22B shows an exemplary brewing material holder inserted into the beverage brewer before tamping the brewing material.
FIG. 22C shows an exemplary brewing material holder inserted into the beverage brewer after tamping the brewing material.

The brewing material holder 30*d* is shown ready for insertion into the beverage brewer 10*b* in FIG. 22A, arranged in the beverage brewer 10*b* before tamping the brewing material 41 in FIG. 22B, and arranged in the beverage brewer 10*b* after tamping the brewing material 41 in FIG. 22C. The beverage brewer 10*b* can include the tamping spring 36 arranged in the bottom of the brewing material holder cavity 11. When the lid 14 is closed, the pad 17 pushes the brewing material holder 30*d* down over the tamping spring 36 and the tamping spring 36 enters the brewing material holder 30*c* through the bottom of the holder body 31 and pushes the bottom tamper 34 against the brewing material 41 to tamp the brewing material 41.

Figures 23A, 23B, 23C:
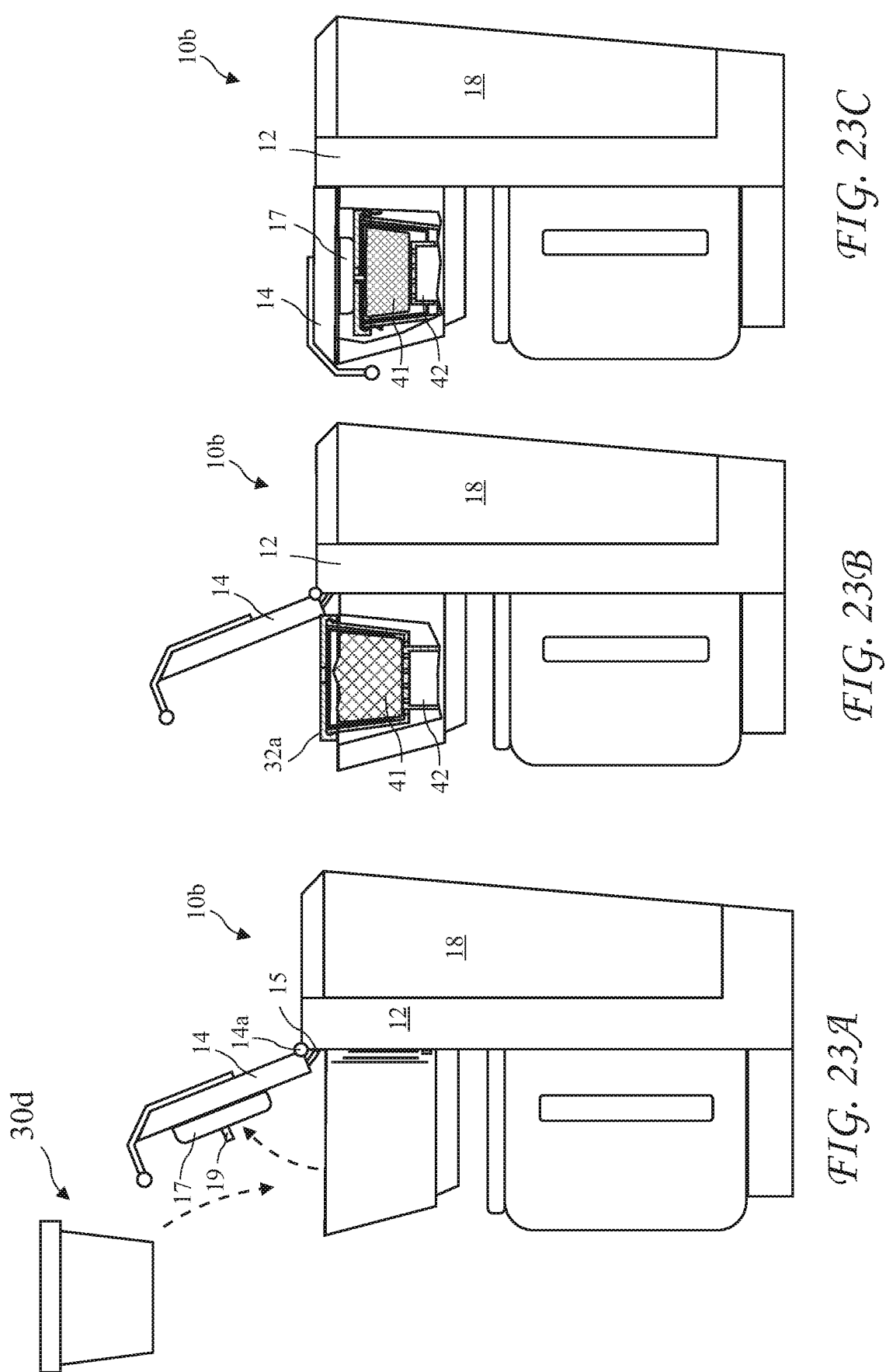
FIG. 23A shows an exemplary brewing material holder ready for insertion into the beverage brewer having a tamping block according to the invention.
FIG. 23B shows an exemplary brewing material holder inserted into the beverage brewer having the tamping block before tamping the brewing material.
FIG. 23C shows an exemplary brewing material holder inserted into the beverage brewer having the tamping block after tamping the brewing material.

The brewing material holder 30*d* is shown ready for insertion into the beverage brewer 10*b* in FIG. 23A, arranged in the beverage brewer 10*b* before tamping the brewing material 41 in FIG. 23B, and arranged in the beverage brewer 10*b* after tamping the brewing material 41 in FIG. 23C. The beverage brewer 10*b* can include a resilient solid block 42 arranged in the bottom of the brewing material holder cavity 11. When the lid 14 is closed, the pad 17 pushes the brewing material holder 30*d* down over the resilient solid block 42 and the resilient solid block 42 enters the brewing material holder 30*c* through the bottom of the holder body 31 and pushes the bottom tamper 34 against the brewing material 41 to tamp the brewing material 41.

Figures 24, 25:
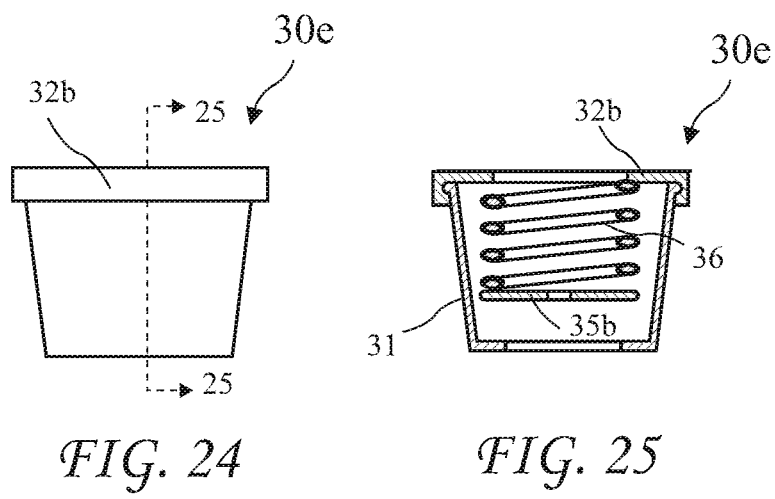
FIG. 24 is a side view of an exemplary brewing material holder according to the invention.
FIG. 25 is a cross-sectional side view of an exemplary brewing material holder according to the invention taken along line 25-25 of FIG. 24.

Referring to FIGS. 24 and 25, an exemplary brewing material holder 30e includes the holder body 31, the holder lid 32b, the tamping spring 36, and the top tamper 35b attached to the holder lid 32a.

Figures 26A, 26B, 26C:
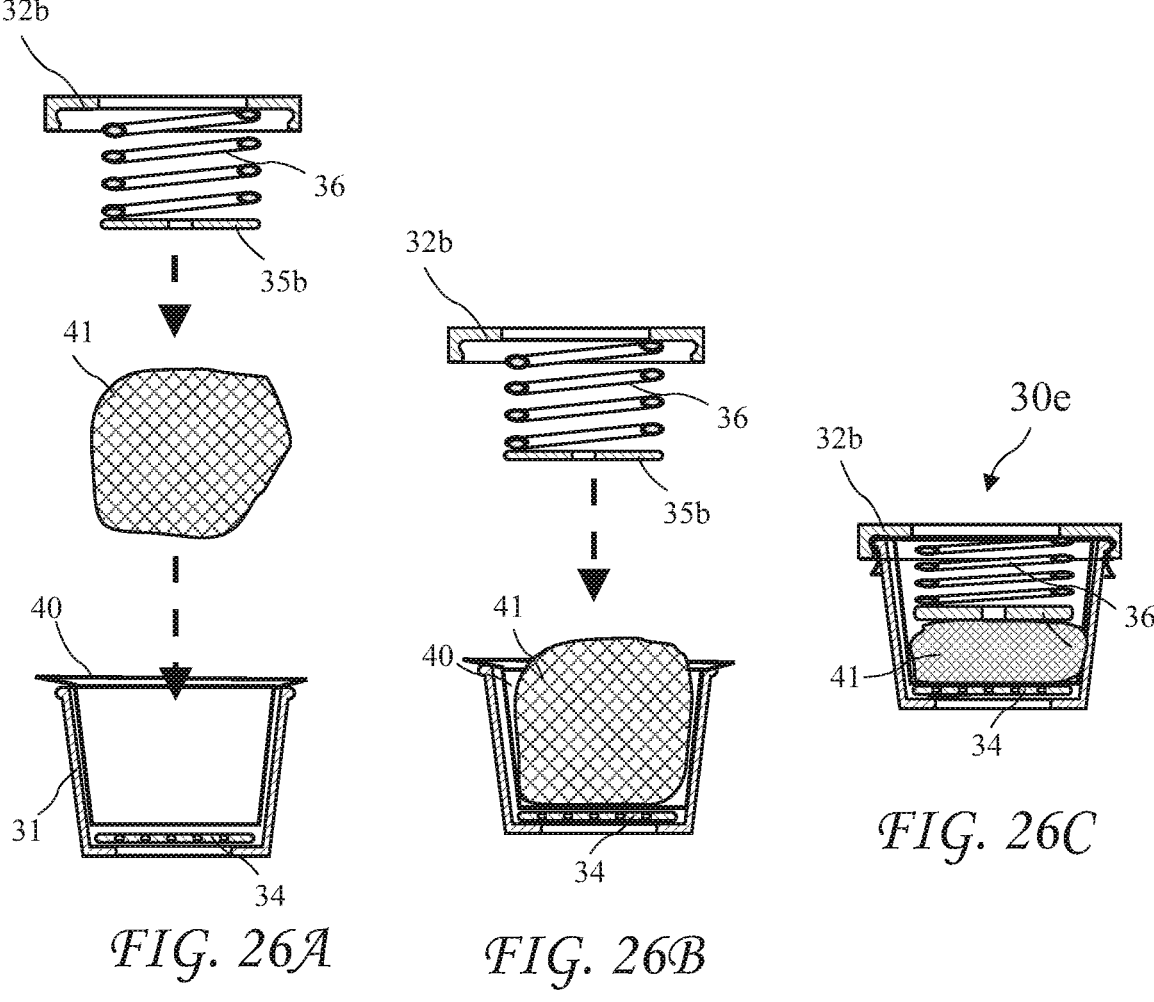
FIG. 26A is a cross-sectional side view of an exemplary brewing material holder according to the invention taken along line 25-25 of FIG. 24 showing the portion of brewing material above the brewing material holder body, and the holder lid with the top tamper and tamping spring, ready to attach to the brewing material holder body, according to the invention.
FIG. 26B is a cross-sectional side view of an exemplary brewing material holder according to the invention taken along line 25-25 of FIG. 24 showing the brewing material holder with the portion of brewing material in the brewing material holder, and the holder lid with the top tamper and tamping spring ready to attach to the brewing material holder body, according to the invention.
FIG. 26C is a cross-sectional side view of an exemplary brewing material holder according to the invention taken along line 25-25 of FIG. 24 showing the portion of brewing material in the brewing material holder, and the holder lid with the top tamper and tamping spring attached to the holder body, according to the invention.

A cross-sectional side view of the brewing material holder 30e taken along line 25-25 of FIG. 24 showing the brewing material holder 30e with a portion of brewing material 41, and the holder lid 32b with the top tamper 35b and tamping spring 36 attached, above the holder body 31, is shown in FIG. 26A, with the portion of brewing material 41 in the brewing material holder, and the holder lid 32b with the top tamper 35b and tamping spring 36 attached, above the holder body 31, in FIG. 26B, and with the portion of brewing material 41 in the brewing material holder 30e, and the holder lid 32b with the top tamper 35b and tamping spring 36 attached to the holder base 31 in FIG. 26C. The tamping spring 36 and top tamper 35b are configured to tamp the brewing material 41 to provide a tamped brewing material when the holder lid 32b is attached to the holder base 31.

Figures 27, 28, 29A, 29B, 29C:
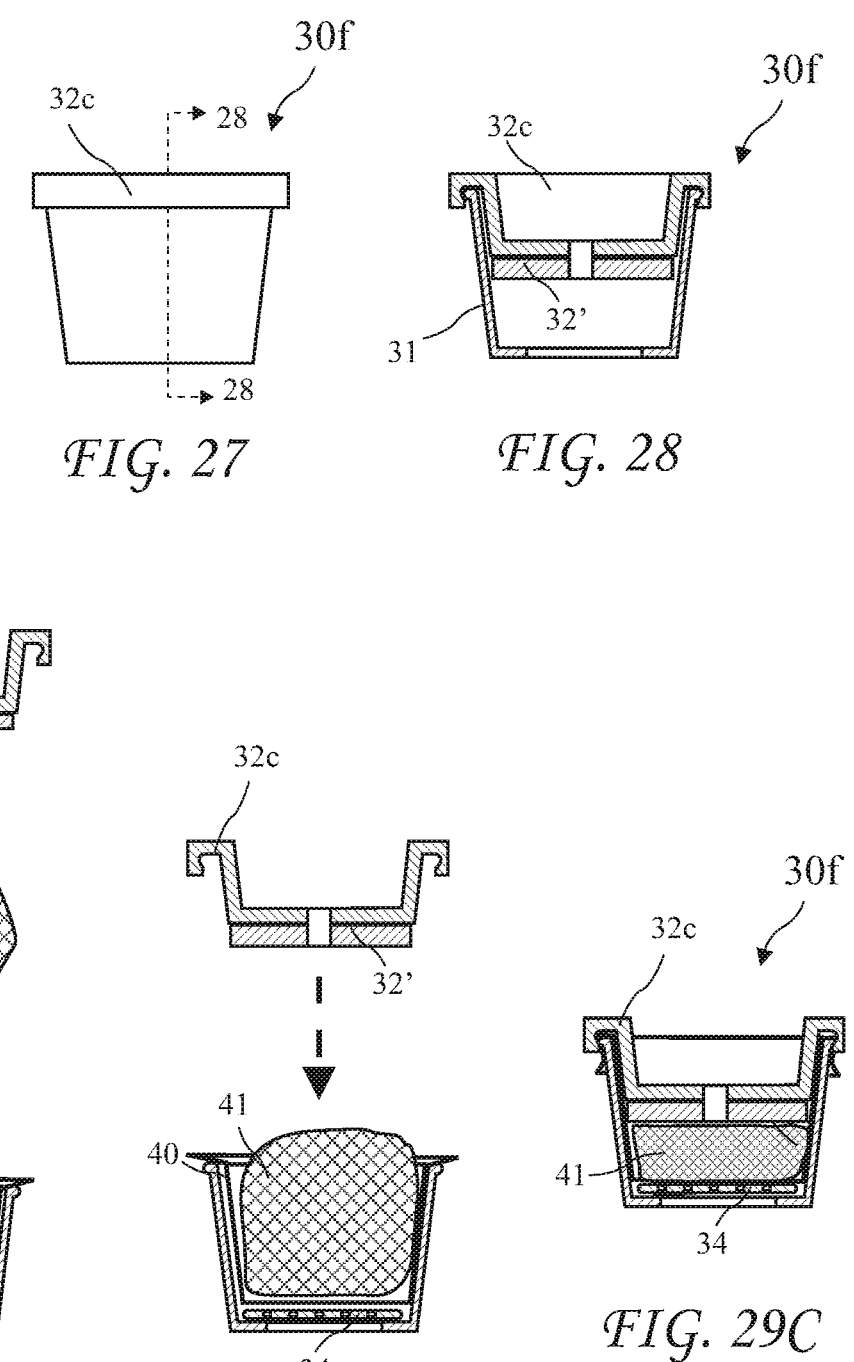
FIG. 27 is a side view of an exemplary brewing material holder according to the invention.
FIG. 28 is a cross-sectional side view of an exemplary brewing material holder according to the invention taken along line 28-28 of FIG. 27.
FIG. 29A is a cross-sectional side view of an exemplary brewing material holder according to the invention taken along line 28-28 of FIG. 27 showing the portion of brewing material above the brewing material holder, and the holder lid ready to attach to the holder body, according to the invention.
FIG. 29B is a cross-sectional side view of an exemplary brewing material holder according to the invention taken along line 28-28 of FIG. 27 showing the portion of brewing material in the brewing material holder, and the holder lid ready to attach to the holder body, according to the invention.
FIG. 29C is a cross-sectional side view of an exemplary brewing material holder according to the invention taken along line 28-28 of FIG. 27 showing the portion of brewing material in the brewing material holder, and the holder lid attached and tamping the brewing material, according to the invention.

Referring to FIGS. 27 and 28, an exemplary brewing material holder 30f includes the holder body 31 and a holder lid 32c. The holder lid 32c includes a recessed portion 32' that extends into the interior of the brewing material holder 30f. The recessed portion 32' is preferably a solid resilient material.

A cross-sectional side view of the brewing material holder 30f taken along line 28-28 of FIG. 27 showing the brewing material holder 30f with a portion of brewing material 41, and the holder lid 32c, above the holder body 31, is shown in FIG. 29A, with the portion of brewing material 41 in the brewing material holder, and the holder lid 32c above the holder body 31 in FIG. 29B, with the portion of brewing material 41 in the brewing material holder 30e, and the holder lid 32e attached to the holder base 31 in FIG. 29C. A cushion 32' is configured to tamp the brewing material 41 to provide a tamped brewing material when the holder lid 32e is attached to the holder base 31. The cushion 32' is preferably made from a resilient material to cushion the tamping of the loose brewing material.

Referring to FIGS. 30 and 31, an exemplary brewing material holder 30g includes the holder body 31, the holder lid 32b, the tamping spring 36, and the bottom tamper 34 inside the holder base 31.

A cross-sectional side view of the brewing material holder 30g taken along line 31-31 of FIG. 30 showing the brewing material holder 30g with a portion of brewing material 41 and the holder lid 32a above the holder body 31, and with the bottom tamper 34 and tamping spring 36 inside the holder base 31, is shown in FIG. 32A, with the portion of brewing material 41 in the filter paper 40 in the holder base 31 arranged on the bottom tamper 34 supported by the tamping spring 36, and the holder lid 32a above the holder body 31 in FIG. 32B, with the portion of brewing material 41 in the brewing material holder 30e, and the holder lid 32a attached to the holder base 31 in FIG. 32C. The tamping spring 36 and bottom tamper 34 are configured to tamp the brewing material 41 upward against the tamper lid 32a to provide a tamped brewing material when the holder lid 32a is attached to the holder base 31.

Figures 33, 34A, 34B, 35, 36A, 36B:
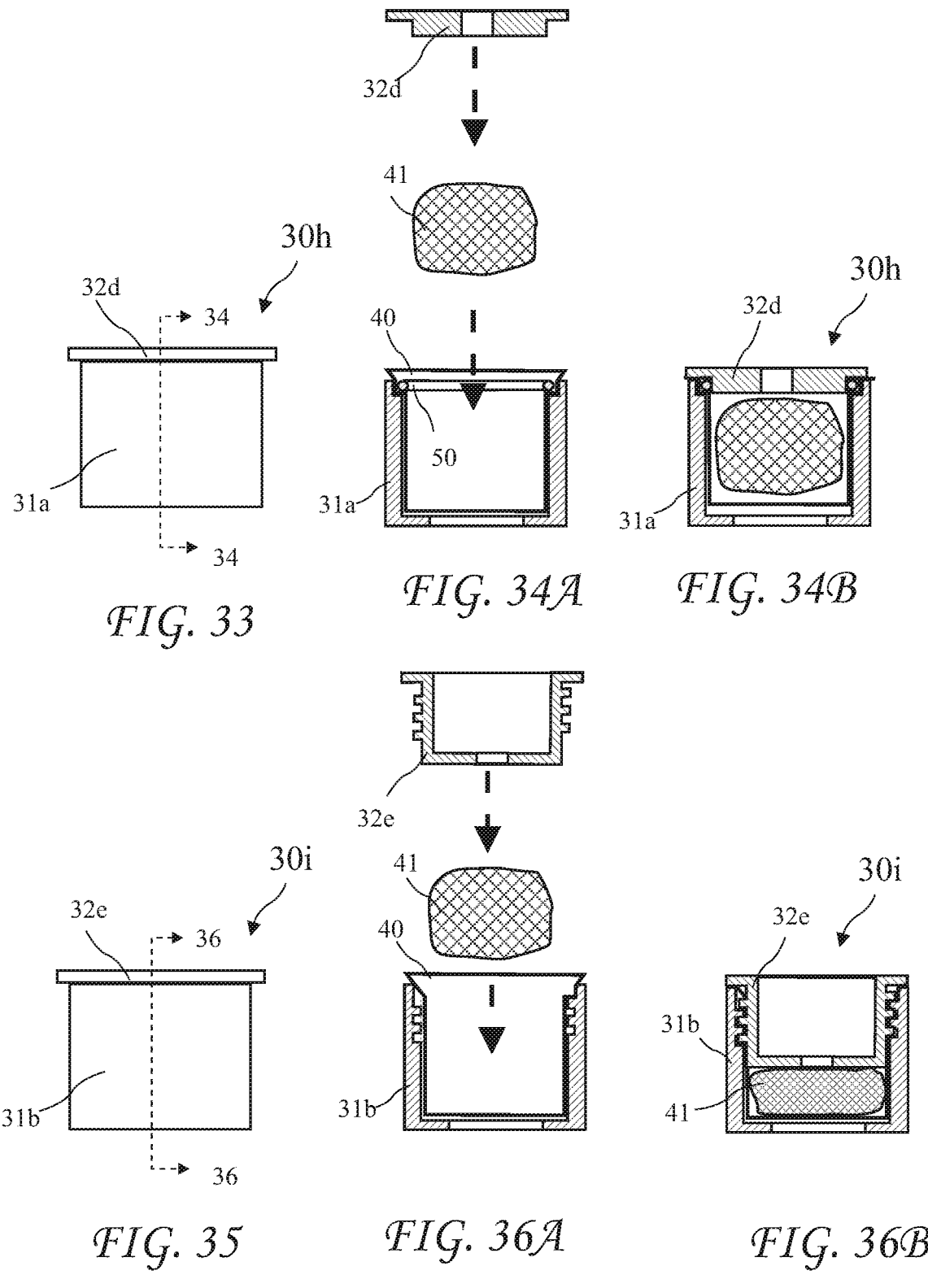
FIG. 33 is a side view of an exemplary brewing material holder according to the invention.
FIG. 34A is a cross-sectional side view of an exemplary brewing material holder taken along line 34-34 of FIG. 33 showing a portion of brewing material for placing inside the brewing material holder and the holder lid with an insertable portion and an O-Ring inside the brewing material holder for sealing according to the invention.
FIG. 34B is a cross-sectional side view of an exemplary brewing material holder taken along line 34-34 of FIG. 33 showing the portion of brewing material inside the brewing material holder and the holder lid with the insertable portion inserted into the brewing material holder and cooperating with the O-Ring inside the brewing material holder for sealing.
FIG. 35 is a side view of an exemplary brewing material holder according to the invention.
FIG. 36A is a cross-sectional side view of an exemplary brewing material holder taken along line 36-36 of FIG. 35 showing a portion of brewing material for placing inside the brewing material holder and a holder lid with a threaded portion for screwing inside the holder body for sealing according to the invention.
FIG. 36B is a cross-sectional side view of an exemplary brewing material holder taken along line 36-36 of FIG. 35 showing the portion of brewing material inside the brewing material holder and a holder lid with the threaded portion screwed into the holder body and tamping the brewing material according to the invention.

A side view of an exemplary brewing material holder 30h according to the invention is shown in FIG. 33, a cross-sectional side view of the brewing material holder 30h taken along line 34-34 of FIG. 33 showing a portion of brewing material 41 for placing inside the brewing material holder and a holder lid 32d with an insertable portion and an O-Ring 50 inside the brewing material holder for sealing is shown in FIG. 34A, and a cross-sectional side view of the brewing material holder taken along line 34-34 of FIG. 33 showing the portion of brewing material 41 inside the brewing material holder 30h and the holder lid 32d with the insertable portion inserted into the brewing material holder base 31a is shown in FIG. 34B. The filter paper 40 extends up above the O-ring 50 and the O-Ring 50 cooperates with the holder lid 32d to sandwich the top edge of the filter paper 40 to seal the filter paper 40 to reduce or prevent the brewing material 41 from escaping when the flow of hot water is provided to the brewing material holder 30h. The holder base 31 a is preferably cylindrical but can also be conical or frusto-conical in shape, or can take any other shape.

A side view of an exemplary brewing material holder 30i according to the invention is shown in FIG. 35, a cross-sectional side view of the brewing material holder 30i taken along line 36-36 of FIG. 35 showing a portion of brewing material 41 for placing inside the brewing material holder and a holder lid 32e with a threaded portion for screwing inside the holder base 31b for sealing is shown in FIG. 36A, and a cross-sectional side view of the brewing material holder 30i taken along line 36-36 of FIG. 35 showing the portion of brewing material 41 inside the brewing material holder and the holder lid 32e with the threaded portion screwed into the brewing material holder and tamping the brewing material 41 is shown in FIG. 36B. The threads provide both tamping and sealing the brewing material to reduce or prevent the brewing material 41 from escaping when the flow of hot water is provided to the brewing material holder 30h. The holder base 31 b is preferably cylindrical to facilitate having internal threads, and at least the threaded portion is preferably cylindrical.

Figures 37A, 37B, 37C:
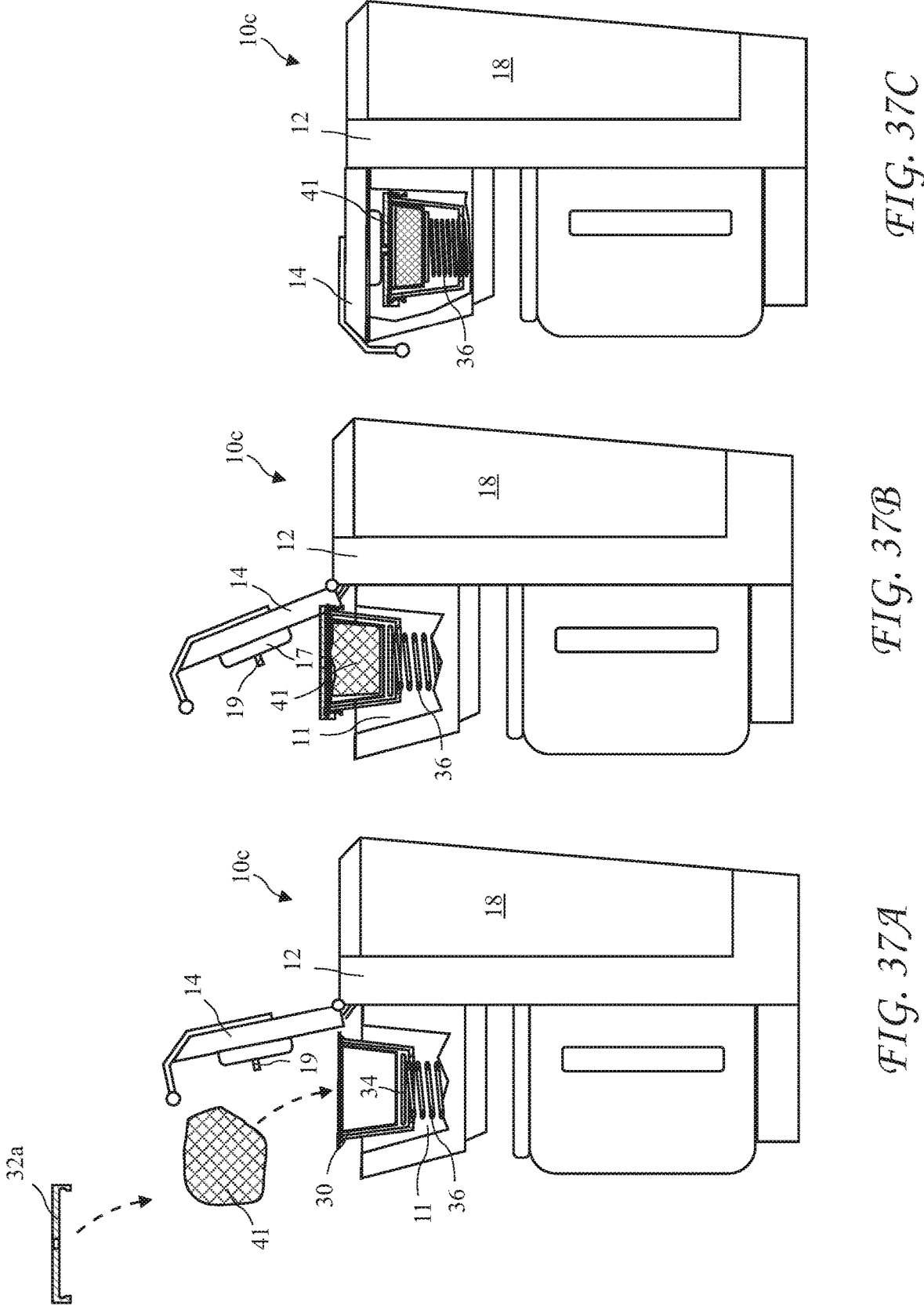
FIG. 37A shows an exemplary beverage brewer having a brewing material holder for receiving a portion of brewing material and tamping spring according to the invention for tamping the brewing material when the beverage brewer lid is closed.
FIG. 37B shows an exemplary beverage brewer with the brewing material holder holding the portion of brewing material and the tamping spring under the brewing material holder according to the invention for tamping the brewing material when the beverage brewer lid is closed.
FIG. 37C shows an exemplary beverage brewer with the brewing material holder holding the portion of tamped brewing material with the beverage brewer lid closed for tamping the brewing material according to the invention.

An exemplary beverage brewer 10c having a brewing material holder 30 according to the invention for receiving a portion of brewing material and a tamping spring 36 for tamping the brewing material is shown in FIG. 37A, the beverage brewer 10c with the brewing material holder 30 holding the portion of brewing material 41 is shown in FIG. 37B, and the beverage brewer 10c with the brewing material holder 30 holding the portion of brewing material 41 with the beverage brewer lid 14 closed for tamping the brewing material 41 is shown in FIG. 37C. When the lid 14 is closed, the pad 17 pushes the brewing material holder 30 down and the tamping spring 36 enters the bottom of the brewing material holder 30 to tamp the brewing material 41. Although attaching the lid 32a to the holder 30 is preferred in order to prevent brewing material grounds from escaping the holder 30, the beverage brewer 10c can also be used without the lid 32a and the pad 17 can seal the brewing material 41 in the holder 30. In this case, the beverage brewer lid 14 serves as a brewing material holder lid.

Figures 38A, 38B, 38C:
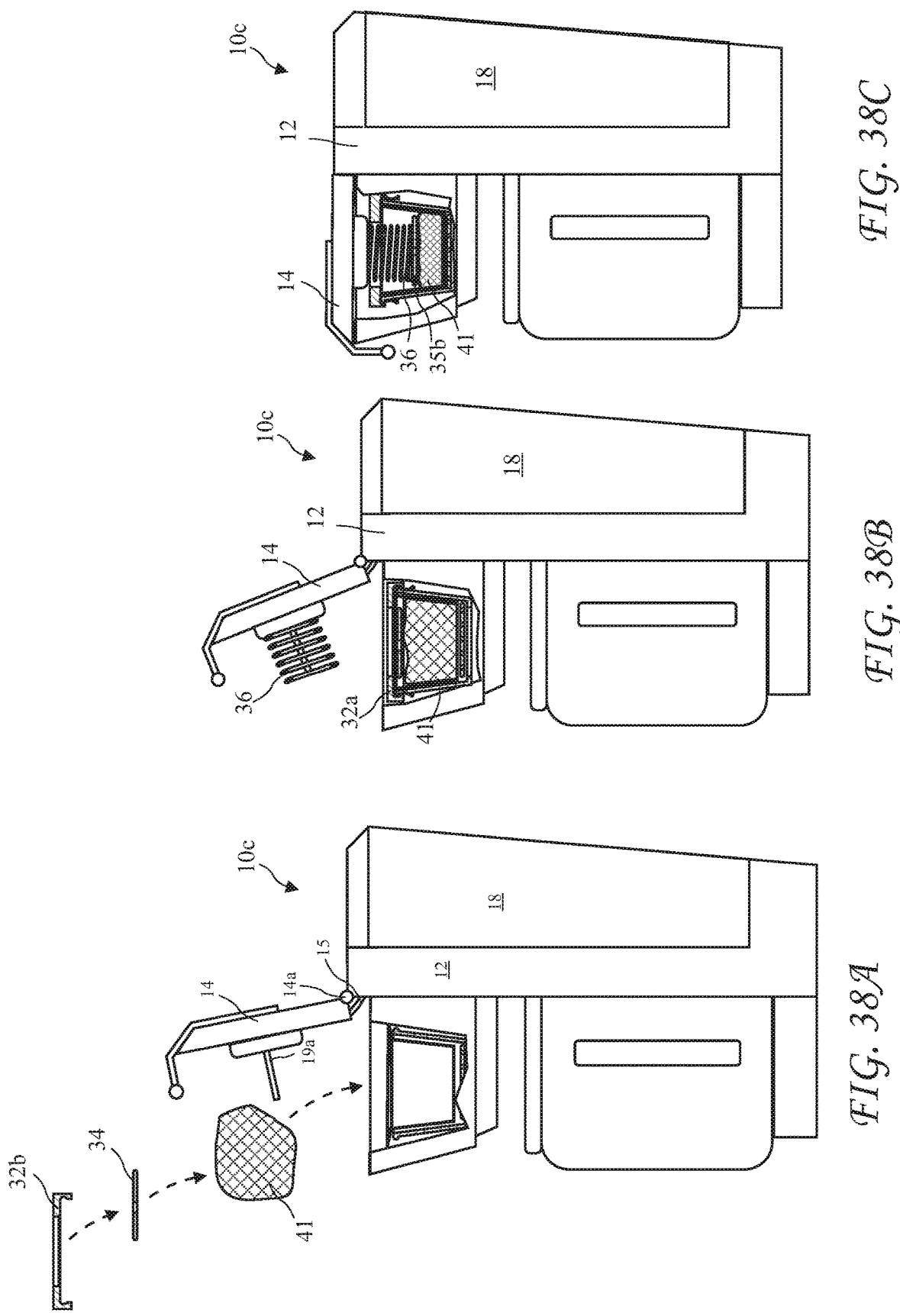
FIG. 38A shows an exemplary beverage brewer having a brewing material holder for receiving a portion of brewing material and tamping spring attached to the beverage brewer lid according to the invention for tamping the brewing material when the beverage brewer lid is closed.
FIG. 38B shows an exemplary beverage brewer with the brewing material holder holding the portion of untamped brewing material according to the invention for tamping the brewing material when the beverage brewer lid is closed.
FIG. 38C shows an exemplary beverage brewer with the brewing material holder holding the portion of tamped brewing material with the beverage brewer lid closed to push the tamping spring into the brewing material holder for tamping the brewing material according to the invention.

A beverage brewer 10c having a brewing material holder configured to receive a portion of brewing material and a tamping spring 36 attached to the beverage brewer lid 14 according to the invention for tamping the brewing material 41 when the beverage brewer lid 14 is closed is shown in FIG. 38A, the beverage brewer 10c with the brewing material holder 30 holding the portion of brewing material 41 is shown in FIG. 38B, and the beverage brewer 10c with the brewing material holder 30 holding the portion of brewing material 41 with the beverage brewer lid 14 closed to push the tamping spring 36 into the brewing material holder 30 for tamping the brewing material 41 is shown in FIG. 38C.

Figures 39A, 39B, 39C:
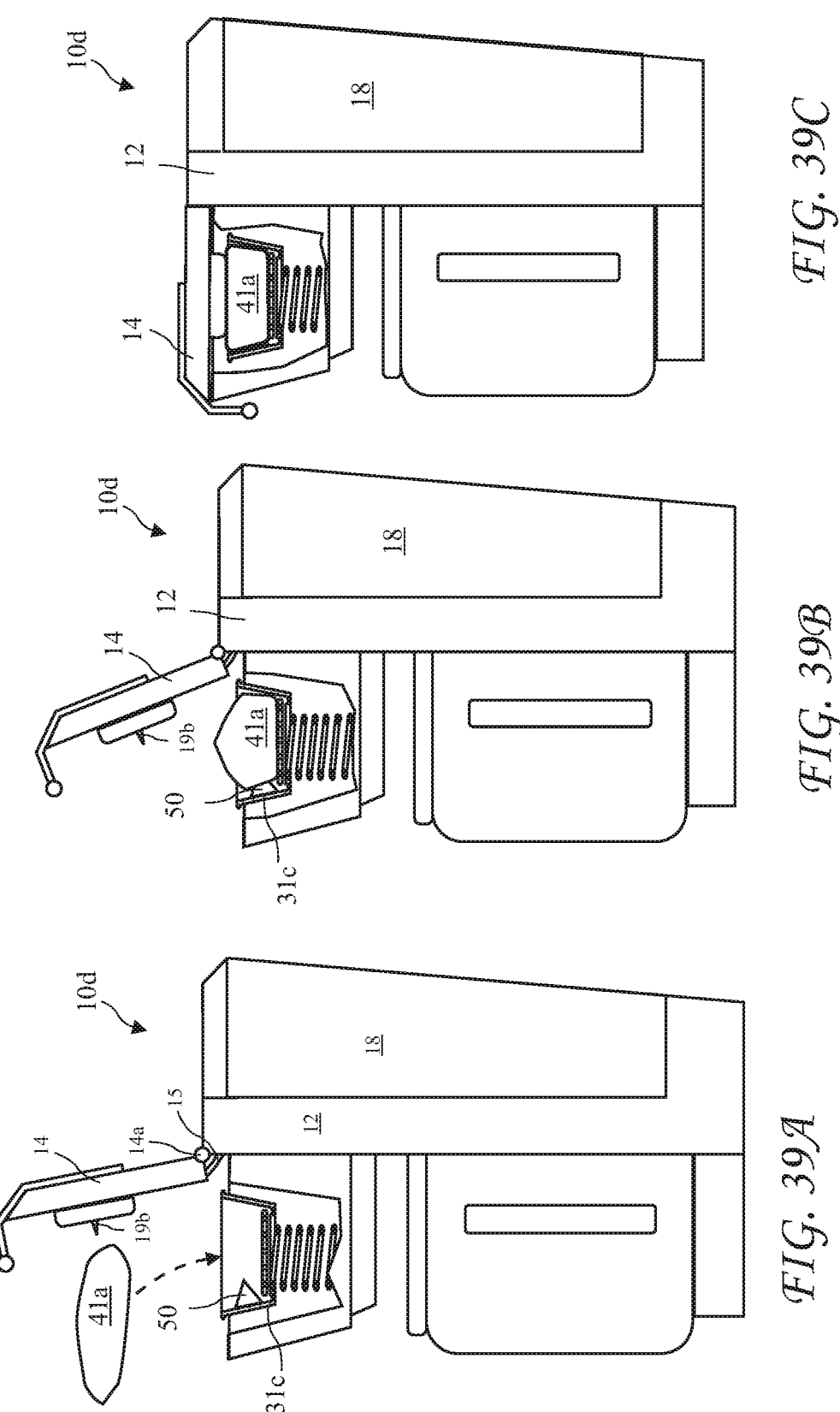
FIG. 39A shows an exemplary beverage brewer having a brewing material holder for receiving a packet containing untamped brewing material, a knife for cutting the packet open, and tamping spring attached to the beverage brewer lid according to the invention for tamping the brewing material when the beverage brewer lid is closed.
FIG. 39B shows an exemplary beverage brewer with the brewing material holder holding the packet of untamped brewing material according to the invention for tamping the brewing material when the beverage brewer lid is closed.
FIG. 39C shows an exemplary beverage brewer with the brewing material holder holding the packet of tamped brewing material with the beverage brewer lid closed to push the tamping spring into the brewing material holder for tamping the brewing material according to the invention.

An exemplary beverage brewer 10d having a holder base 31c for receiving a packet 41a containing untamped brewing material, a knife 50 for cutting the packet 41a open, and tamping spring 36 under the holder base 31c according to the invention for tamping the brewing material when the beverage brewer lid is closed is shown in FIG. 39A, the beverage brewer 10*d* with the holder base 31*c* holding the packet 41*a* of untamped brewing material is shown in FIG. 39B, and the beverage brewer 10*d* with the holder base 31*c* holding the packet of tamped brewing material 41*c* with the beverage brewer lid 14 closed to push the holder base down over the tamping spring 36 for tamping the brewing material is shown in FIG. 39C. The beverage brewer 10*d* includes a somewhat pointed nozzle 19*b* to puncture the packet 41*a* to provide the flow of hot water to the tamped brewing material in the packet 41*a*. Known brewing material packets include internal filters to allow a flow of hot water through the packet to make the beverage while preventing brewing material grounds from escaping. The cut in the packet 41*a* made by the knife 50 allows the brewed beverage to escape from the packet while filter material in the packet 41*a* prevents brewing material grounds from escaping. The tamping spring 36 can also be attached to the lid 14 as shown in FIGS. 38A-38C.

The packet 41*a* can be an airtight pod containing brewing material in filter paper and positioning the knife on the side of the holder base 31*c* results in less likelihood of the knife 50 cutting the filter paper. The packet 41*a* is preferably airtight to maintain brewing material freshness and can be plastic, metal foil, or other airtight material that is sufficiently flexible to allow the brewing material contained in the packet 41*a* to be tamped. Alternatively, the knife 50 can be eliminated and the packet 41*a* can be configured to burst under pressure to expose the brewing material, for example, such that when the beverage brewer tamps the brewing material, the packet 41*a* also bursts. In this case, the filter paper 41 is inserted into the holder base 31*c* without the knife 50, and the packet 41*a* bursts during compacting to release the brewing material into the filter paper.

Known beverage brewers use a sealed cup or capsule having a somewhat ridged cup with a foil cover. Such cups might be compressible and used in the beverage brewer 10*d*. However, a similar cup or capsule having a less ridged cup that can be compressed in the beverage brewer 10*d* are more suitable for use in the beverage brewer 10*d* to allow tamping of the brewing material contained in the cup or capsule.

Figures 40A, 40B, 40C:
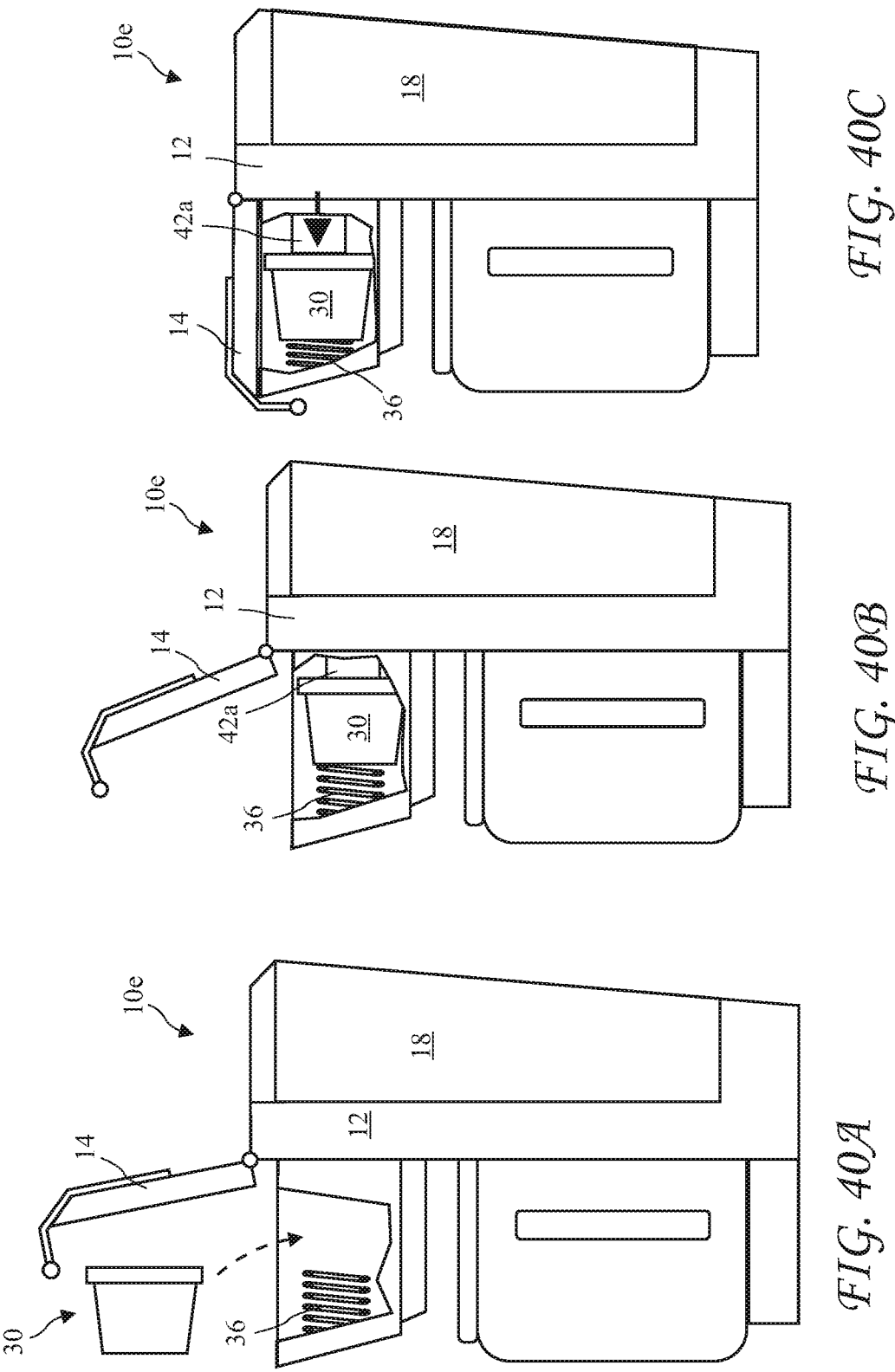
FIG. 40A shows an exemplary beverage brewer accepting a horizontal brewing material holder and tamping spring arranged horizontally in a brewing material holder cavity according to the invention for tamping the brewing material when the beverage brewer lid is closed.
FIG. 40B shows an exemplary beverage brewer with the brewing material holder arranged horizontally in the brewing material holder cavity according to the invention for tamping the brewing material when the beverage brewer lid is closed.
FIG. 40C shows an exemplary beverage brewer with the brewing material holder arranged horizontally in the brewing material holder cavity with the beverage brewer lid closed and the brewing material holder pushed against the tamping spring for tamping the brewing material, according to the invention.

An exemplary beverage brewer 10*e* configured to horizontally receive the brewing material holder 30 is shown in FIG. 40A, the beverage brewer with the brewing material holder 30 arranged in the beverage brewer is shown in FIG. 40B, and the beverage brewer with the beverage brewer lid 14 closed and the tamping spring 36 entering the brewing material holder 30 to tamp the brewing material 41 is shown in FIG. 40C. The beverage brewer 10*d* can alternatively include a tamping spring entering the brewing material holder top, or a resilient solid block pushed into the brewing material holder 30 to tamp the brewing material. Preferably, a horizontal ram 42*a* is actuated when the lid 14 is closed and pushes the brewing material holder 30 against the spring 36 to tamp the brewing material. The horizontal ram 42*a* can be actuated by an electrical solenoid, by pressure, or by mechanical levers connected to the lid 14. The beverage brewer 10*e* can also include any of the features described above for other embodiments of the beverage brewer according to the invention and can be configured to use any of the brewing material holders described above according to the invention.

Figures 41, 42, 43, 44, 45, 46, 47A, 47B, 47C, 47D, 48:
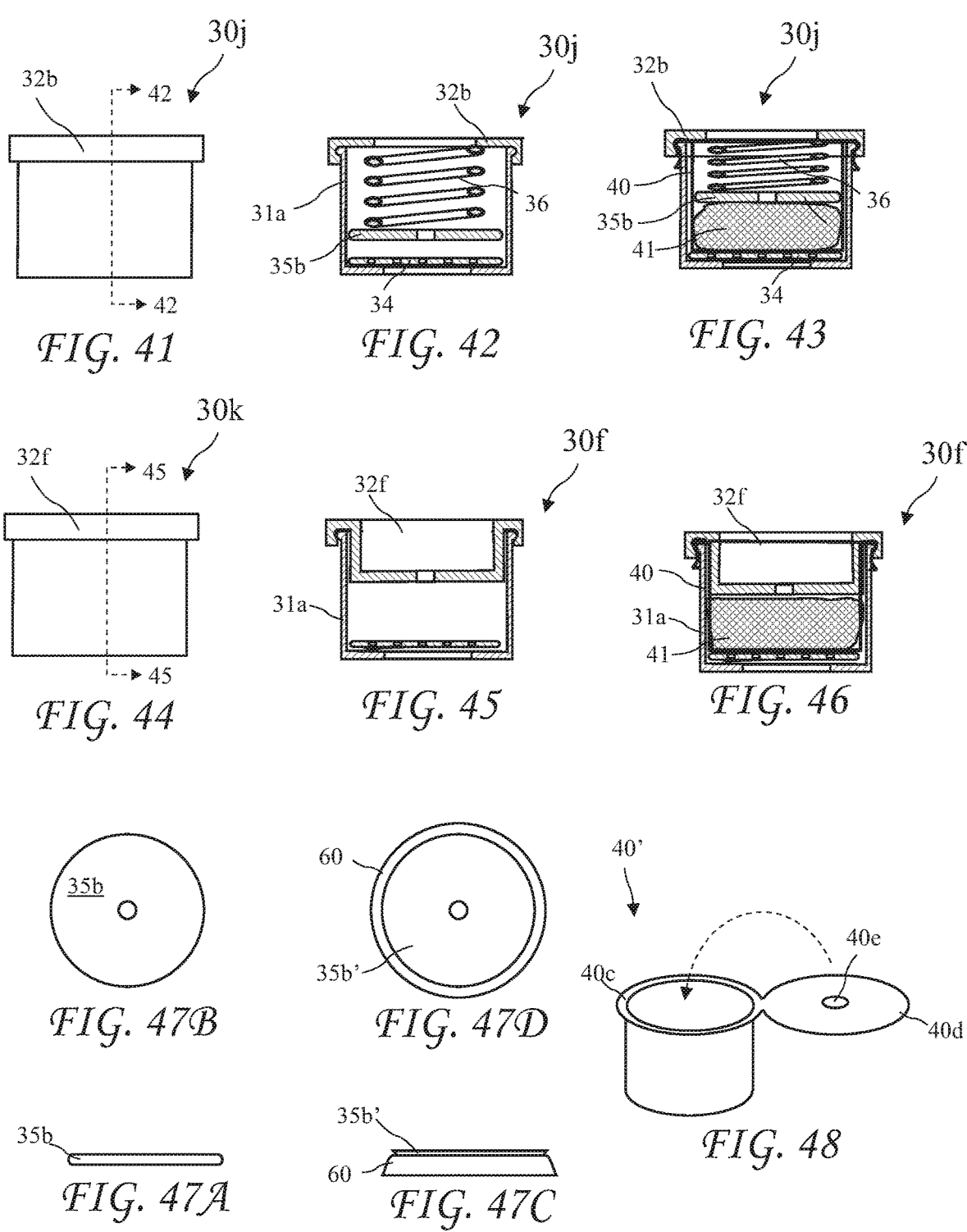
FIG. 41 is a side view of an exemplary brewing material holder with straight walls according to the invention.
FIG. 42 is a cross-sectional view of an exemplary brewing material holder taken along line 42-42 of FIG. 41 showing an empty brewing material holder.
FIG. 43 is a cross-sectional view of an exemplary brewing material holder taken along line 42-42 of FIG. 41 showing a full and tamped brewing material holder.
FIG. 44 is a side view of an exemplary brewing material holder with straight walls according to the invention.
FIG. 45 is a cross-sectional view of an exemplary brewing material holder taken along line 45-45 of FIG. 44 showing an empty brewing material holder.
FIG. 46 is a cross-sectional view of an exemplary brewing material holder taken along line 45-45 of FIG. 41 showing a full and tamped brewing material holder.
FIG. 47A is a side view of an exemplary top tamper.
FIG. 47B is a top view of an exemplary top tamper.
FIG. 47C is a side view of an exemplary top tamper with a seal according to the invention.
FIG. 47D is a top view of an exemplary top tamper with a seal.
FIG. 48 is a perspective view of an exemplary filter paper cup with a folding cup lid.

A side view of an exemplary brewing material holder 30*j* with straight walls according to the invention is shown in FIG. 41, and a cross-sectional view of the brewing material holder 30*j* taken along line 42-42 of FIG. 41 showing an empty brewing material holder is shown in FIG. 42. The brewing material holder 30*j* provides straight cylindrical inside walls, allowing a better fit between the top tamper 35*b* and the inside walls to reduce or eliminate the amount of brewing material 41 escaping past the top tamper 35*b* during tamping.

A cross-sectional view of the brewing material holder 30*j* taken along line 42-42 of FIG. 41 showing a full and tamped brewing material holder is shown in FIG. 43. The tamping spring 36 has been pushed down by the lid 32*b* to tamp the brewing material 41.

A side view of an exemplary brewing material holder 30*k* with straight walls according to the invention is shown in FIG. 44, a cross-sectional view of the brewing material holder 30*k* taken along line 45-45 of FIG. 44 showing an empty brewing material holder is shown in FIG. 45, and a cross-sectional view of the brewing material holder 30*k* taken along line 45-45 of FIG. 41 showing a full and tamped brewing material holder is shown in FIG. 46. As with the brewing material holder 30*j*, the brewing material holder 30*k* provides straight cylindrical inside walls allowing a better fit between the lid 32*f* and the inside walls to reduce or eliminate brewing material 41 escaping past the lid 32*f* during tamping. The lid 32*f* can be used with or without the top tamper 35*b*.

A side view of a top tamper 35*b* is shown in FIG. 47A and a top view of the top tamper 35B is shown in FIG. 47B. A side view of a top tamper 35*b*' with a seal 60 according to the invention is shown in FIG. 47C and a top view of the top tamper 35*b*' with the seal 60 is shown in FIG. 47D. In some instances, for example when used with a very fine ground brewing material, an amount of brewing material could escape past the top tamper 35*b*. In such instances, a user might prefer to use the top tamper 35*b*' with the seal 60 to reduce or eliminate the escape of the brewing material.

A perspective view of a filter paper cup 40' with a folding cup lid 40*d* is shown in FIG. 48 (also see FIG. 7C). The cup lid 40*d* can be folded over the rim 40*c* to reduce or prevent brewing material from escaping during tamping or subsequent processing. The lid 40*d* can also include a perforation 40*e* centered on the lid 40*d* to allow the nozzle 19 to enter and/or inject the hot flow of water into the tamped brewing material 41, but in some embodiments, the lid 40*d* does not include the perforation 40*e*. The filter paper cup 40' can be used in the brewing material containers described herein, and can be used in a beverage brewer having a cavity for receiving the filter paper cup 40'. While the cup 40' is preferably made from filter paper, the cup can alternatively be made from a reusable mesh, such as a nylon or metal mesh material.

Figures 49, 50, 51A, 51B, 51C, 51D:
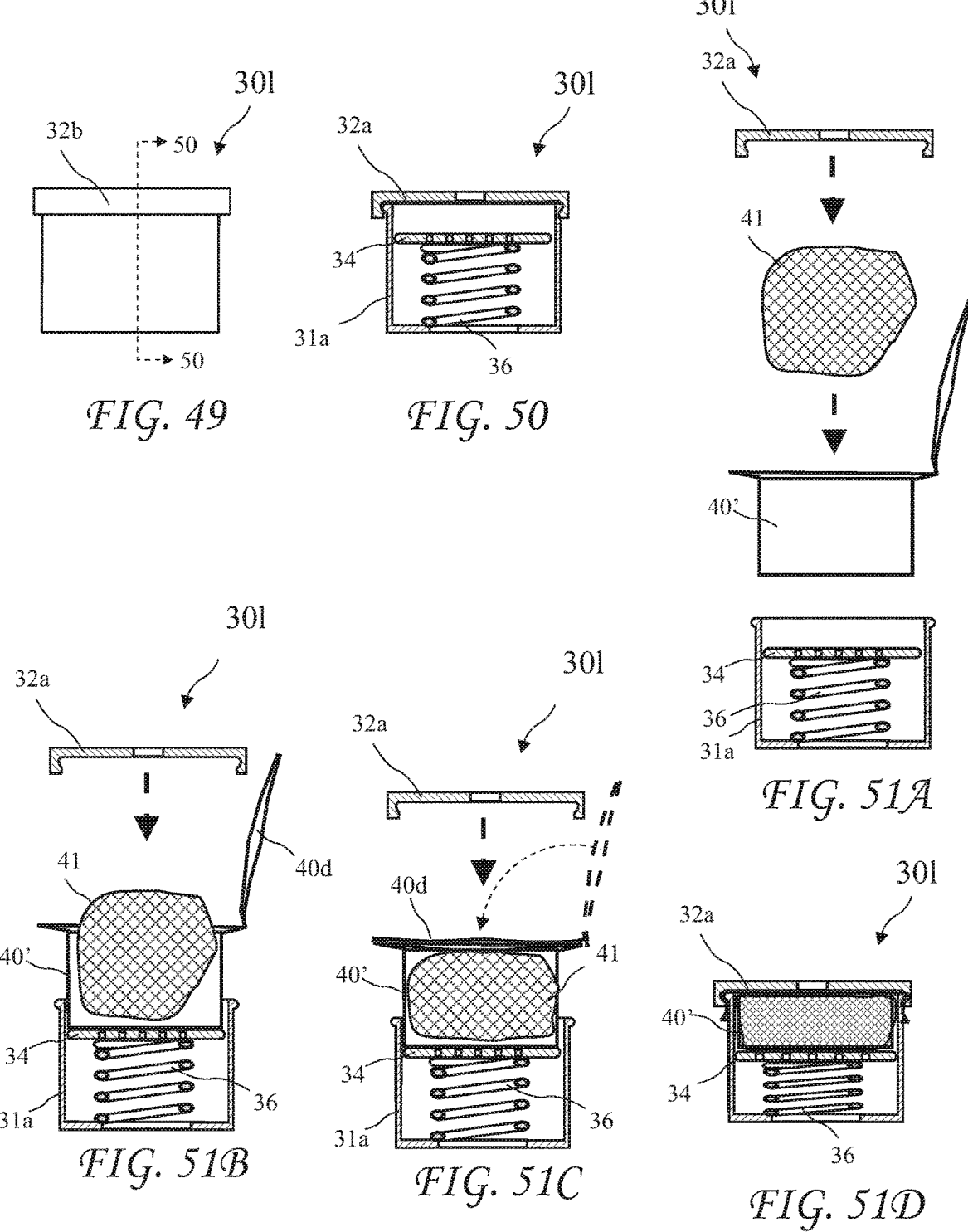
FIG. 49 is a side view of an exemplary brewing material holder with straight walls according to the invention.
FIG. 50 is a cross-sectional view of an exemplary brewing material holder taken along line 50-50 of FIG. 49 showing an empty brewing material holder.
FIG. 51A is a cross-sectional view of an exemplary brewing material holder taken along line 50-50 of FIG. 49 showing a lid, brewing material, a filter paper cup, above the base, and the brewing material holder base.
FIG. 51B is a cross-sectional view of an exemplary brewing material holder taken along line 50-50 of FIG. 49 showing the lid, above the brewing material and the filter paper cup arranged in the brewing material holder base.
FIG. 51C is a cross-sectional view of an exemplary brewing material holder taken along line 50-50 of FIG. 49 showing the lid, above the brewing material and the filter paper cup arranged in the brewing material holder base with a filter paper cover folded over the brewing material in the filter paper cup.
FIG. 51D is a cross-sectional view of an exemplary brewing material holder taken along line 50-50 of FIG. 49 showing the lid attached to the base with the brewing material and the filter paper cup arranged in the brewing material holder base with the brewing material tamped.

A side view of an exemplary brewing material holder 30*l* with straight walls according to the invention is shown in FIG. 49, and a cross-sectional view of the brewing material holder 30*l* taken along line 50-50 of FIG. 49 showing an empty brewing material holder is shown in FIG. 50. The brewing material holder 30*l* includes a straight-walled base and the tamping spring below the brewing material, and additionally uses a filter paper cup 40' with the folding lid 40*d*.

A cross-sectional view of the brewing material holder 30*l* taken along line 50-50 of FIG. 49 showing the lid 32*a*, brewing material 41, the filter paper cup 40' with lid 40*d*, above the brewing material holder base 31*a* is shown in FIG. 51A, a cross-sectional view of the brewing material holder 30*l* taken along line 50-50 of FIG. 49 showing the lid 32*a*, above the brewing material 41 and the filter paper cup 40' arranged in the brewing material holder base 31*a* is shown in FIG. 51B, a cross-sectional view of the brewing material holder 30*l* taken along line 50-50 of FIG. 49 showing the lid 32*a*, above the brewing material 41 and the filter paper cup 40' arranged in the brewing material holder base 31*a* with the filter paper cover 40*d* folded over the brewing material 41 in the filter paper cup 40' is shown in FIG. 51C, and a cross-sectional view of the brewing material holder 30*l* taken along line 50-50 of FIG. 49 showing the lid 32*a* attached to the base 31*a* with the brewing material 41 and the filter paper cup 40' arranged in the brewing material holder base 31*a* with the brewing material 41 tamped is shown in FIG. 51D. In embodiments with the brewing material 41 partially exposed above the base 31*a*, some brewing material 41 could escape during tamping. Using the filter paper cup 40' having the fold-over paper lid 40*d* reduces or eliminates such escape of brewing material 41 and additionally provides a drum-like taut surface for consistent puncturing.

Figures 52, 53, 54A, 54B, 54C, 54D:
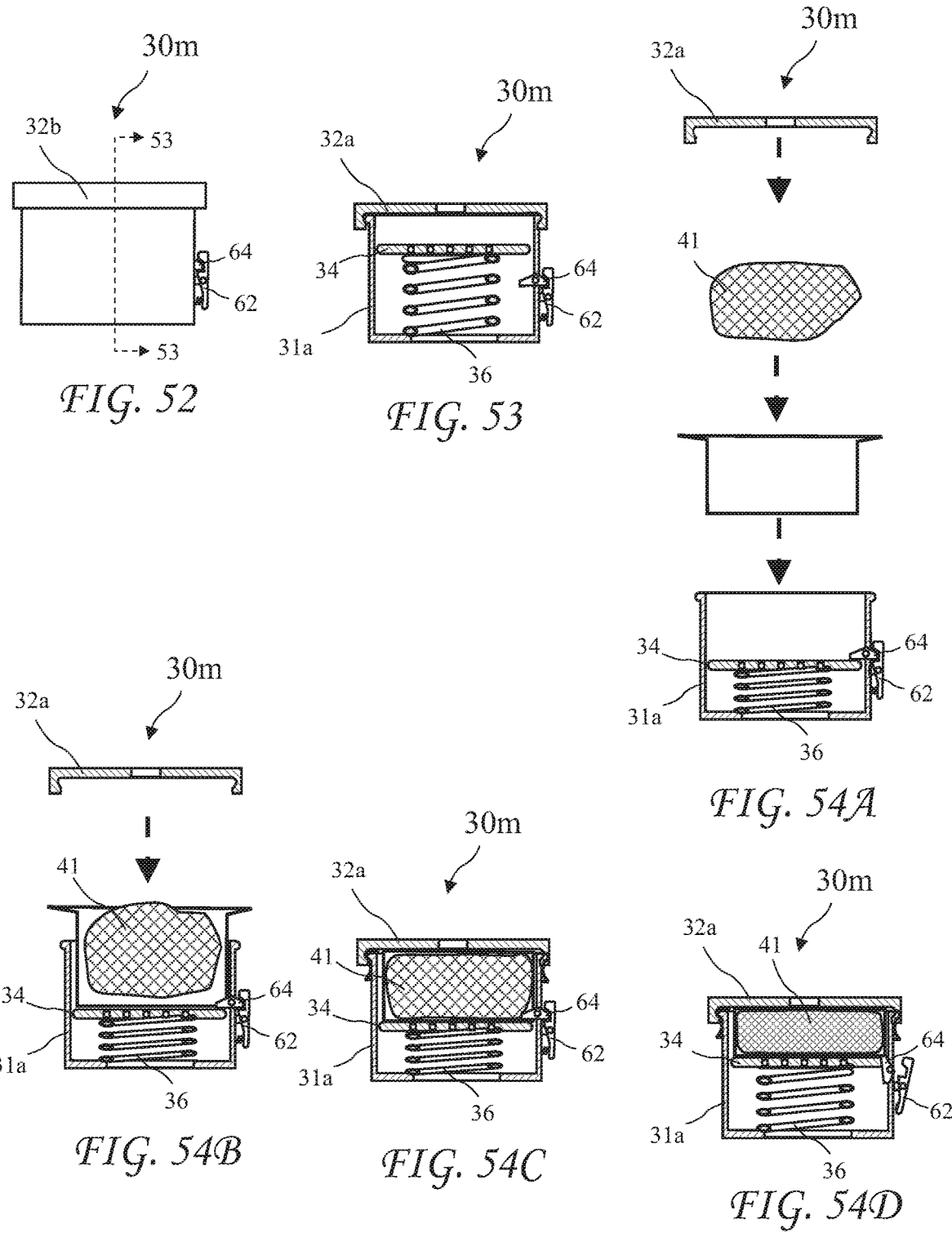
FIG. 52 is a side view of an exemplary brewing material holder with a releaseable tamping latch according to the invention.
FIG. 53 is a cross-sectional view of an exemplary brewing material holder taken along line 53-53 of FIG. 52 showing an empty brewing material holder.
FIG. 54A is a cross-sectional view of an exemplary brewing material holder taken along line 53-53 of FIG. 52 showing a lid, brewing material, a filter paper cup, above the base, and the brewing material holder base, with the tamping latch retaining the bottom tamper.
FIG. 54B is a cross-sectional view of an exemplary brewing material holder taken along line 53-53 of FIG. 52 showing the lid, above the brewing material and the filter paper cup arranged in the brewing material holder base, with the tamping latch retaining the bottom tamper.
FIG. 54C is a cross-sectional view of an exemplary brewing material holder taken along line 53-53 of FIG. 52 showing the lid, above the brewing material and the filter paper cup arranged in the brewing material holder base with the tamping latch retaining the bottom tamper.
FIG. 54D is a cross-sectional view of an exemplary brewing material holder taken along line 53-53 of FIG. 52 showing the lid attached to the base with the brewing material and the filter paper cup arranged in the brewing material holder base with tamping latch released and the brewing material tamped.

A side view of an exemplary brewing material holder 30*m* with a releasable tamping latch 64 according to the invention is shown in FIG. 52 and a cross-sectional view of the brewing material holder 30*m* taken along line 53-53 of FIG. 52 showing an empty brewing material holder is shown in FIG. 53. The latch 64 is held in a latched position by a spring-loaded lever 62 on the exterior of the base 31*a*.

A cross-sectional view of the brewing material holder 30*m* taken along line 53-53 of FIG. 52 showing the lid 32*a*, brewing material 41, the filter paper cup 40, above the base 31*a*, and the brewing material holder base 3 *a*, with the tamping latch 64 retaining the bottom tamper 34 is shown in FIG. 54A, a cross-sectional view of the brewing material holder 30*m* taken along line 53-53 of FIG. 52 showing the lid 32*a* above the brewing material 41 and the filter paper cup 40 arranged in the brewing material holder base 31*a*, with the tamping latch 64 retaining the bottom tamper 34 is shown in FIG. 54B, a cross-sectional view of the brewing material holder 30*m* taken along line 53-53 of FIG. 52 showing the lid 32*a*, above the brewing material 41 and the filter paper cup 40 arranged in the brewing material holder base 31*a* with the tamping latch 64 retaining the bottom tamper 34 is shown in FIG. 54C, and a cross-sectional view of the brewing material holder 30*m* taken along line 53-53 of FIG. 52 showing the lid 32*a* attached to the base 31*a* with the brewing material 41 and the filter paper cup 40 arranged in the brewing material holder base 31*a* with the tamping latch 64 released and the brewing material 41 tamped is shown in FIG. 54D. The lever 62 thus holds the latch 64 until the lever 62 is pushed to release the latch 62 to release the bottom tamper 34 to tamp the brewing material 41.

Figures 55, 56, 57A, 57B, 57C, 57D:
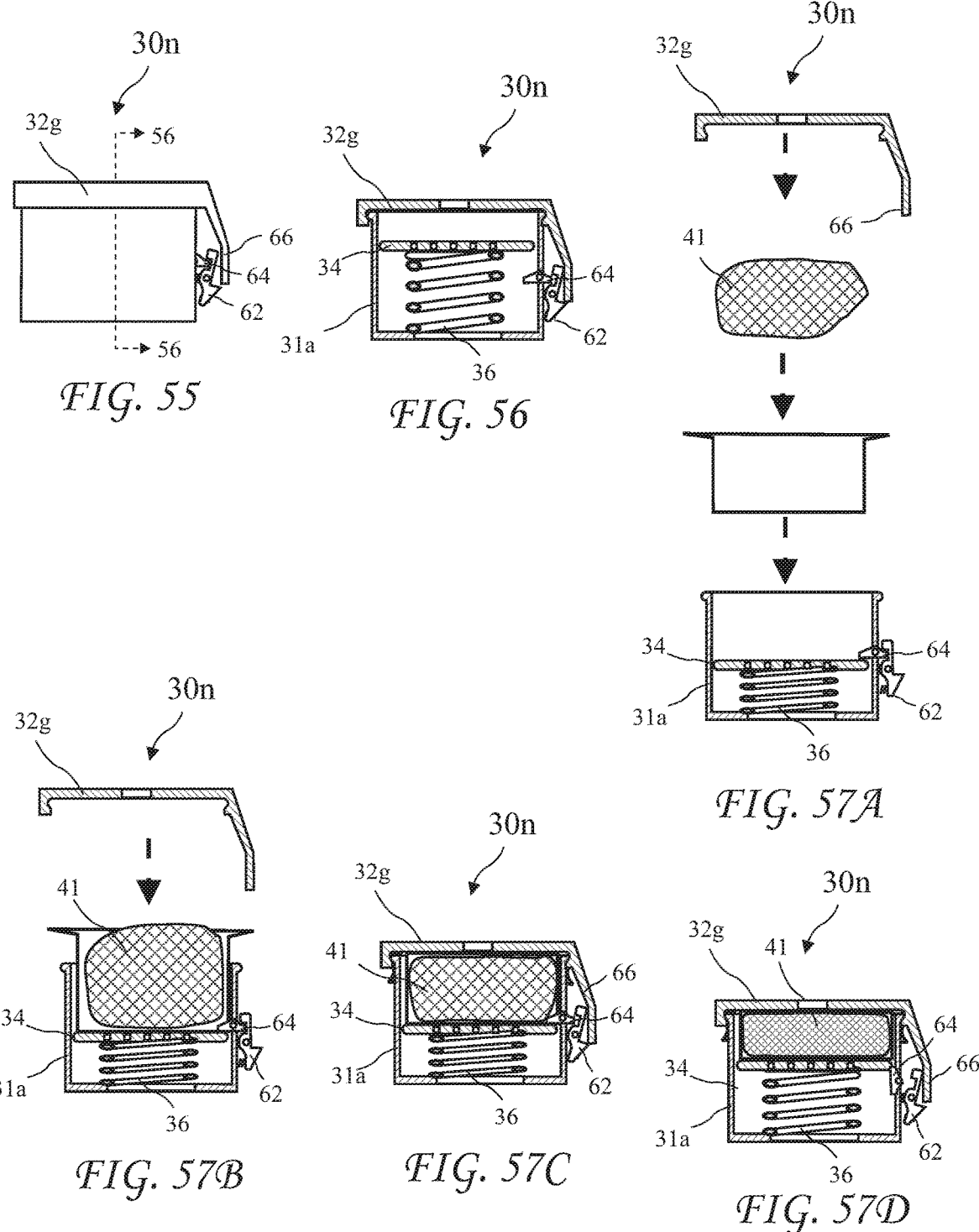
FIG. 55 is a side view of a brewing material holder with a releaseable tamping latch according to the invention.
FIG. 56 is a cross-sectional view of an exemplary brewing material holder taken along line 56-56 of FIG. 55 showing an empty brewing material holder.
FIG. 57A is a cross-sectional view of an exemplary brewing material holder taken along line 56-56 of FIG. 55 showing a lid, brewing material, a filter paper cup, above the base, and the brewing material holder base, with the tamping latch retaining the bottom tamper.
FIG. 57B is a cross-sectional view of an exemplary brewing material holder taken along line 56-56 of FIG. 55 showing the lid, above the brewing material and the filter paper cup arranged in the brewing material holder base, with the tamping latch retaining the bottom tamper.
FIG. 57C is a cross-sectional view of an exemplary brewing material holder taken along line 56-56 of FIG. 55 showing the lid, above the brewing material and the filter paper cup arranged in the brewing material holder base, with the tamping latch released but just prior to tamping.
FIG. 57D is a cross-sectional view of an exemplary brewing material holder taken along line 56-56 of FIG. 55 showing the lid attached to the base with the brewing material and the filter paper cup arranged in the brewing material holder base with tamping latch released and the brewing material tamped.

A side view of an exemplary brewing material holder 30*n* with a releaseable tamping latch 64 according to the invention is shown in FIG. 55 and a cross-sectional view of the brewing material holder taken along line 56-56 of FIG. 55 showing an empty brewing material holder is shown in FIG. 56. The lever 62 holds the latch 64 until the arm 66 attached to the lid 32*g* pushes the lever 62 to release the latch 64.

A cross-sectional view of the brewing material holder 30*n* taken along line 56-56 of FIG. 55 showing the lid 32*g*, brewing material 41, and the filter paper cup 40, above the brewing material holder base 31*a*, with the tamping latch 64 retaining the bottom tamper 34 is shown in FIG. 57A, a cross-sectional view of the brewing material holder 30*n* taken along line 56-56 of FIG. 55 showing the lid 32*g* above the brewing material 41 and the filter paper cup 40 arranged in the brewing material holder base 31*a*, with the tamping latch 64 retaining the bottom tamper 34 is shown in FIG. 57B, a cross-sectional view of the brewing material holder 30*n* taken along line 56-56 of FIG. 55 showing the lid 32*g*, above the brewing material 41 and the filter paper cup 40 arranged in the brewing material holder base 31*a* with the tamping latch 64 released but prior to tamping (the bottom tamper has been released but has not moved upward against the brewing material 41) is shown in FIG. 57C, and a cross-sectional view of the brewing material holder 30*n* taken along line 56-56 of FIG. 55 showing the lid 32*g* attached to the base with the brewing material 41 and the filter paper cup 40 arranged in the brewing material holder base 31 *a* with tamping latch 64 released and the brewing material 41 tamped is shown in FIG. 57D. The lever 62 thus holds the latch 64 until the lever 62 is pushed by the arm 66 to release the latch 64 to release the bottom tamper 34 to tamp the brewing material 41.

Figures 58, 59, 60A, 60B, 60C, 60D, 61A, 61B:
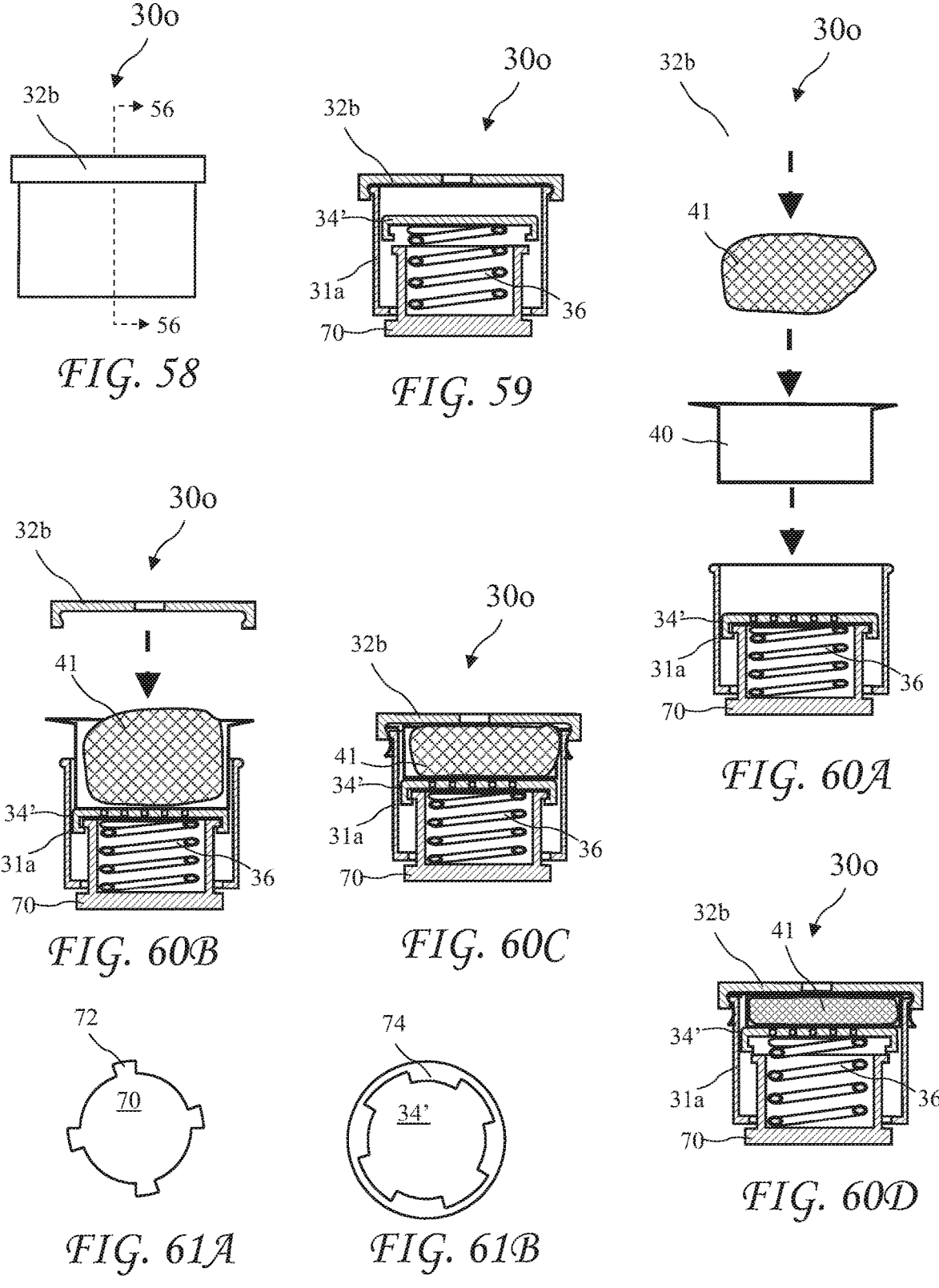
FIG. 58 is a side view of an exemplary brewing material holder with a releaseable tamping lock according to the invention.
FIG. 59 is a cross-sectional view of an exemplary brewing material holder taken along line 59-59 of FIG. 58 showing an empty brewing material holder.
FIG. 60A is a cross-sectional view of an exemplary brewing material holder taken along line 59-59 of FIG. 58 showing a lid, brewing material, a filter paper cup, above the base, and the brewing material holder base, with the tamping lock retaining the bottom tamper.
FIG. 60B is a cross-sectional view of an exemplary brewing material holder taken along line 59-59 of FIG. 58 showing the lid, above the brewing material and the filter paper cup arranged in the brewing material holder base, with the tamping lock retaining the bottom tamper.
FIG. 60C is a cross-sectional view of an exemplary brewing material holder taken along line 59-59 of FIG. 58 showing the lid, above the brewing material and the filter paper cup arranged in the brewing material holder base prior to tamping.
FIG. 60D is a cross-sectional view of an exemplary brewing material holder taken along line 59-59 of FIG. 58 showing the lid attached to the base with the brewing material and the filter paper cup arranged in the brewing material holder base with tamping lock released and the brewing material tamped.
FIG. 61A is a top view of an exemplary lock according to the invention.
FIG. 61B is a bottom view of an exemplary bottom tamper with cooperates with the tamping lock according to the invention.

A side view of an exemplary brewing material holder 300 with a releaseable tamping lock according to the invention is shown in FIG. 58 and a cross-sectional view of the brewing material holder 300 taken along line 59-59 of FIG. 58 showing an empty brewing material holder is shown in FIG. 59. The brewing material holder 300 includes a tamping lock 70 that engages a bottom tamper 34' to hold the bottom tamper in a down position for filling the brewing material holder with brewing material and releases the bottom tamper 34' to be pushed upward by the tamping spring 36 to tamp the brewing material after the holder lid 32*b* is attached to the base 31*a*.

A cross-sectional view of the brewing material holder 300 taken along line 59-59 of FIG. 58 showing a lid 32*b*, brewing material 41, a filter paper cup 40, above the brewing material holder base 31, with the tamping lock 70 retaining the bottom tamper 34' is shown in FIG. 60A, a cross-sectional view of the brewing material holder taken along line 59-59 of FIG. 58 showing the lid, above the brewing material and the filter paper cup arranged in the brewing material holder base, with the tamping latch retaining the bottom tamper 34' is shown in FIG. FIG. 60B, a cross-sectional view of the brewing material holder taken along line 59-59 of FIG. 58 showing the lid, above the brewing material and the filter paper cup arranged in the brewing material holder base prior to tamping is shown in FIG. 60A, and a cross-sectional view of the brewing material holder taken along line 59-59 of FIG. 58 showing the lid 32*b* attached to the base 31*a* with the brewing material 41 and the filter paper cup 41 arranged in the brewing material holder base 31 *a* with tamping lock released and the brewing material tamped is shown in FIG. 60D.

A top view of a tamping lock 70 according to the invention is shown in FIG. 61A and a bottom view of a bottom tamper 34' that cooperates with the tamping lock 70 according to the invention is shown in FIG. 61B. The tamping lock 70 includes teeth 72 that are inserted between and turned to engage lips 74 on the bottom of the bottom tamper 34' to hold the bottom tamper in the down position when filling the brewing material holder 300 with brewing material 41. After the brewing material holder 30*o* is filled with brewing material and the holder lid 32*b* is attached, the tamping lock is twisted to release the bottom tamper 32*b* to tamp the brewing material.

Figures 62A, 62B, 62C, 62D, 62E, 63A, 63B, 64:
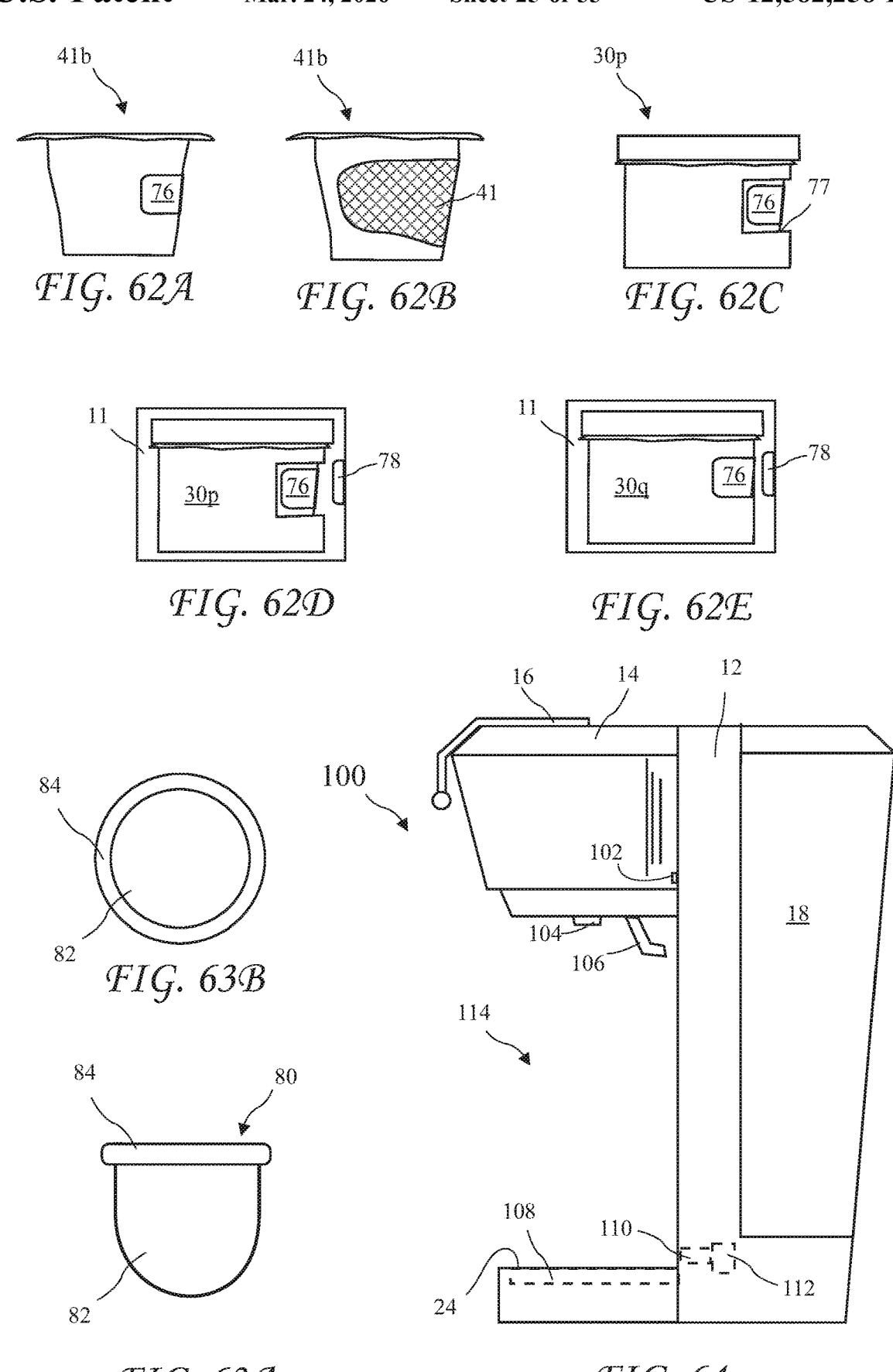

A pre-packaged rimmed brewing pod 41*b* for use in the beverage brewer according to the invention is shown in FIG. 62A, a cut-away view of the pre-packaged brewing material 41*a* for use in the beverage brewer showing the pod 41*b* is shown in FIG. 628, and a brewing material holder 30*p* having a window 77 is shown in FIG. 62C. The pod 41*b* is generally suitable for use in any of the brewing material holders 30*a*-30*o* described above. The pod 41*b* further includes an identification feature 76 to provide information to the beverage brewer to properly brew the specific brewing material 41 in the pod 41*b*. The rim of the pod 41*b* is captured by the lid of the brewing material holder 30*p*, thereby providing a drum-like (or taut) surface for consistent puncturing by the pointed nozzle 19*b* (see FIGS. 39A-39C).

The pre-packaged rimmed brewing pod 41*b* is shown arranged in a brewing material holder 30*p* in FIG. 62D, with the identification feature 76 cooperating with a sensor 78 arranged in or near the cavity 11 of the beverage brewer, and a brewing material holder 30*q* having the identification feature 76 affixed to the brewing material holder 30*d* is shown in FIG. 62E with the identification feature 76 cooperating with the sensor 78 arranged in or near the cavity 11 of the beverage brewer. The window 77 provides visual cooperation between the identification feature 76 and sensor 78 when desired.

The identification feature 76 can be visual (for example, any feature that may be read, such as a bar code), a readable magnetic strip, a Radio Frequency Identification (RFID) tag, or any feature able to include information and provide that information to a reader. The identification feature 76 can be read by a sensor 78 appropriately positioned in the cavity 11 of the beverage brewer. The identification feature 76 can be arranged on any surface of the pre-packaged brewing material 41*a* and in the case of a visual identification feature 76, the window 77 can be positioned on the brewing material holder 30*p* and the sensor can be positioned in the cavity 11 to correspond with the position of the visual identification feature 76. A window 77 is generally not required for a magnetic or RF identification feature 76 and the location of the corresponding sensor 78 generally only need be sufficiently near to the identification feature 76.

In another embodiment, a sensor 78 is arranged on the exterior of the beverage brewer. A bulk brewing material container, a pre-packaged pod, a brewing material holder, a recipe book, or any apparatus carrying an identification feature, can be swept past the sensor or held against or near the sensor, to provide brewing information to the beverage brewer.

A side view of a filter cup 80 according to the invention is shown in FIG. 63A, and a top view of the filter cup 80 is shown in FIG. 63B. The filter cup 80 includes a ring 84 made of a material sufficiently strong to hold its shape in the proposed use. For example, the ring 84 can be made from a rigid material, such as plastic, wood, bamboo, or metal. Filter material 82 is attached to the ring 84. The filter cup 80 is insertable into the brewing material holder and in many embodiments is a replacement for the filter paper cup 40.

A side view of multi-mode beverage brewer 100 according to the invention is shown in FIG. 64. The multi-mode beverage brewer 100 allows the user to easily make a single cup of beverage or several cups of beverage. The multi-mode beverage brewer 100 includes manually operated controls 102 for selecting a volume of water for a single cup of beverage or to fill a carafe, arranged in the mouth 114 of the multi-mode beverage brewer 100. The controls 102 can also allow selection of a large or small cup of beverage, and of hot water only. Alternatively, the multi-mode beverage brewer 100 can detect the presence of a single-cup adapter 118 and limit the volume of beverage produced to an amount for a single cup, for example as an override if a user accidentally selects a volume of beverage too large for a single cup.

A spout/drip valve 104 releases the desired amount of beverage into a carafe or cup positioned on a platform 24, and a drip valve actuator (or valve lever) 106 is actuateable to open and close the spout/drip valve 104. In other examples, the drip valve actuator can be pneumatic, hydraulic, or electric, and can be any mechanical link that opens the spout/drip valve 104. The spout/drip valve 104 can be manually opened by a user. For example, the spout/drip valve 104 can be opened by placing the multi-cup brewed beverage container 26 in the beverage brewer 100 and openable for use of the single cup brewed beverage container 116 by either a mechanical or electrically operated actuator or by positioning of the single cup adapter 118 for use of the single cup.

In another embodiment the spout/drip valve 104 is opened by the positioning of a single-cup adapter into position for use of a single cup in the beverage brewer, for example by an arm on the single-cup adapter cooperating with a lever connected to the spout/drip valve, by an arm arranged at the rear of the mouth, the single-cup adapter pushing against the arm to open the spout/drip valve, or by any mechanical or electrical apparatus connected to the spout/drip valve and actuated by positioning the single-cup adapter to use a single cup in the beverage brewer. In still another embodiment the flow of brewed beverage is controlled by turning the pump 21 on and off, by controlling a boiler, or by controlling a valve preventing the flow of water to the brewing material holder.

A hot plate 108 is recessed on the top surface of the platform 24 and the recess is larger than the footprint of the multi-cup brewed beverage container (or carafe) 26 allowing contact with the hot plate 108 for keeping a carafe at a minimum temperature. A passage 110 allows a finger 120 of a single-cup adapter 118 (see FIG. 67B) to engage a switch 112 to turn off the hot plate 108 when the single-cup adapter 118 is in use.

Figure 65B:
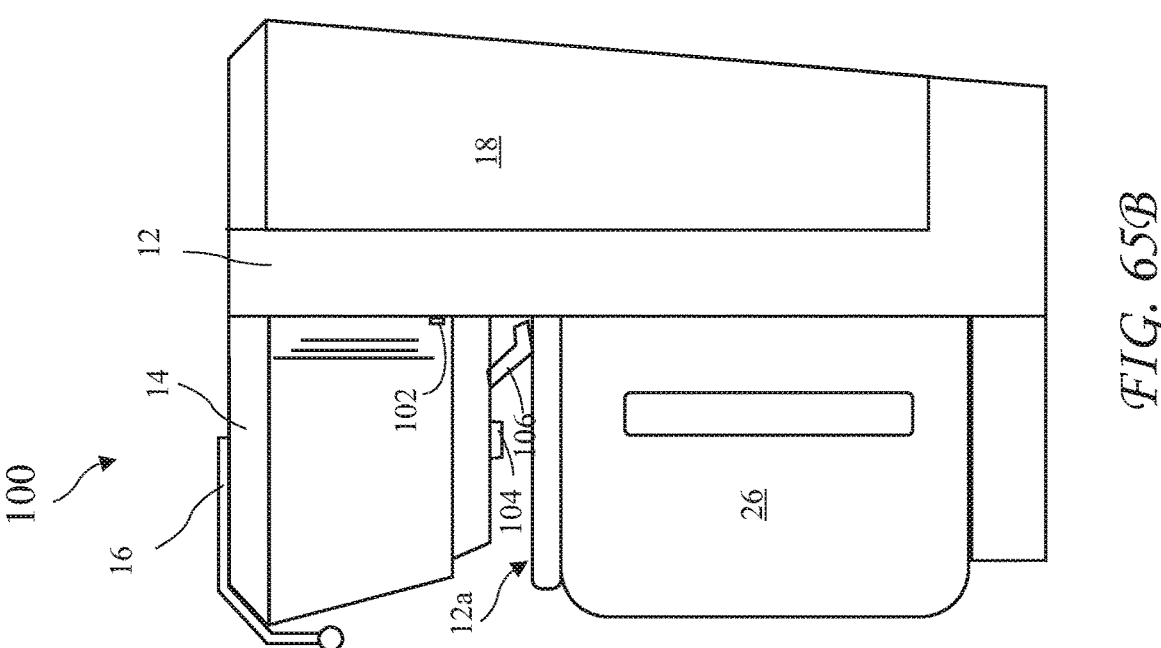
Figure 65A:
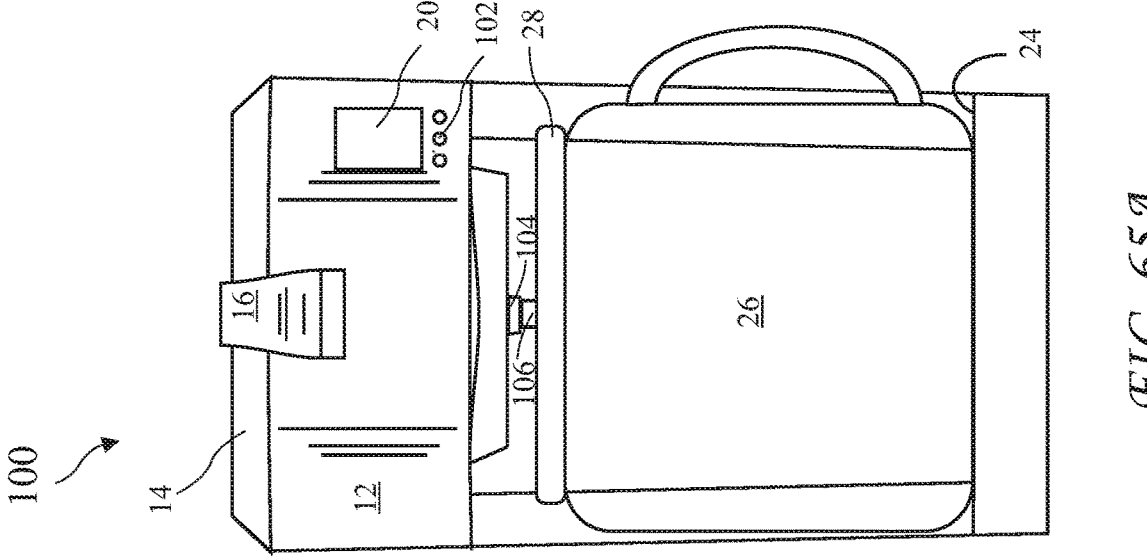

A front view of the multi-mode beverage brewer 100 with a carafe 26 arranged on the platform 24 for receiving a selected volume of beverage is shown in FIG. 65A and a side view of the multi-mode beverage brewer 100 with the carafe 26 positioned to receive a selected volume of beverage is shown in FIG. 65B. The top edge of the carafe 26 pushes the valve lever 106 upward, opening the spout/drip valve 104 to allow the selected volume of beverage to flow into the carafe 26.

Figure 66B:
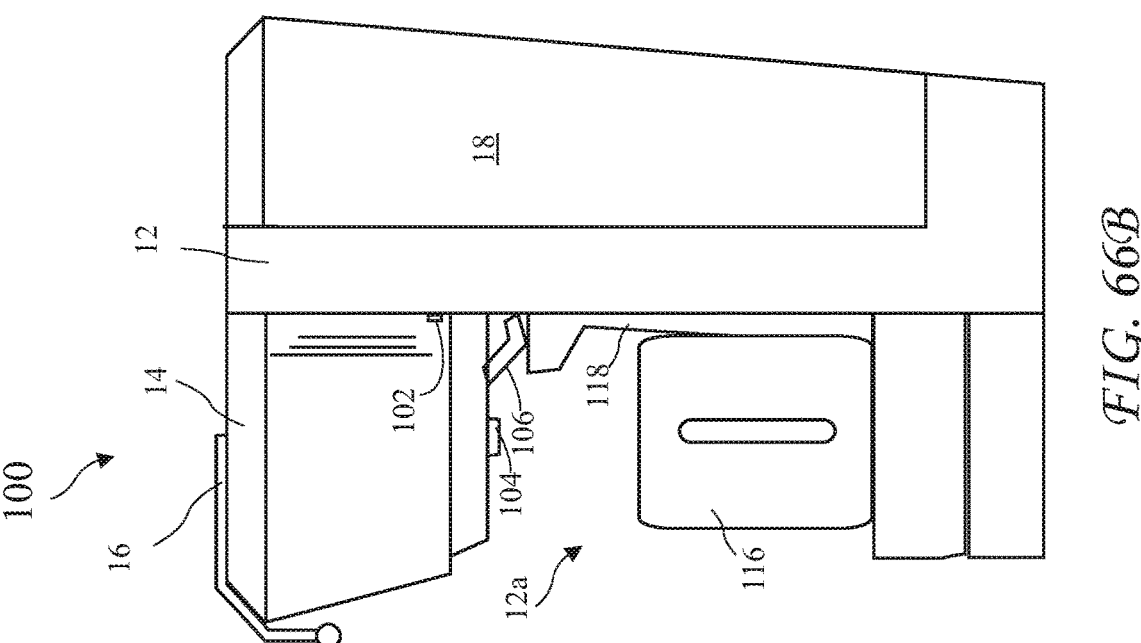
Figure 66A:
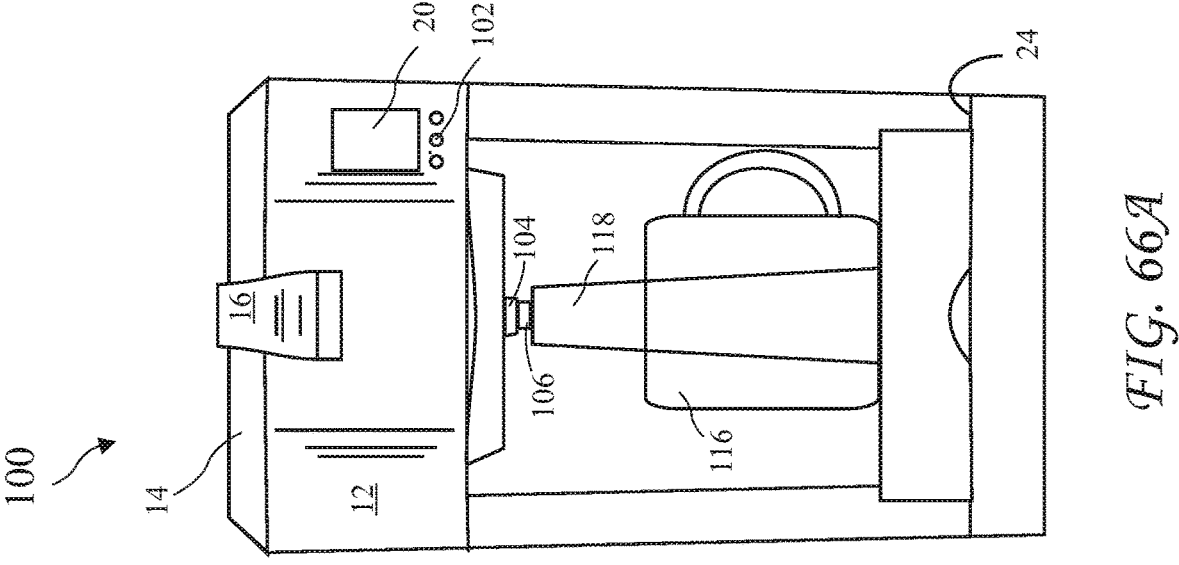

A front view of the multi-mode beverage brewer 100 with a beverage cup (or single-cup brewed beverage container) 116 arranged on a single-cup adapter 118 for receiving the selected volume of beverage is shown in FIG. 66A and a side view of the multi-mode beverage brewer 100 with the beverage cup arranged on the single-cup adapter 118 for receiving the selected volume of beverage is shown in FIG. 66B. The single-cup adapter 118 includes an upward-extending arm portion 118*b* (see FIG. 678) that pushes the valve lever 106 upward, opening the spout/drip valve 104 to allow the selected volume of beverage to flow into the beverage cup 116.

A front view of a single-cup adapter 118 according to the invention is shown in FIG. 67A, a side view of the single-cup adapter 118 is shown in FIG. 67B, a top view of the single-cup adapter 118 is shown in FIG. 67C, and a cross-sectional view of the single-cup adapter 118 taken along line 68-68 of FIG. 67A is shown in FIG. 68. The single-cup adapter 118 includes a base portion 118*a*, which includes a single-cup platform 129 for supporting the beverage cup 116 and a drip basin (or tray) 124 for catching and holding drops from the spout/drip valve 104. A grill 126 is arranged over the drip basin 124 and the beverage cup 116 is arranged on the grill 126. An arm portion 118*b* extends up and an angled surface 128 at the top of the arm portion 118*b* cooperates with the valve lever 106 to open the spout/drip valve 104 when the single-cup adapter 118 is positioned in the beverage brewer 100. In another embodiment, the drip tray can be integrated into the beverage brewer 100 and can pivot or slide into position under the beverage cup 116. For example, the single-cup adapter 118 can have an open side or rear that the drip tray slides or pivots into.

A downward protrusion 122 on the bottom of the base portion 118*a* fits into a recess in the platform 24 to correctly position the single-cup adapter 118 in the mouth 114 of the beverage brewer 100, and to resist easy detachment of the single-cup adapter 118 from the beverage brewer 100. A rearward-extending finger 120 enters the passage 110 to actuate the switch 112 (see FIG. 64) to turn off the hot plate when the single-cup adapter 118 is attached to the beverage brewer 100. The finger 120 and switch 112 assembly are one example of a mechanism for turning off the hot plate 108 when the single-cup adapter 118 is attached to the beverage brewer 100. Other mechanisms include a magnetic switch detecting the presence of the hot plate 108 in the single cup adapter 118 by the proximity of a magnet and piece of magnetically attractive metal or a second magnet, a switch in the platform, or even a manual switch, and a beverage brewer according to the invention with any switch for turning off hot plate is intended to be included within the scope of the invention.

A side view of an exemplary single-cup adapter 118' according to the invention is shown in FIG. 67D. The single-cup adapter 118' is a compact version of the single-cup adapter 118 and does not include the arm portion 118*b*. The single-cup adapter 118' provides single-serving functions through the insertion of the rearward extending finger 120 into the beverage brewer 100. These functions include shutting off the hot plate 108 (see FIG. 64), opens the open the spout/drip valve 104 to release brewed beverage, setting the beverage brewer 100 to the single-serving mode (limits the beverage amount, for example, to between one and sixteen ounces).

A side view of a multi-serving dry brewing material holder 130*a* according to the invention for use in the multi-mode beverage brewer 100 for making several cups of brewed beverage is shown in FIG. 69A and a side view of a single-serving dry brewing material holder 130*b* according to the invention for use in the multi-mode beverage brewer 100 for making one cup of beverage is shown in FIG. 69B. A variety of dry brewing material holders 30*a*-30*o* and mechanisms for containing and tamping dry brewing material in a beverage brewer are disclosed in FIG. 3 though 63B, and a multi-mode beverage brewer 100 including any of the brewing material holders disclosed herein, or any other brewing material holder, is intended to be included within the scope of the invention.

A beverage brewer 210 and reuseable cartridge 230 according to the invention are shown in FIG. 70, a side view of the reuseable cartridge 230 is shown in FIG. 71A, a top view of the reuseable cartridge 230 is shown in FIG. 71B, and a cross-sectional view of the reuseable cartridge according to the invention taken along line 72-72 of FIG. 718 is shown in FIG. 72. The reuseable cartridge 230 comprises a cover 230*a* and a base 230*b*. The cover 230*a* is removeable from the base 230*b* to fill the reuseable cartridge 230 with brewing material 41. Generally, the reuseable cartridge 230 is filled by pouring loose brewing material 41 into the base 230*b*. Once filled with the brewing material 41, the reuseable cartridge 230 is inserted into the cavity 211 of the beverage brewer 210 and the lid 214 is closed. The lid 214 of the beverage brewer 210 generally includes a projections 214*a* that engage recesses 236*a* of the cover 236 to urge the reuseable cartridge 230 into position in the cavity 211. A flow of water 232 (typically a flow of heated water) enters the reuseable cartridge 230 and passes through the brewing material 41, and a flow of brewed beverage 234 exits the reuseable cartridge 230. An identification feature 76 is arranged on a bottom surface, providing the benefits described with reference to FIGS. 62A-62E above. Such identification feature 76 can be attached in other positions on the exterior of the reuseable cartridge 230.

A side view of a cover 230*a* of the reuseable cartridge 230 is shown in FIG. 73A, a top view of the cover 230*a* of the reuseable cartridge 230 is shown in FIG. 73B, and a cross-sectional view of the cover 230*a* of the reuseable cartridge 230 taken along line 74-74 of FIG. 73B is shown in FIG. 74. The cover includes recesses 236*a* and 236*b*.

A side view of a base 230*b* of the reuseable cartridge 230 is shown in FIG. 75A, a top view of the base 230*b* is shown in FIG. 758, and a cross-sectional view of the base 230*b* taken along line 76-76 of FIG. 75B is shown in FIG. 76. The base 230*b* includes entry port 238*a* for the flow of water 232, and an exit port 238*b* for the flow of brewed beverage 234. The flow of water 232 enters the base 230*a* and must flow over the wall 240 to reach the interior of the 244 of the base 230*b*. Forcing the flow of water 232 over the wall 240 causes the flow of water 232 to pass through the brewing material 41, thereby producing a rich brewed beverage. A filter 242 is arranged over the exit port 238*b* to prevent the brewing material 41 from escaping into a cup of brewed beverage.

A side view of a brewed beverage pod 250 for use in the reuseable cartridge 230 according to the invention is shown in FIG. 77A and a top view of the brewed beverage pod 250 is shown in FIG. 778. The brewed beverage pod 250 is shaped to conform reasonably well to the interior of the 244 of the base 230*b* and includes a passage 250*a* for the recess 236*a* in the cover 230*a*.

A side view of a filter paper 252 for use in the reuseable cartridge 230 according to the invention is shown in FIG. 78A and a top view of the filter paper 252 is shown in FIG. 788. The filter paper 252 is shaped to conform reasonably well to the interior 244 of the base 230*b* and includes a passage 252*a* for the recess 236*a* in the cover 230*a*. The filter paper 252 includes a filter cover 252'. After inserting the filter paper 252 into the base 230*b* and filling the filter paper 252 with brewing material 41, the filter cover 252' is folded over the brewing material 41 and the cover 230*a* is pressed onto the base 230*b*. A rim 253 of the filter paper 252, and matching rim 253' of the filter cover 252', can be sandwiched between the cover 230*a* and the base 230*b* to securely hold the filter cover 252' on the filter paper 252 to retain the brewing material 41 in the filter paper 252.

A side view of the filter paper cup 40 with the folding paper lid 40*d* open is shown in FIG. 79A, a top view of the filter paper cup 40 is shown in FIG. 79B, a second side view of the filter paper cup 40 with the folding paper lid 40*d* closed is shown in FIG. 79C, and a cross-sectional view of the filter paper cup 40 taken along line 80-80 of FIG. 798 is shown in FIG. 80. The lid 40*d* of the filter paper cup 40 can be folded over the cup 40 and sealed after loose brewing material 41 is placed in the cup. The filter paper cup 40 includes a receptacle 40*g* formed from a bottom 40*b*, sides 40*a*, and a rim (for example, an annular rim) 40*c*, and a cover (or lid) 40*d* for closing the receptacle 40*g* to capture brewing material in the filter paper cup 40. The filter paper cup 40 is formed using heat and/or moisture to form permanent folds (or pleats) 40*f* in the sides 40*a* and rim 40*c* of the filter paper cup 40 to add strength and rigidity to the filter paper cup 40 so that the filter paper cup 40 retains its shape after forming, and preferably, adhesive is applied to the rim 40*c* and/or the sides 40*a* to retain the pleats and add strength and rigidity to the filter paper cup 40. Preferably, the filter paper cup 40 is constructed from heat-sealable filter paper having a heat-reacting film on at least one side, which film causes the pleats to adhere to adjacent pleats when heat is applied following forming. The pleats in the rim 40*c* are generally continuations of the pleats in the sides 40*a*. The filter paper cup 40 may alternatively be corrugated to retain shape. The filter paper cup 40 thus has structure for maintaining a substantially (that is, within the ability of the paper to maintain a shape) frusto-conical or cylindrical shape, unlike known brewing material pods, which have no structure for maintaining shape and are pillow-like. U.S. patent application Ser. No. 11/392,893 filed Mar. 28, 2006 by the present inventor, discloses a similar filter paper cup forming a brewing material pod. The disclosure of '893 application in its entirety is incorporated herein by this reference.

The filter paper cup 40 is preferably frusto-conical shaped or cylindrically shaped. The filter paper cup 40 has a base diameter D1, an inner top diameter D2, an outer top diameter (the diameter of the rim) D3, and a height H. In an exemplary embodiment, the diameter D1 is approximately 1.25 inches, the diameter D2 is approximately 1.625 inches, the diameter D3 is approximately 2.125 inches, and the height H is approximately one inch. The rim 40*c* of this embodiment is thus approximately 0.25 inches wide. The lid 40*d* has approximately the same diameter D3 as the rim 40*c*.

The filter paper cup 40 can be sold in an empty state for filling by a user, or as a pre-packaged single-serving or multi-serving brewing material pod. When sold for filling by the user, the filter paper cup 40 can be sold with the cover 40*d* attached to the rim 40*c* of the receptacle 40*g*. For example, the filter paper cup 40 can be made from a single piece of filter paper cut into two circular portions attached by a hinge 40*h*, or by two separately cut pieces of filter paper attached at the hinge 40*h*. The filter paper cup 40 can be sold as two pieces, such that the cover 40*d* is detached from the receptacle 40*g*. A user can seal the cover 40*d* to the rim 40*c* of the receptacle 40*g* as disclosed in the '893 patent application, or the cover 40*d* can be held to the receptacle 40*g* by sandwiching the filter paper cup 40 between a holder lid 32*a* and holder body 31. When the filter paper cup 40 is sold as a ready-to-use pod containing brewing material, the pod is generally manufactured using filter paper off two separate rolls as described below.

A cross-sectional side view of a pod holder 30*r* showing the pod holder 30*r* with the tamping spring 36 and bottom tamper 34, the filter paper cup 40 containing a portion of brewing material 41, and the holder lid 32*a* ready to attach to a holder body 31*a* is shown in FIG. 81A, and a cross-sectional side view of the pod holder 30*r*, the brewing material holder with the tamping spring and bottom tamper, the portion of brewing material in the filter paper cup, and the holder lid attached to the holder body with the rim of the filter paper cup sandwiched between the lid and brewing material holder and the tamping spring and bottom tamper pushing the filter paper cup against the lid according to the invention is shown in FIG. 81B. The rim 40*c* is arranged on a top edge of the holder body 31 and is sandwiched between the holder lid 32*a* and the body 31*a* when the lid 32*a* is attached to the body 31*a*, thereby holding the filter paper cup 40 against the holder lid 32*a* so that a needle inserted through the holder lid 32*a* will puncture the folding paper lid 40*d* and inject hot water into the filter paper cup 40. The brewing material 41 is preferably retained in the filter paper cup 40 solely by attaching a lid 32*a* of the pod holder 30*r* to the base 31*a* of the pod holder to sandwich the rim 40*c* of the filter paper cup 40 and the outer edge of the cover 40*d* between the lid of the pod holder to the base of the pod holder. U.S. patent application Ser. No. 11/777,831 filed Jul. 13, 2007 by the present inventor, describes a similarly pod holder. The disclosure of '831 application in its entirety is incorporated herein by this reference.

The inside diameter D4 of the mouth of the pod holder 30*r* is approximately the same size as the Diameter D2 of the filter paper cup 40 and is preferably approximately 1.625 inches, thereby facilitating the capture and sandwiching of the rim 40*c* and edge of the cover 40*d* between the holder lid 32*a* and body 31*a*. Sandwiching of the rim 40*c* and edge of the cover 40*d* between the holder lid 32*a* and the body 31*a* both seals the brewing material in the filter paper cup 40 to prevent or restrict the escape of the brewing material from the filter paper cup 40 during brewing and provides a taut cover 40*d*, facilitating puncturing the cover 40*d* by a needle used to inject heated water into the filter paper cup 40 during brewing. The body 31*a* can have a cylindrical or frusto-conical shape.

Another embodiment of the brewing material holder 30*s* is shown in FIG. 82. The brewing material holder 30*a* is similar to the brewing material holder 30*s* but omits the tamping spring 36 and bottom tamper 34.

A side view of the filter paper cup 40″ with a separate receptacle 40*g″* and paper lid 40*d″* is shown in FIG. 83A, a top view of the filter paper cup 40″ with the separate receptacle 40*g″* and paper lid 40*d″* is shown in FIG. 83B, and a second side view of the filter paper cup 40″ with the separate paper lid 40*d″* arranged on the receptacle 40*g″* is shown in FIG. 83C. The filter paper cup 40″ includes the features of the filter paper cup 40, except the lid 40*d″* is not hingedly attached to the receptacle 40*g″* and is a separate piece.

A preferred method for manufacturing the filter paper cups includes the following steps. Providing filter paper to a machine. Forming a receptacle in the filter paper. Using heat and/or steam make the filter paper retain the receptacle shape. Cutting out the receptacle and the lid. The following additional steps may be used to manufacture a pod according to the invention. Filling the receptacle with brewing material. Tamping the brewing material in the receptacle. Positioning the lid over the receptacle. Attaching the lid to the receptacle. Nitrogen flushing and sealing the pod. Either the filter paper cups or the completed pods can be manufactured in a printing press or an assembly line style.

Although the invention is described above as placing loose brewing material in a brewing material holder, the invention can also be practiced by placing prepackaged brewing material, for example brewing material pods, into the brewing material holder. Further, while the brewing material holder is generally described as having a snap-on lid, a screw-on lid can also be used, and in general the various elements of different embodiments described above can be mixed to provide new embodiments and such new embodiments are intended to be included within the scope of the invention.

Further, many embodiments are described as including a brewing material chamber comprising a filter paper cup. In many cases, a filter cup made of nylon mesh or metal mesh is equally suitable, and any brewing material holder or combination of beverage brewer and brewing material holder including a filter chamber that holds brewing material and allows the brewing material to be tamped as described above is intended to be included within the scope of the invention regardless of the specific filter material. Further, those skilled in the art will recognize that the features of the various embodiments of the invention disclosed herein can be combined to provide various combinations, and all of such combinations are intended to be included with the scope of the invention.

Although the invention herein disclosed has been described by means of specific embodiments and applications thereof, numerous modifications and variations could be made thereto by those skilled in the art without departing from the scope of the invention set forth in the claims.

I claim:

1. A beverage brewing material filter cup, comprising:
a receptacle, at least partially formed from the filter cup material, configured to receive and hold brewing material, wherein the receptacle includes:
a base having a peripheral edge,
a sidewall extending outward from the peripheral edge of the base and terminating in an opening, and
a rim surrounding the sidewall opening to form an outside perimeter of the receptacle;
wherein at least one of the sidewall and the rim has pleats formed thereon;
wherein the filter cup material includes:
filter paper not having heat-reacting adhesive qualities, and
a heat-reacting film applied on at least a portion of at least one side of the filter paper; and
wherein at least some adjacent ones of the pleats are sealed by the heat-reacting film.

2. The beverage brewing material filter cup of claim 1, wherein the receptacle is formed from a sheet of the filter cup material.

3. The beverage brewing material filter cup of claim 2, wherein the receptacle is formed from a single sheet of the filter cup material.

4. The beverage brewing material filter cup of claim 3, wherein the single sheet of the filter cup material is pleated to form the shape of the receptacle.

5. The beverage brewing material filter cup of claim 1, further comprising a cover having a diameter no smaller than an inner diameter of the rim.

6. The beverage brewing material filter cup of claim 1, wherein the sidewall of the receptacle is perpendicular to the receptacle base.

7. The beverage brewing material filter cup of claim 1, wherein the sidewall of the receptacle has a generally frusto-conical shape.

8. The beverage brewing material filter cup of claim 1, wherein the sidewall and the rim are pleated.

9. The beverage brewing material filter cup of claim 8, wherein the pleated rim includes pleats common to the pleated sidewall.

10. The beverage brewing material filter cup of claim 1, wherein the sidewall has a circular cross-section, and the rim is an annular rim.

11. The beverage brewing material filter cup of claim 10, wherein the annular rim has an inner diameter of about 1.625 inches, and an outer diameter of about 2.125 inches.

12. The beverage brewing material filter cup of claim 10, wherein the base has a diameter of about 1.25 inches and the sidewall has a height of about one inch.

13. The beverage brewing material filter cup of claim 1, wherein the rim is made of a rigid material.

14. A beverage cartridge, comprising:
the beverage brewing material filter cup of claim 1;
a cover, fixed to the rim; and
brewing material disposed in the receptacle.

15. The beverage brewing material filter cup of claim 1, wherein the heat-reacting film is not impermeable to water.

16. A beverage brewing material filter cup, comprising:
a receptacle, at least partially formed from the filter cup material, configured to receive and hold brewing material, wherein the receptacle includes:
a base having a peripheral edge,
a sidewall extending outward from the peripheral edge of the base and terminating in an opening, and
a rim surrounding the sidewall opening to form an outside perimeter of the receptacle;
wherein at least one of the sidewall and the rim has pleats formed thereon;
wherein the filter cup material includes filter paper not having heat-reacting adhesive qualities, at least a portion of which is treated with a heat-reacting material; and
wherein at least some adjacent ones of the pleats are sealed by the heat-reacting material.

17. The beverage brewing material filter cup of claim 16, wherein a single sheet of the filter cup material is pleated to form the shape of the receptacle.

18. The beverage brewing material filter cup of claim 16, further comprising a cover having a diameter no smaller than an inner diameter of the rim.

19. The beverage brewing material filter cup of claim 16, wherein the sidewall and the rim are pleated.

20. The beverage brewing material filter cup of claim 19, wherein the pleated rim includes pleats common to the pleated sidewall.

21. The beverage brewing material filter cup of claim 16, wherein the heat-reacting material is not impermeable to water.

* * * * *